(12) United States Patent
Nanjo et al.

(10) Patent No.: US 7,583,300 B2
(45) Date of Patent: Sep. 1, 2009

(54) IMAGING DEVICE AND ZOOM LENS

(75) Inventors: Yusuke Nanjo, Kanagawa (JP); Hitoshi Nakanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 10/477,231

(22) PCT Filed: Mar. 14, 2003

(86) PCT No.: PCT/JP03/03114

§ 371 (c)(1),
(2), (4) Date: Jul. 6, 2004

(87) PCT Pub. No.: WO03/077006

PCT Pub. Date: Sep. 18, 2003

(65) Prior Publication Data

US 2004/0239785 A1    Dec. 2, 2004

(30) Foreign Application Priority Data

Mar. 14, 2002  (JP)  ............................. 2002-070251
Mar. 4, 2003   (JP)  ............................. 2003-057486

(51) Int. Cl.
*H04N 5/262* (2006.01)
*G02B 15/14* (2006.01)

(52) U.S. Cl. ................. 348/240.99; 359/682

(58) Field of Classification Search . 348/240.99–240.3, 348/335; 359/672–675, 687, 774, 682; 396/77, 396/124, 274
See application file for complete search history.

(56) References Cited

U.S. PATENT DOCUMENTS 4,887,107 A * 12/1989 Nakamura et al. ............ 396/75

5,315,331 A    5/1994 Ohshita (Continued)

FOREIGN PATENT DOCUMENTS

JP    4 13110    1/1972

(Continued)

OTHER PUBLICATIONS

Patent Abstracts of Japan, vol. 1998, No. 11, Sep. 30, 1998 & JP 10 170803 A (Asahi Optical Co Ltd), Jun. 26, 1998.

*Primary Examiner*—Jason Chan
*Assistant Examiner*—Joel Fosselman
(74) *Attorney, Agent, or Firm*—Frommer Lawrence & Haug LLP; William S. Frommer; Ellen Marcie Emas

(57) ABSTRACT

An image pickup apparatus having a plurality of image pickup modes and a zoom lens for use with the image pickup apparatus is configured such that, even if the dimension of an effective screen region of an image pickup element changes as a result of changeover of the image pickup mode, the change of the angle of view is moderated and good aberration correction can be achieved in any of the image pickup modes.

In an image pickup apparatus (1), an additional lens set (G5) having a positive refractive power is positioned most adjacent the image side with respect to a zoom lens (2) for movement to and from a position on an optical axis of the zoom lens. Upon changeover of an image pickup mode, the additional lens set is moved to or away from the position on the optical axis to reduce or extend the focal length range of the zoom lens thereby to moderate the variation of the angle of view caused by a difference in dimension of the effective screen region of an image pickup element (12) when any different image pickup mode is selected. Further, the movement of the additional lens set to or from the position on the optical axis is detected to set the states of components in accordance with any image pickup mode.

7 Claims, 38 Drawing Sheets

U.S. PATENT DOCUMENTS

| | | |
|---|---|---|
| 5,794,090 A | 8/1998 | Oshima et al. |
| 5,909,320 A | 6/1999 | Oono et al. |
| 6,157,781 A | 12/2000 | Konno et al. |
| 6,400,515 B1 * | 6/2002 | Kohno .................. 359/675 |
| 6,801,250 B1 * | 10/2004 | Miyashita ............. 348/220.1 |
| 2001/0012161 A1 * | 8/2001 | Nagahara ................ 359/682 |
| 2001/0050712 A1 * | 12/2001 | Dunton et al. ............ 348/220 |

FOREIGN PATENT DOCUMENTS

| | | |
|---|---|---|
| JP | 56-111825 | 9/1981 |
| JP | 62-56916 | 3/1987 |
| JP | 2-262113 | 10/1990 |
| JP | 4-123013 | 4/1992 |
| JP | 4-158330 | 6/1992 |
| JP | 8-298667 | 11/1996 |
| JP | 11-187299 | 7/1999 |
| JP | 2000-059656 | 2/2000 |
| JP | 2000-106645 | 4/2000 |
| JP | 2000-121932 | 4/2000 |
| JP | 2000-333049 | 11/2000 |
| JP | 2001-21803 | 1/2001 |
| JP | 2001-36795 | 2/2001 |
| JP | 2001-305426 | 10/2001 |

* cited by examiner

F I G. 3
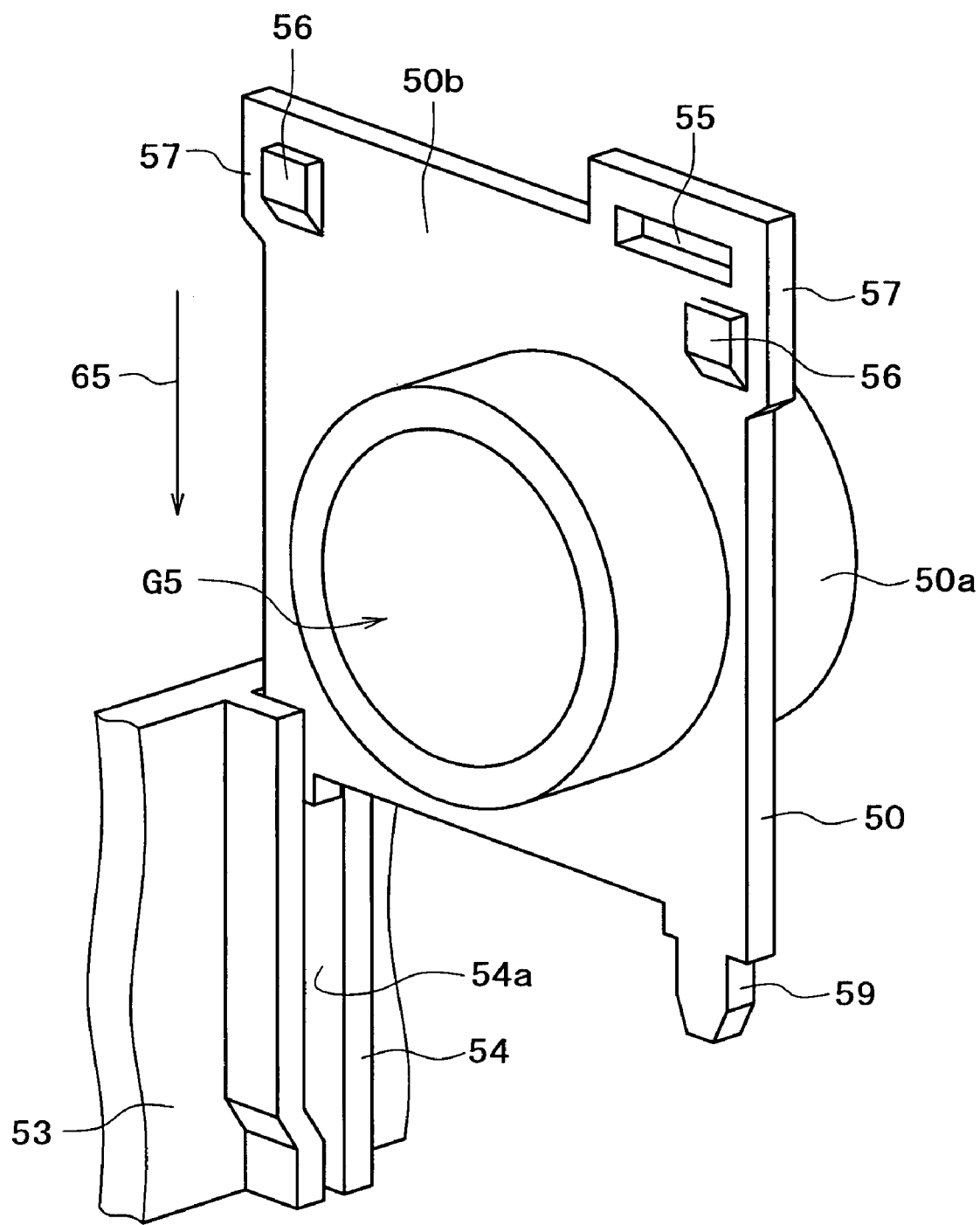

F I G. 4
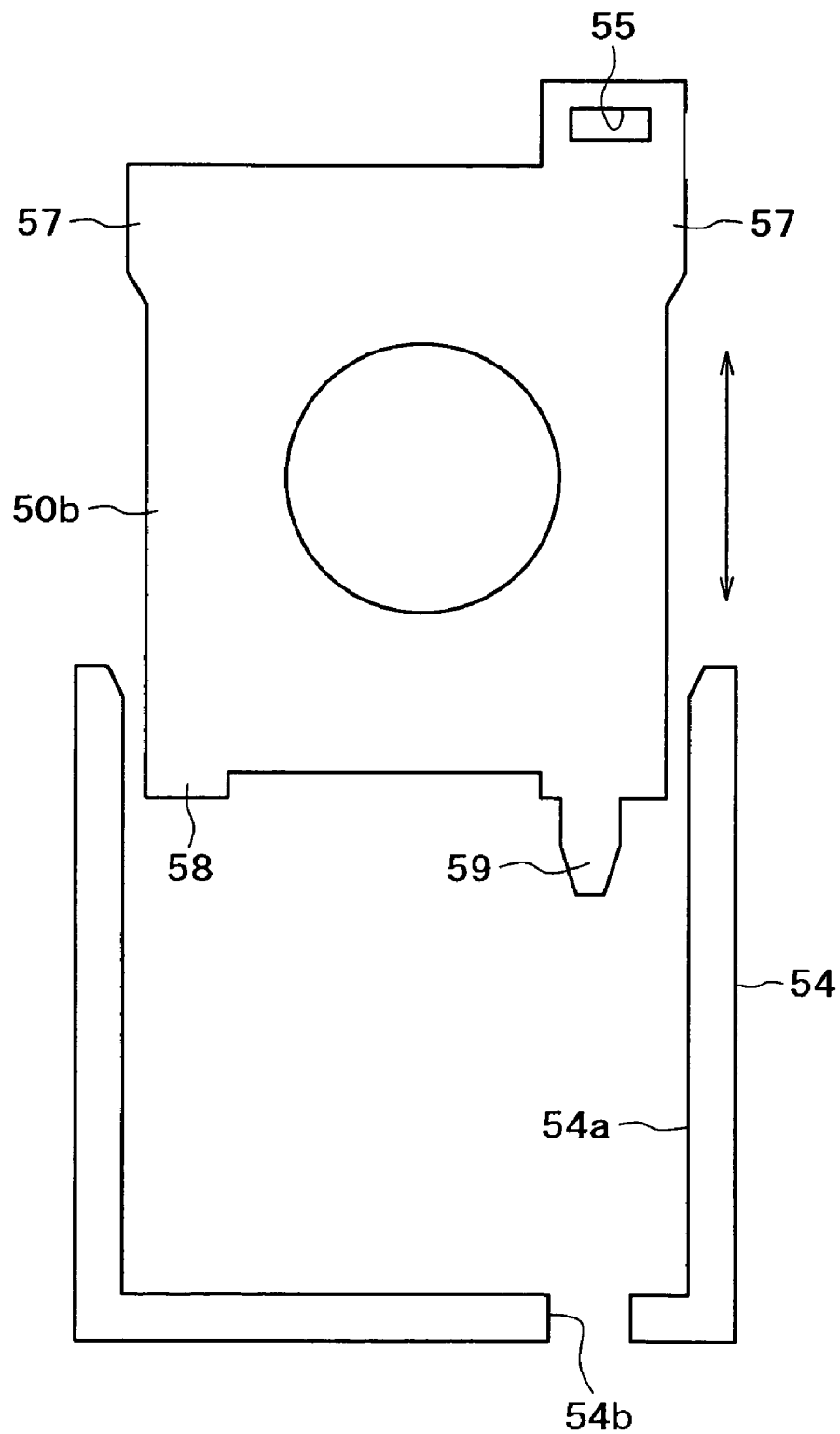

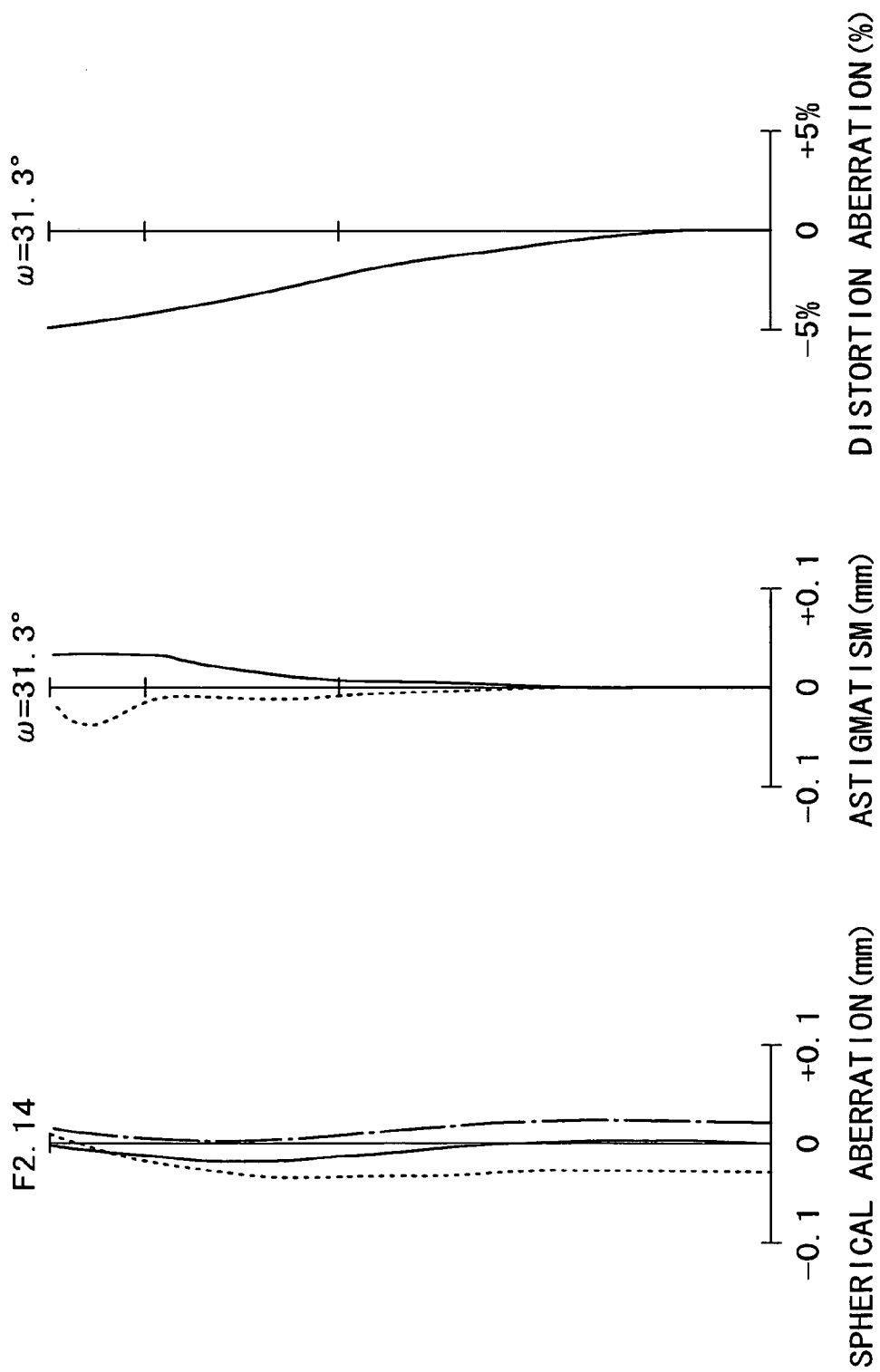

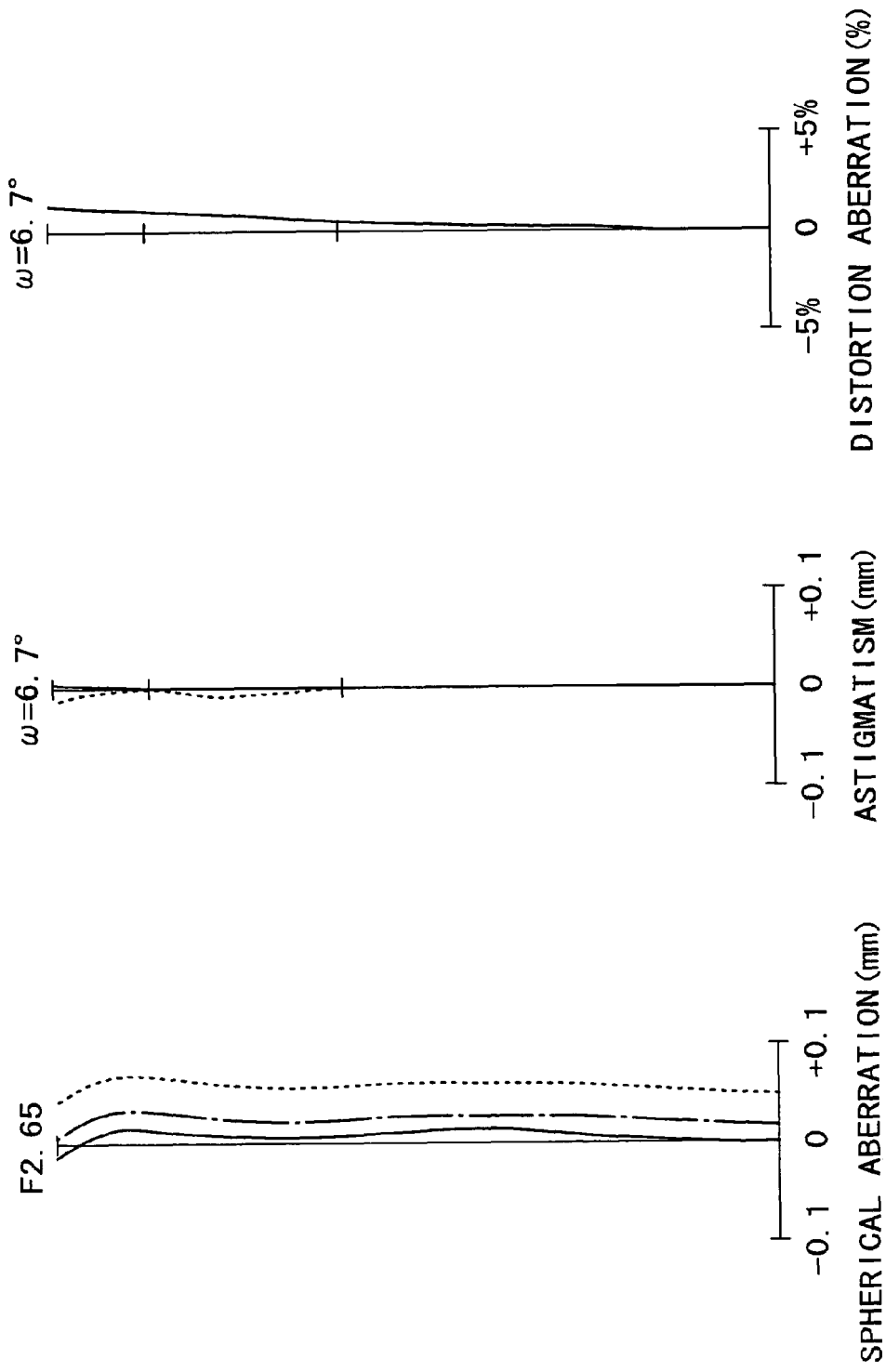

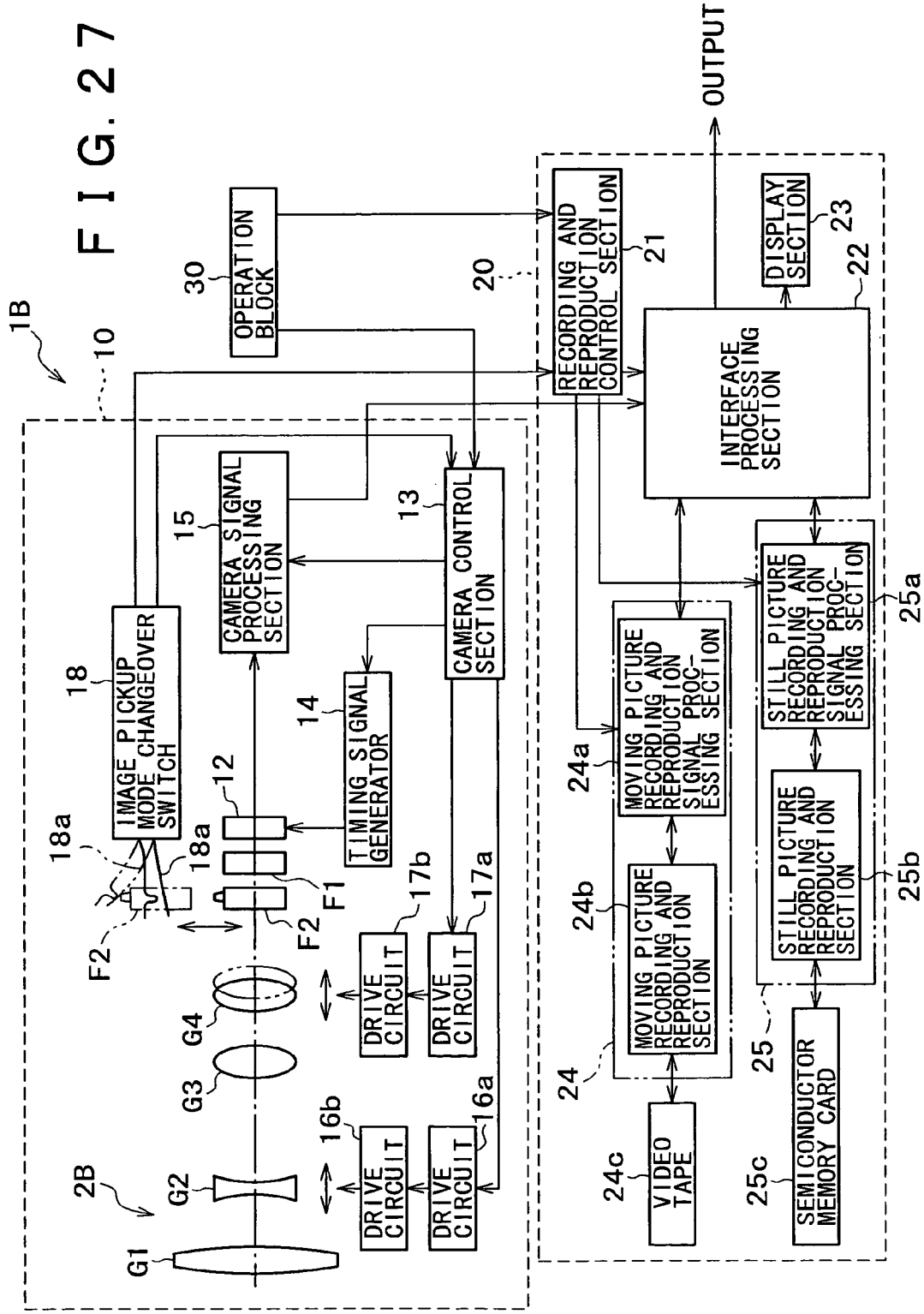

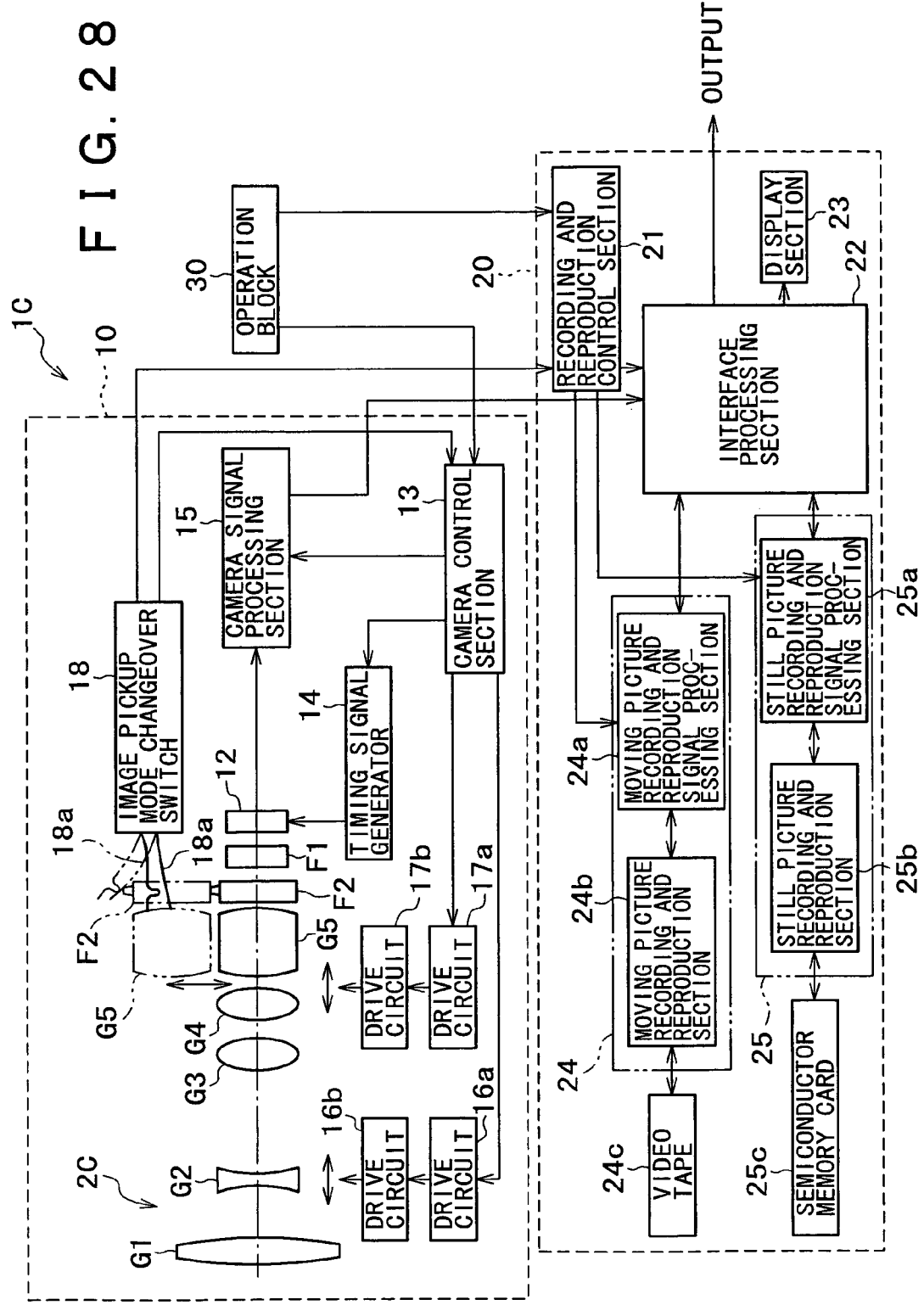

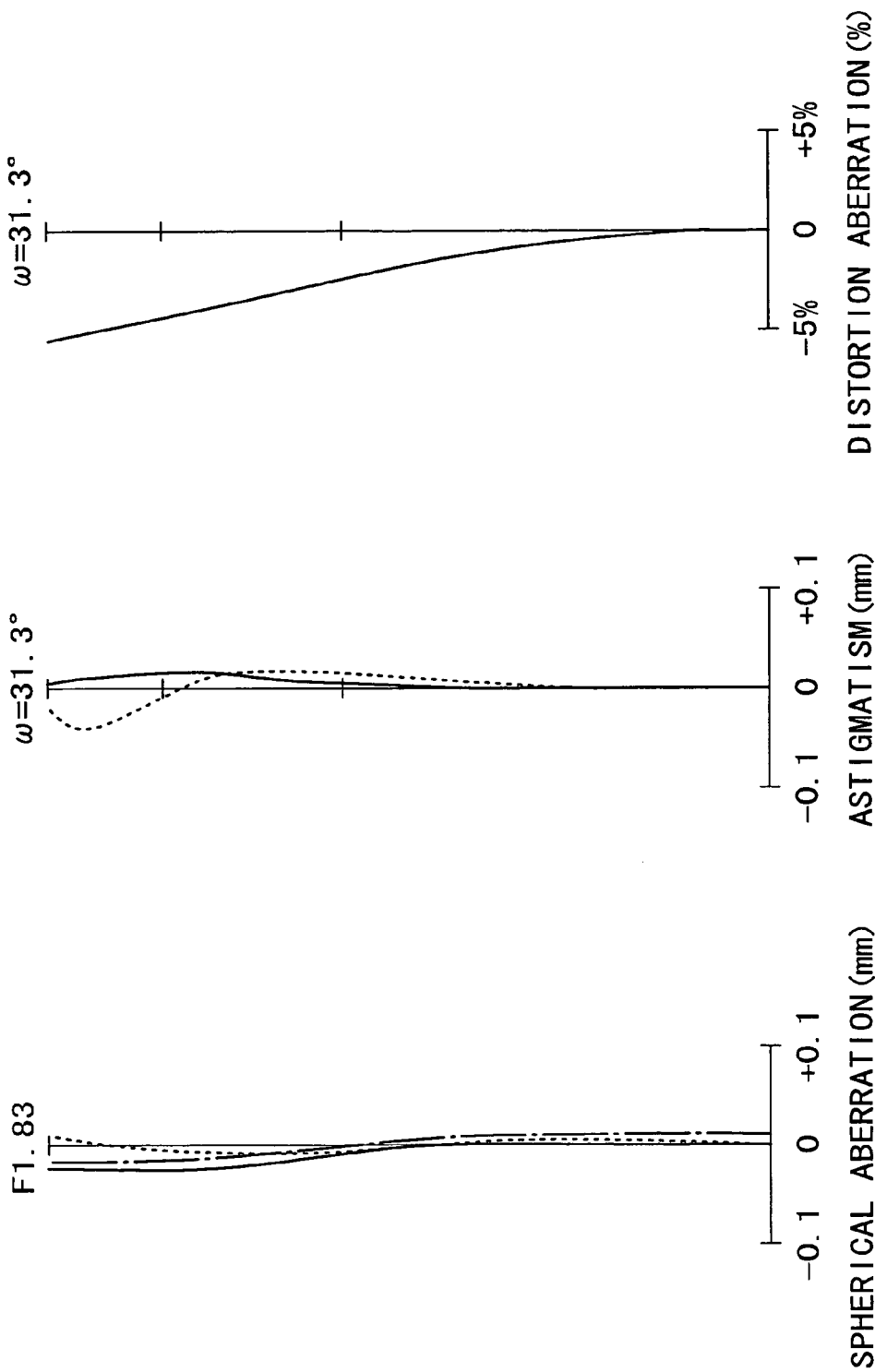

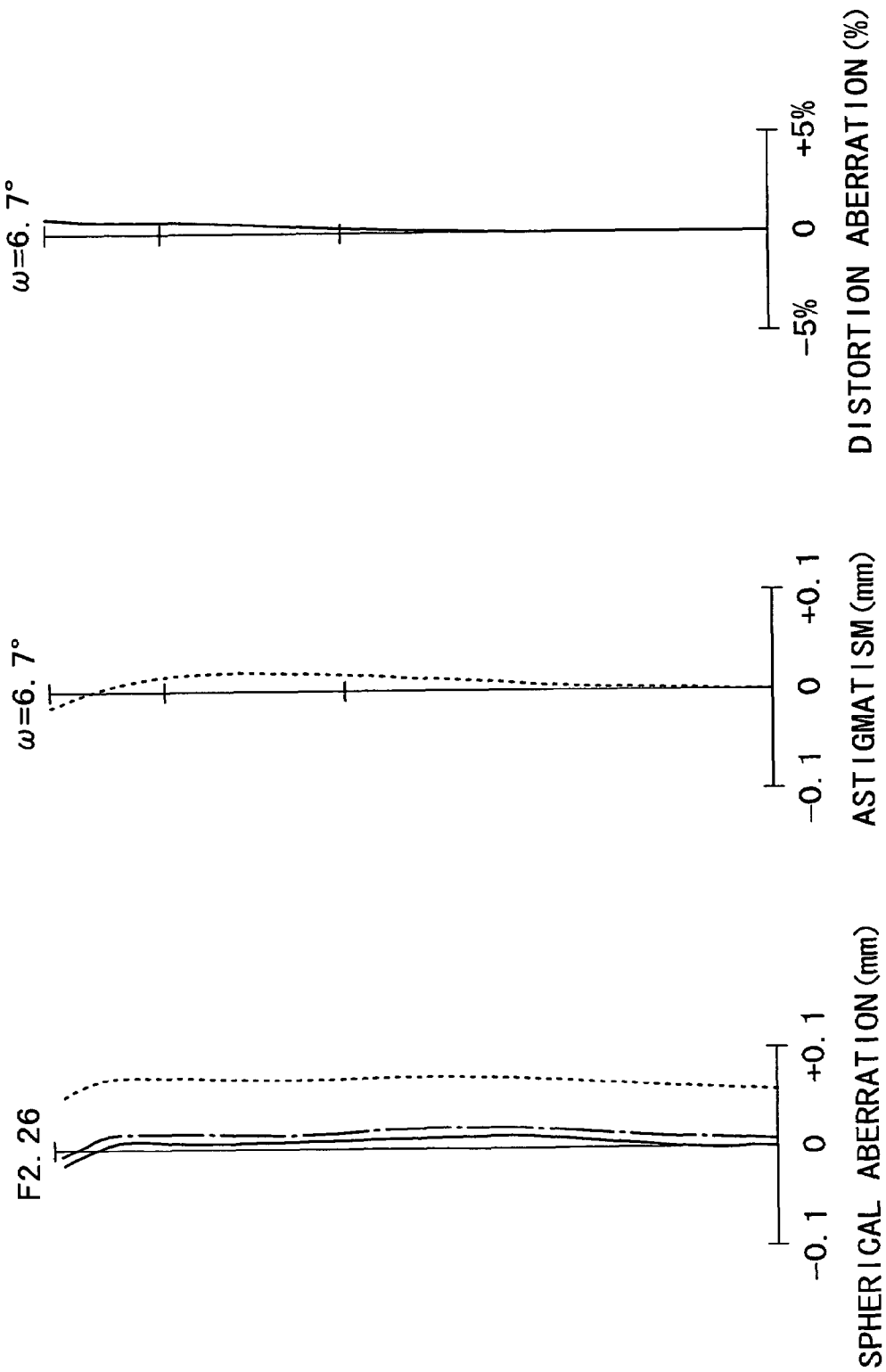

IMAGING DEVICE AND ZOOM LENS

TECHNICAL FIELD

The present invention relates to an image pickup apparatus and a zoom lens. More particularly, the present invention relates to a technique by which the variation of the angle of view is moderated and a good pickup image picture quality can be achieved in an image pickup apparatus and a zoom lens wherein, between upon still picture image pickup and upon moving picture image pickup, the effective screen region is changed to vary the angle of view in response to changeover of the effective pixel pitch. The present invention further relates to a technique by which characteristics against a defect such as a color false signal or a moiré effect and a drop of the sharpness caused by an optical low pass filter can be maintained in a well-balanced state by changing over an optical characteristic of the optical color filer in accordance with changeover of the pixel pitch in an image pickup apparatus wherein the effective pixel pitch is changed over between upon still picture image pickup and upon moving picture image pickup.

BACKGROUND ART

Image pickup apparatus are available wherein a still picture mode for picking up a still picture and a moving picture mode for picking up moving pictures are selectively changed over to record moving pictures onto a tape-like recording medium and record a still picture into a semiconductor recording medium. One of image pickup apparatus of the type mentioned is a video camera wherein a CCD (charge-coupled device) unit which uses more than 1,000,000 pixels in an effective screen region upon still picture image pickup as an image pickup element to recode moving pictures onto a tape-like magnetic recording medium and record a still picture into a removable semiconductor recording medium.

In the video camera described above, upon still picture image pickup, image information over the overall effective screen region is read out. However, upon moving picture image pickup, only image information within a screen region narrower than that upon still picture image pickup is read out effectively. The reason is such as follows. Since the number of frames and the number of fields per 1 second are determined by the prescription of a television system, it is necessary to read out all information from those pixels in the effective screen region for a moving picture within the thus determined period of time of one frame. In order to read out a number of pieces of pixel information as great as the number of pieces of pixel information for a still picture within the limited period of time, it is effective to raise the driving frequency for the CCD unit. However, if it is tried to read out pixel information from all of the effective pixels for each frame, then the frequency for driving the CCD unit becomes so high that the amplitude of the current waveform obtained from the CCD unit cannot be transmitted correctly. Therefore, the number of pixels to be read out for a moving picture is limited to an upper limit to the frequency with which the CCD unit can be driven and the period of time of one frame in a television system. Therefore, it cannot sometimes be avoided to set the effective screen size smaller than that upon still picture image pickup (to reduce the number of pixels to be read out effectively). Further, as the driving frequency for the CCD unit increases, the level of unnecessary radiations from the image pickup apparatus rises, and this has a bad influence on another communication equipment or electronic equipment.

Also a video camera is available wherein a region of a CCD unit from which pixel information is not read out upon moving picture image pickup as described above is used to successively move a cut-out position for a moving picture screen for every frame based on information of detection of a camera shake to perform camera-shake correction.

Accordingly, in such video cameras as described above, since the sizes of the effective screen regions for a moving picture and for a still picture are different from each other, when the video camera is changed over from a still picture image pickup state to a moving picture image pickup state, the angle of view is reduced at a wide angle end (the angle of view is shifted to the tele-side). This sometimes gives a sense of incongruity to the user.

For example, a video camera wherein the effective pixel number upon still picture image pickup is approximately 1,000,000 and approximately 690,000 pixels are read out in a period of time for one frame upon moving picture image pickup is known as an example. In another video camera wherein the effective pixel number upon still picture image pickup is approximately 1,400,000, the effective screen for a moving picture is divided into two left and right portions, and different drive circuits are used for the left and right portions to read out pixel information. Then, the thus read out left and right screens are joined together by an image processing circuit to form a screen for one frame. Thus, the image pickup element is divided into two left and right portions and the driving frequency for the left and right screens is lowered to achieve use of a greater number of pixels. In the example described, while the effective pixel number upon still picture image pickup is approximately 1,400,000, the effective pixel number upon moving picture image pickup is approximately 970,000. Thus, a result is achieved that the tele-shift ratio upon changeover from the still picture image pickup state to the moving picture image pickup state can be raised to approximately 1.2 times as substantially equal to that of the video camera described above which has approximately 1,000,000 pixels.

Also a further video camera has been realized wherein the effective pixel number upon still picture image pickup is approximately 1,920,000. However, the video camera adopts, as a countermeasure for lowering the driving frequency for an image pickup element, only a technique of dividing the effective screen into two left and right portions to read out pixel information similarly to the video camera described above which has approximately 1,400,000 pixels. Therefore, the tele-shift ratio upon changeover to moving picture image pickup rises to approximately 1.33 times, resulting in further increase of the sense of incongruity of the user.

It is to be noted that a zoom lens used in the video camera described above includes second to fourth lens sets having movable positions and arranged so as to have positive, negative, positive and positive refractive powers in order from the object side. One of such zoom lenses is disclosed in Japanese Patent Laid-Open No. Sho 62-178917 (hereinafter referred to as patent document 1). Another one of such zoom lenses is disclosed in Japanese Patent Laid-Open No. Hei 4-13110 (hereinafter referred to as patent document 2) which includes second to fourth lens sets having movable positions and arranged so as to have positive, negative, positive, positive and positive refractive powers in order from the object side. The zoom lenses disclosed in the patent documents and Japanese Patent Publication No. Sho 57-15369 (hereinafter referred to as patent document 3) have a tendency that, where the zoom ratio is set to approximately 10, if the angle of view at the wide angle end is set to an extremely wide angle with respect to that corresponding to f=40 mm where it is converted into an angle of view of a silver salt film camera of the 35 mm size (such conversion is hereinafter referred to as 35 mm size conversion), then the front lens diameter becomes great as much and this makes the overall size of the zoom lens great.

The problem that a sense of incongruity is given to a user because the angle of view at the wide angle end becomes narrow when the video camera described above is changed over from a still picture mode to a moving picture mode can be eliminated if the following countermeasure is taken. In particular, the zoom range of the zoom lens used in the video camera described above is expanded from the zoom ratio of approximately 10 times to the wide angle side to raise the zoom ratio to 12 times. Then, in a still picture mode, the zoom lens is used as a 10-time zoom lens cutting off a zoom range on the wide angle side, but in a moving picture mode, the lens is used as a 12-time zoom lens. However, if the zoom ratio is raised in vain only in order to prevent such a sense of incongruity to a user, then the overall size of the entire zoom lens is increased.

In conformity with the improvement in print quality of a printer in recent years, it is demanded to further improve the picture quality of a still picture of an image pickup apparatus, and in the field of digital still cameras designed principally for still picture image pickup, those digital still cameras wherein the effective pixel number of approximately 3,000,000 are prevailing. Further, also in the field of digital still cameras designed principally for still picture image pickup, those digital still cameras which additionally have a moving picture image pickup function and can record moving picture images which do not conform to a television system into a semiconductor recording medium similarly to a picked up still image are increasing. However, since the recording time for moving pictures is short and the recording system does not conform to a television system, the moving picture image pickup function is a mere additional function at all.

Thus, as a potential demand of consumers, it is demanded to use a single image pickup apparatus which has both of a function of recording a still picture of a high picture quality and another function of recording moving pictures in conformity with a television system for a long period of time and can record a still picture of a high picture quality into a semiconductor recording medium and record moving pictures onto a video tape having a long recording period of time through arbitrary selection.

However, where the effective pixel number of a still picture exceeds approximately 2,000,000, only if the screen for a moving picture is divided into two left and right portions as described above as a countermeasure for reducing the driving frequency for an image pickup element, a sufficient effect cannot be anticipated. Rather, it is estimated that the tele-shift ratio upon changeover from still picture recording to moving picture recording becomes higher than 1.33 times, resulting in further increase of the sense of incongruity which the user may have.

Ideally, a zoom lens is desirable which exhibits no change in angle of view even if the size of the effective screen region of the image pickup element changes as a result of changeover between image pickup modes for a still picture and moving pictures. However, since it is effective, upon moving picture image pickup, to correct a camera shake in order to improve the picture quality, a camera shake correction region within which the position at which the effective screen region of the image pickup element is to be cut out is varied in accordance with a camera shake need be covered widely with an effective image circle of the zoom lens. Therefore, it is permitted that the angle of view of the effective screen region for a moving picture becomes narrower than the angle of view of the effective image circle of the zoom lens by an amount by which the effective screen region of the image pickup element is cut with the camera shape correction region. Further, the camera shake correction region need not necessarily have a fixed screen area over the overall zoom region of the zoom lens, but may have a small area at the wide angle end if it is taken into consideration to fix the camera shake correction angle. Thus, the camera shake correction region need not necessarily occupy 20% as in the case of the video camera described hereinabove.

Therefore, it is a possible idea to employ a method wherein a new lens system is additionally provided for a zoom lens to shift the focal length range to moderate the change of the angle of view between upon moving picture image pickup and upon still picture image pickup in order to eliminate the sense of incongruity of the user upon changeover between the still picture image pickup mode and the moving picture image pickup mode.

It is to be noted that, as a technique for shifting the focal length range of a zoom lens, a method wherein a so-called tele-conversion lens having a negative refractive power is interposed between the zoom lens and an image pickup plane to shift the focal length in the overall power variation region to the longer side is known. Another method wherein a lens system called extender is inserted in a relay lens system of a zoom lens to shift the focal length to the longer side is also known. However, none of the method changes the dimension of the effective screen region of the image pickup element in response to shift of the focal length.

Incidentally, one of methods wherein a so-called tele-conversion lens having a negative refractive power is interposed between a zoom lens and an image pickup plane to shift the focal length in the overall power variation region to the longer side employs a configuration similar to that of the zoom lens disclosed in the patent document 1. Referring to FIGS. 38A and 38B, according to the method mentioned, a zoom lens "a" has a four-lens set configuration including first to fourth lens sets G1 to G4 of a positive-negative-positive-positive refractive power arrangement, and a negative lens system "b" is moved to and from a position on an optical axis between the fourth lens set G4 and an image pickup element IMG to shift the focal length range. In the zoom lens "a" described above, when the negative lens system "b" is positioned on the optical axis, the focal length over the overall power variation region is shifted to the longer side.

In the zoom lens "a" shown in FIG. 38B which uses the negative lens system "b" in order to shift the focal length range, the first lens set G1 and the third lens set G3 each having a fixed position with respect to the image plane during zooming are preferably held integrally in a fixed barrel together with the image pickup element IMG. In particular, where the first lens set G1 and the third lens set G3 which are fixed lens sets each having a fixed position and the image pickup element IMG are retained integrally in a lens barrel, it is easy to keep the distances between the lens sets and the distances from the lens sets to the image pickup element in good accuracy. Also it is easy to keep such error factors as inclinations of the lens sets with respect to the optical axis within respective necessary tolerances.

However, where the method as used by the zoom lens "a" wherein the negative lens system "b" is moved to and from the position on the optical axis is used, it is necessary to move the image pickup element IMG in a direction of the optical axis with respect to the first lens set G1 and the third lens set G3 which are fixed lens sets. Where the image pickup element IMG is supported for movement, a complicated mechanism is required for maintaining the accuracy in position of the image pickup element IMG in the direction of the optical axis and preventing inclination of the image pickup element IMG with respect to the optical axis. Consequently, there is a problem that the complicated mechanism is likely to make a significant factor of dispersion in performance of the zoom lens "a" upon mass production. Further, there is another problem that foreign articles such as dust are likely to be admitted to the proximity of the zoom lens "a" from the outside and are picked up as a shadow in a picked up image.

Further, according to the method wherein the focal length over an overall power variation region of a zoom lens is shifted to the longer side by means of a built-in extender, a wide air distance is provided in a relay lens system of the zoom lens in advance and the extender proximate to an afocal system like a telescope is inserted in the air distance. Accordingly, although the overall length of the zoom lens does not vary upon shifting of the focal length range, the overall length is liable to become long, and therefore, the method is disadvantageous in terms of miniaturization. Also it is a problem that, since the lens configuration of the extender to be inserted requires three to five lenses, the cost also becomes high and the space for retracting the extender from the position on the optical axis is required in the lens barrel, resulting in increase of the volume of the lens barrel.

Further, in such video cameras as descried above, in order to moderate such a defect as a color false signal or a moiré effect caused by discrete sampling of an image by the image pickup element, it is necessary to cut high frequency components of an image by means of an optical low pass filter. Crystal having double refraction such as quartz or lithium niobate crystal is normally used for an optical low pass filter. An example of a manner of effective use of an optical low pass filter is disclosed in the patent document 3 by the assignee of the present patent application, and the thickness of a double refraction plate is determined in accordance with the pixel pitch of the image pickup element.

Thus, it is a possible idea as a further reduction countermeasure for the driving frequency for an image pickup element to extract information obtained by mixing information extracted from each plurality of adjacent pixels from among pixels of an image pickup element as information of one pixel to effectively form an image having a rougher pixel pitch. For example, information of four adjacent pixels may be mixed so that it is equivalently regarded as information of one pixel to make the pixel pitch in the moving picture mode rougher thereby to reduce the driving frequency for the image pickup apparatus.

However, even if the driving frequency for an image pickup element in the moving picture mode can be reduced in this manner, the following optical problem appears. In particular, the frequency characteristic of such an optical low pass filter as disclosed in the patent document 3 should be determined in accordance with the pixel pitch in the still picture mode. Thus, if it is determined in accordance with the pixel pitch used when information of a plurality of pixels is mixed in the moving picture mode, then the MTF (Modulation Transfer Function) of the still picture lowers. As a result, a high picture quality which makes the most of, for example, 3,000,000 or more effective pixels cannot be obtained. However, if a moving picture wherein information of a plurality of pixels is mixed to produce information of one pixel while the low pass characteristic conforming to the pixel pitch of the still picture mode is maintained, then a defect such as a color false signal or a moiré effect which is caused by discrete sampling of image information appears remarkably. This is not preferable to the picture quality of moving pictures.

Taking the foregoing problems described above, it is a subject of the present invention that, in an image pickup apparatus having a still picture image pickup mode and a moving picture image pickup mode, and a zoom lens for use with the image pickup apparatus, even if the dimension of an effective screen region of an image pickup element changes as a result of changeover of the image pickup mode between a still picture image pickup mode and a moving picture image pickup mode, the angle of view changes but less conspicuously and good aberration correction can be achieved both in the still picture image pickup mode and in the moving picture image pickup mode.

It is another subject of the present invention to provide, in an image pickup apparatus wherein an effective pixel pitch is changed over between a still picture mode and a moving picture mode, an appropriate optical low pass effect in each image pickup mode by changing over the characteristic of an optical low pass filter in accordance with changeover of the pixel pitch and to make it possible, in an image pickup apparatus wherein the pixel pitch and the effective screen size are changed over between the still picture mode and the moving picture mode, to simultaneously achieve changeover of the characteristic of the optical low pass filter and moderation of the change of the angle of view at the wide angle end of a zoom lens.

DISCLOSURE OF INVENTION

In order to solve the subjects described above, according to the present invention, an image pickup apparatus which includes a zoom lens and an image pickup element and has a first image pickup mode and a second image pickup mode which can be arbitrarily selected upon image pickup by the image pickup apparatus, the image pickup element having an image pickup plane which is used, when the first image pickup mode is selected, over a range as great as possible as an effective screen region but is used, when the second image pickup mode is selected, over a smaller range than that when the first image pickup mode is selected as an effective screen region, is configured such that the zoom lens includes an additional lens set having a positive refractive index and provided at a position nearest to the image side for movement to and from a position on an optical axis of the zoom lens, that the additional lens set is moved, in response to changeover from the first image pickup mode to the second image pickup mode, to the position on the optical axis to reduce a focal length range of the zoom lens but is moved, in response to changeover from the second image pickup mode to the first image pickup mode, from the position on the optical axis to increase the focal length range thereby to moderate a variation of an angle of view which is caused by a difference in range of the effective screen region of the image pickup element when the first image pickup mode is selected and when the second image pickup mode is selected, and that the movement of the additional lens set to and from the position on the optical axis is detected to set components of the image pickup apparatus to respective conditions suitable for the first image pickup mode or the second image pickup mode.

Meanwhile, according to the present invention, a zoom lens which includes, in order from the object side, a first lens set having a positive refractive index and having a normally fixed position, a second lens set having a negative refractive index and movable along an optical axis to principally perform power variation, a third lens set having a positive refractive index and having a normally fixed position, a fourth lens set having a positive refractive index and movable along the optical axis to perform correction of a variation of the image position and focusing, and an additional lens set having a positive refractive index, is configured such that the additional lens set includes, in order from the object side, a cemented lens of a biconvex lens whose face on the object side is formed as an aspheric face and a biconcave lens and is movable to and from a position on the optical axis, and shifts the focal length range of the entire lens system between when the additional lens set is positioned on the optical axis and when the additional lens set is positioned outside the optical axis, and that the zoom lens satisfies conditions of $0.7<S5/fw2<2.5$, $-0.11<fw2\cdot(n52-n51)/r52<-0.085$, $0.003<\Delta5/fw2<0.01$ where S5 is the total thickness of the additional lens set, fw2 the focal length at the wide angle end of the lens system including the first to fourth lens sets and the additional lens set, n51 the refractive index of the biconvex lens of the additional lens set on a "d" line, n52 the refractive index of the biconcave lens of the additional lens set on the "d" line, r52 the radius of curvature of the interface of the additional lens set, and $\Delta5$ the amount of deformation of the aspheric face of the additional lens set from a generating face at a position of an effective radius (the deformation amount is in the positive where the deformation amount is provided on the image side).

In the image pickup apparatus and the zoom lens of the present invention, when the first image pickup mode is selected, the additional lens set is moved away from the position on the optical axis to extend the focal length range. On the other hand, when the second image pickup mode is selected, the additional lens set is moved to the position on the optical axis to reduce the focal length range. Consequently, a variation of the angle of view upon image pickup which is caused by a difference in size of the effective screen region between the first image pickup mode and the second image pickup mode is moderated.

According to the present invention, another image pickup apparatus which includes a zoom lens and an image pickup element and has a first image pickup mode and a second image pickup mode which can be arbitrarily selected upon image pickup by the image pickup apparatus, the image pickup apparatus being configured such that, when the first image pickup mode is selected, individual information obtained from each of pixels of the image pickup element is extracted as information of one pixel to form an image, but when the second image pickup mode is selected, information obtained by mixing information obtained from each plurality of adjacent ones of the pixels of the image pickup element is extracted as information of one pixel to form an image having a pixel pitch rougher than that of the image obtained in the first image pickup mode, is configured such that the image pickup apparatus comprises two different optical low pass filters F1 and F2 having different characteristics from each other for being selectively moved to respective positions on an optical axis between the zoom lens and the image pickup element, that the second optical low pass filter to be positioned on the optical axis in the second image pickup mode has a characteristic that an MTF in a high frequency is lower than that of the first optical low pass filter F1 to be positioned on the optical axis in the first image pickup mode, and that states of pertaining components of the image pickup apparatus are set in conformity with the first image pickup mode or the second image pickup mode in response to detection of changeover of positioning of the first optical low pass filter F1 or the second optical low pass filter F2 on the optical axis.

According to the present invention, a further image pickup apparatus which includes a zoom lens and an image pickup element and has a first image pickup mode and a second image pickup mode which can be arbitrarily selected upon image pickup by the image pickup apparatus, the image pickup apparatus being configured such that, when the first image pickup mode is selected, individual information obtained from each of pixels of the image pickup element is extracted as information of one pixel to form an image, but when the second image pickup mode is selected, information obtained by mixing information obtained from each plurality of adjacent ones of the pixels of the image pickup element is extracted as information of one pixel to form an image having a pixel pitch rougher than that of the image obtained in the first image pickup mode, is configured such that the image pickup apparatus comprises a fixed optical low pass filter normally positioned on an optical axis between the zoom lens and the image pickup element, and a movable optical low pass filter mounted for movement to and from a position on the optical axis, that the movable optical low pass filter is positioned outside the optical axis in the first image pickup mode, but in the second image pickup mode, the movable optical low pass filter is positioned on the optical axis so as to effectively act on the image of the effectively rougher pixel pitch which includes information obtained by mixing information of each plurality of adjacent ones of the pixels as information of one pixel, and that states of pertaining components of the image pickup apparatus are set in conformity with the first image pickup mode or the second image pickup mode in response to detection of the movement of the movable optical low pass filter to or from the position on the optical axis.

Accordingly, with both of the image pickup apparatus, the optical low pass filters which conform to the effective pixel pitches to be used in the first image pickup mode and the second image pickup mode are selectively positioned on the optical axis.

According to the present invention, a still further image pickup apparatus which includes a zoom lens and an image pickup element and has a first image pickup mode and a second image pickup mode which can be arbitrarily selected upon image pickup by the image pickup apparatus, the image pickup apparatus being configured such that, when the first image pickup mode is selected, an image pickup plane of the image pickup element is used over a range as great as possible as an effective screen region and individual information obtained from each of pixels of the image pickup element is extracted as information of one pixel to form an image, but when the second image pickup mode is selected, the image pickup plane of the image pickup element is used over a smaller range than that when the first image pickup mode is selected as an effective screen region and information obtained by mixing information obtained from each plurality of adjacent ones of the pixels of the image pickup element is extracted as information of one pixel to form an image having a pixel pitch rougher than that of the image obtained in the first image pickup mode, is configured such that a normally fixed optical low pass filter is disposed on an optical axis between the zoom lens and the image pickup element, that the zoom lens includes, at a position nearest to the image side, an additional lens set having a positive refractive index and provided for movement to and from a position on the optical axis and a movable optical low pass filter mounted for integral movement with the additional lens set, that the additional lens set and the movable optical low pass filter are moved, in response to changeover from the first image pickup mode to the second image pickup mode, to the respective positions on the optical axis to shift a focal length range of the zoom lens to the shorter side and provide a low pass effect corresponding to the rougher pixel pitch but are moved, in response to changeover from the second image pickup mode to the first image pickup mode, from the respective positions on the optical axis to shift the focal length range to the longer side thereby to moderate a variation of an angle of view which is caused by a difference in dimension of the effective screen region of the image pickup element when the first image pickup mode is selected and when the second image pickup mode is selected and provide a low pass effect corresponding to the finer pixel pitch, and that states of pertaining components of the image pickup apparatus are set in conformity with the first image pickup mode or the second image pickup mode in response to detection of the movement of the additional lens set and the movable optical low pass filter to or from the respective positions on the optical axis.

Accordingly, with the image pickup apparatus of the present invention, the optical low pass filters which conform to the effective pixel pitches to be used in the first and second image pickup modes are selectively positioned on the optical axis. Further, a variation of the angle of view which is caused by a difference in size of the effective screen region between the first image pickup mode and the second image pickup mode is moderated.

According to the present invention, another zoom lens which includes, in order from the object side, a first lens set having a positive refractive index and having a normally fixed position, a second lens set having a negative refractive index and movable along an optical axis to principally perform power variation, a third lens set having a positive refractive index and having a normally fixed position, a fourth lens set having a positive refractive index and movable along the optical axis to perform correction of a variation of the image position and focusing, an additional lens set having a positive refractive index, and a movable optical low pass filter, is configured such that the first lens set includes, in order from the object side, a cemented lens of a first lens in the form of a concave meniscus lens having a convex face directed to the object side and a second lens in the form of a convex lens, and a third lens in the form of a convex meniscus lens having a convex face directed to the object side, that the second lens set includes, in order from the object side, a cemented lens of a fourth lens in the form of a concave lens, a fifth lens in the form of a biconcave lens and a sixth lens in the form of a convex lens, that the third lens set includes a seventh lens in the form of a biconvex lens having faces at least one of which is an aspheric face, that the fourth lens set includes, in order from the object side, a three-element cemented lens of an eighth lens in the form of a convex lens, a ninth lens in the form of a concave lens and a tenth lens in the form of a convex lens, and at least one of a face of the fourth lens set most adjacent the object side and a face of the fourth lens set most adjacent the image side is formed as an aspheric face, that the additional lens set includes, in order from the object side, a cemented lens of a biconvex lens whose face on the object side is formed as an aspheric face and a biconcave lens, that the movable optical low pass filter is held integrally with the additional lens set on the image side with respect to the additional lens set for movement to and from the position on the optical axis, that the additional lens set and the movable optical low pass filter shift the focal length range of the zoom lens between when the additional lens set and the movable optical low pass filter are positioned on the optical axis and when the additional lens set and the movable optical low pass filter are positioned outside the optical axis, and that the zoom lens satisfies conditions of $0.7<S5/fw2<2.5$, $-0.11<fw2\cdot(n52-n51)/r52<-0.085$, $0.003<\Delta5/fw2<0.01$, and $2.5<f4/fw2<5$ where S5 is the total thickness of the additional lens set, fw2 the focal length at the wide angle end of the lens system including the first to fourth lens sets and the additional lens set, n51 the refractive index of the biconvex lens of the additional lens set on a "d" line, n52 the refractive index of the biconcave lens of the additional lens set on the "d" line, r52 the radius of curvature of the interface of the additional lens set, and $\Delta5$ the amount of deformation of the aspheric face of the additional lens set from a generating face at a position of an effective radius (the deformation amount is in the positive where the deformation amount is provided on the image side), and f4 the focal length of the fourth lens set.

Accordingly, with the zoom lens of the present invention, the optical low pass filters which conform to the effective pixel pitches to be used in the first and second image pickup modes are positioned on the optical axis. Further, a variation of the angle of view which is caused by a difference in size of the effective screen region between the first image pickup mode and the second image pickup mode is moderated. Furthermore, in the first and second image pickup modes, various aberrations are corrected favorably.

BRIEF DESCRIPTION OF DRAWINGS

FIG. 3 is a perspective view showing a lens holding frame member and a guide frame when the additional lens set is not positioned on the optical axis;

FIG. 4 is a schematic view showing the lens holding frame member and the guide frame when the additional lens set is not positioned on the optical axis as viewed along the optical axis;

FIGS. 10A to 10C are views illustrating various aberrations at a wide angle end of the numerical value example 1 of the zoom lens of the present invention;

FIGS. 11A to 11C are views illustrating various aberrations at an intermediate focus position of the numerical value example 1 of the zoom lens of the present invention;

FIGS. 26A and 26B are schematic views illustrating how to read out pixels from a still picture and a moving picture in the second embodiment and a third embodiment of the image pickup apparatus;

FIG. 27 is a block diagram showing a configuration of the third embodiment of the image pickup apparatus of the present invention;

FIG. 28 is a block diagram showing a configuration of a fourth embodiment of the image pickup apparatus of the present invention;

FIGS. 29A and 29B are schematic views illustrating how to read out pixels from a still picture and a moving picture in the fourth embodiment of the image pickup apparatus;

FIGS. 35A to 35C are views illustrating various aberrations at the wide angle end of the numerical value example 6 of the zoom lens of the present invention;

FIGS. 36A to 36C are views illustrating various aberrations at the intermediate focus position of the numerical value example 6 of the zoom lens of the present invention;

BEST MODE FOR CARRYING OUT THE INVENTION

Figure 1:
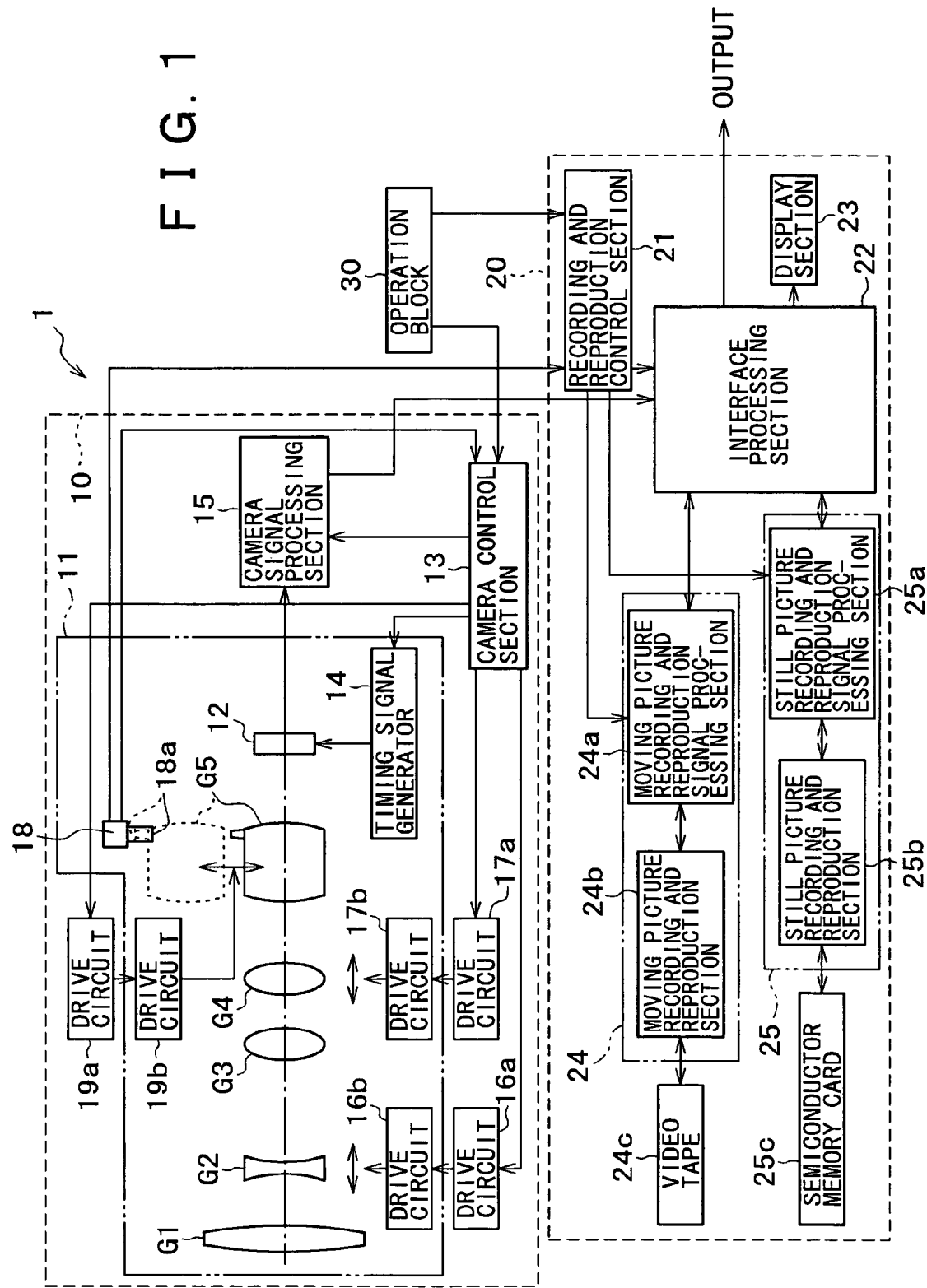
FIG. 1 shows a first embodiment of an image pickup apparatus of the present invention together with FIGS. 2 to 7 and is a block diagram schematically showing a configuration of the image pickup apparatus.

In the following, embodiments of an image pickup apparatus and a zoom lens of the present invention are described with reference to the accompanying drawings. It is to be noted that, in the embodiments described below, the present invention is applied to an image pickup apparatus having a still picture image pickup mode and a moving picture image pickup mode and a zoom lens for use with the image pickup apparatus.

FIGS. 1 to 7 show a first embodiment 1 of the image pickup apparatus of the present invention.

The image pickup apparatus 1 includes a zoom lens 2 and an image pickup element, and has a first image pickup mode and a second image pickup mode which can be arbitrarily selected upon image pickup. An image pickup plane of the image pickup element is controlled such that, when the first image pickup mode is selected, a wide range as far as possible is used as an effective screen region, but when the second image pickup mode is selected, a narrower range than that when the first image pickup mode is selected is used as an effective screen region.

The zoom lens 2 used in the image pickup apparatus 1 includes an additional lens set (fifth lens set) having a positive refractive power and positioned most adjacent the image side such that it is moved to and from a position on an optical axis of the zoom lens 2. When the image pickup mode is changed over from the first image pickup mode to the second image pickup mode, the additional lens set is moved to the position on the optical axis to reduce the focal length range of the zoom lens. However, when the image pickup mode is changed over from the second image pickup mode to the first image pickup mode, the additional lens set is moved from the position on the optical axis to increase the focal length range to moderate a variation of the angle of view caused by a difference in dimension between the effective screen regions of the image pickup element when the first image pickup mode is selected and when the second image pickup mode is selected.

In the image pickup apparatus 1, the conditions of the components are set in accordance with the first image pickup mode or the second image pickup mode when it is detected that the additional lens set is moved to or from the position on the optical axis.

Normally, a still picture image pickup mode for picking up a still picture is allocated to the first image pickup mode, and a moving picture image pickup mode for picking up a moving picture is allocated to the second image pickup mode.

If it is assumed that the diagonal dimension of the effective screen region of the image pickup element is 1 in the moving picture image pickup mode but 1+a in the still picture image pickup mode, then the image pickup apparatus 1 satisfies a condition of 0.4a<fw1/fw2−1<1.1a (conditional expression 1). Here, fw1 represents the focal length at the wide angle end of the zoom lens in the still picture image pickup mode, and fw2 represents the focal length at the wide angle of the zoom lens in the moving picture image pickup mode.

Further, the zoom lens 2 used in the image pickup apparatus 1 includes a plurality of fixed lens sets each having a normally fixed position and a movable lens set having a movable position. The fixed lens sets and the image pickup element are held integrally in a fixed lens barrel such that they have a fixed positional relationship so that the image forming position may be kept fixed irrespective of whether the additional lens set is moved to or from the position on the optical axis.

Now, an internal configuration of the image pickup apparatus 1 is described with reference to a block diagram of FIG. 1.

The image pickup apparatus 1 has a moving picture image pickup mode and a still picture image pickup mode as image pickup modes thereof and uses a zoom lens 2 having five lens sets as an image pickup lens thereof. The image pickup apparatus 1 includes a camera block 10, a recording and reproduction block 20 and an operation block 30. The camera block 10 picks up a video image and converts the picked up video image information into an electric signal. The recording and reproduction block 20 records the video image information outputted from the camera block 10 onto a recording medium and reproduces the thus recorded video image information. The operation block 30 includes various operation switches not shown for being operated by a user.

The zoom lens 2 includes a first lens set G1, a second lens set G2, a third lens set G3, a fourth lens set G4 and a fifth lens set G5. The first lens set G1 has a positive refractive power and has a normally fixed position. The second lens set G2 has a negative refractive power and is movable along the optical axis to principally perform power variation. The third lens set G3 has a positive refractive power and has a normally fixed position. The fourth lens set G4 has a positive refractive power and is movable along the optical axis to perform correction for a variation of the image position and focusing. The fifth lens set G5 has a positive refractive power and functions as an additional lens set which can be moved to and from the position on the optical axis. It is to be noted that the additional lens set G5 is moved to or from the position on the optical axis in response to selection of one of the moving picture image pickup mode and the still picture image pickup mode.

The camera block 10 includes a zoom lens block 11, the image pickup element 12, a camera control section 13, a timing signal generator 14, a camera signal processing section 15, drive circuits 16a and 17a, and a drive circuit 19a. The camera control section 13 controls operation of the components of the camera block 10. The timing signal generator 14 applies a timing signal which makes a reference to a readout timing of a video signal to the image pickup element 12. The camera signal processing section 15 processes a video signal outputted from the image pickup element 12. The drive circuits 16a and 17a drive the second lens set G2 and the fourth lens set G4 of the zoom lens 2, respectively. The drive circuit 19a drives the additional lens set G5 hereinafter described.

The zoom lens block 11 includes, the zoom lens 2, drive apparatus 16b and 17b, a position detection switch 18, and a drive apparatus 19b. The drive apparatus 16b and 17b drive the second lens set G2 and the fourth lens set G4, which are movable lenses of the zoom lens 2, to move, respectively. The position detection switch 18 detects movement of the fifth lens set G5 to and from the position on the optical axis. The drive apparatus 19b drives the additional lens set G5 to move to or from the position on the optical axis in accordance with an instruction from the drive circuit 19a for the additional lens set G5.

Figure 2:
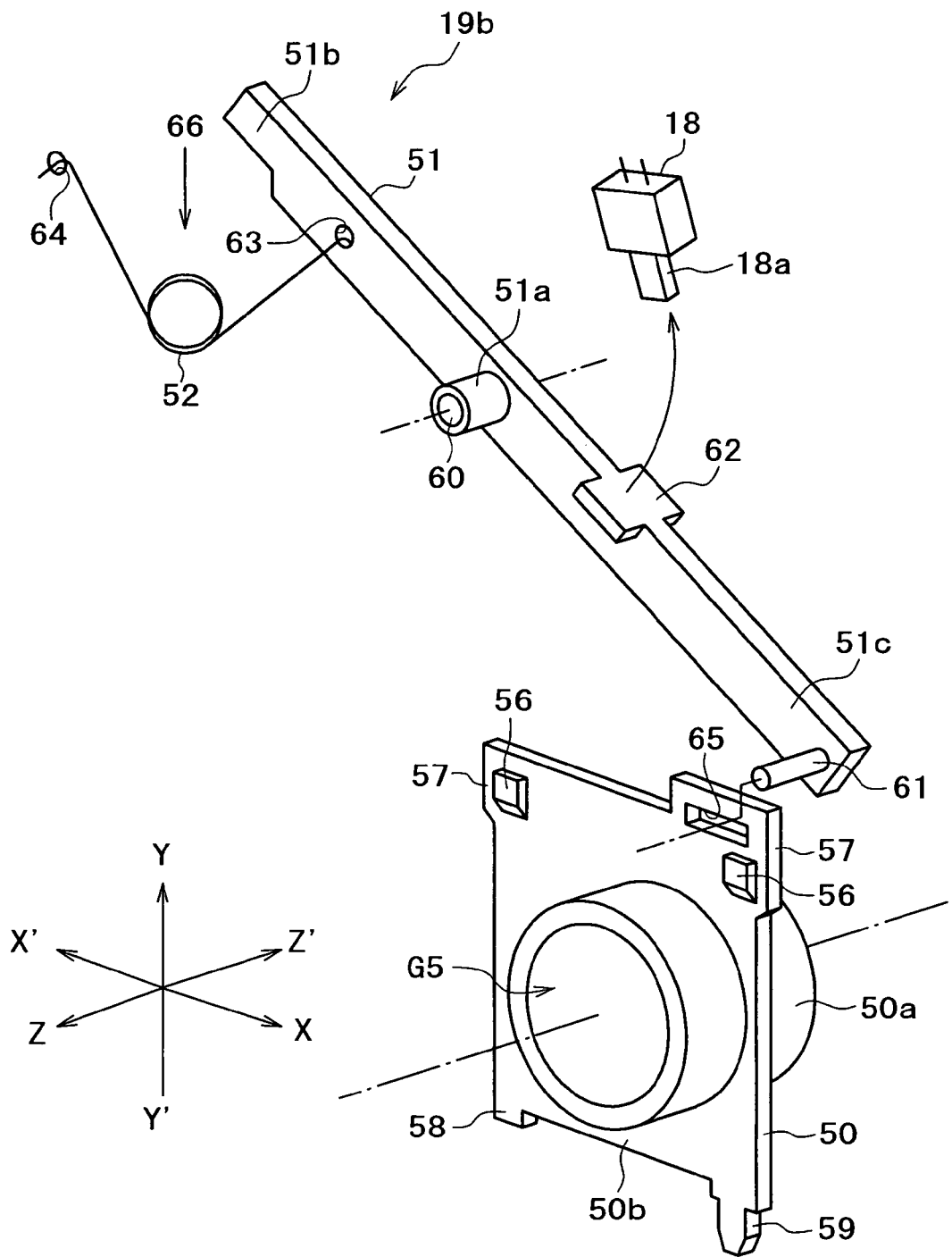
FIG. 2 shows an example of a driving apparatus for moving an additional lens set to and from a position on an optical axis of a zoom lens together with FIGS. 3 to 7 and is an exploded perspective view showing a configuration of the entire driving apparatus.

Referring to FIGS. 1 and 2, the position detection switch 18 has a pressed piece 18a and a contact not shown and is electrically connected to the camera control section 13 and a recording and reproduction control section hereinafter described. It is to be noted that the pressed piece 18a is biased by a biasing element not shown such that it projects outward when it is not pushed by external force. If the pressed piece 18a is pushed from the outside, then the internal contact of the position detection switch 18 is pushed and closed by the pressed piece 18a, but if the force for pushing the pressed piece 18a from the outside is canceled, then the pressed piece 18a is projected outward by a greater amount than that indicated by a solid line from the pushed position indicated by a broken line in FIG. 1 to open the internal contact.

In particular, the contact of the position detection switch 18 operates in an interlocking relationship with the movement of the additional lens G5 as seen in FIG. 1. More particularly, when the additional lens set G5 is moved from the position on the optical axis (state indicated by a broken line in FIG. 1), the contact of the position detection switch 18 is closed, but when the additional lens set G5 is moved to the position on the optical axis (state indicated by a solid line in FIG. 1), the contact is opened.

It is to be noted that a known lens driving mechanism is used for the drive apparatus 16b and 17b for the second lens set G2 and the fourth lens set G4 of the zoom lens 2 and they have no particularly restricted structure. Details of the drive apparatus 19b for moving the additional lens set G5 to and from the position on the optical axis are hereinafter described.

The recording and reproduction block 20 includes a recording and reproduction control section 21, an interface processing section 22, a display section 23 including a liquid crystal video image display apparatus and an electronic viewfinder not shown, a moving picture recording and reproduction system 24, and a still picture recording and reproduction system 25.

The moving picture recording and reproduction system 24 includes a moving picture recording and reproduction signal processing section 24a and a moving picture recording and reproduction section 24b. The still picture recording and reproduction system 25 includes a still picture recording and reproduction signal processing section 25a and a still picture recording and reproduction section 25b. The moving picture recording and reproduction section 24b performs recording and reproduction of moving picture information onto and from a video tape 24c. The still picture recording and reproduction section 25b performs recording and reproduction of still picture information into and from a memory card 25c. It is to be noted that the media mentioned above for recording picture information are mere examples, and the picture information mentioned may be recorded onto individually different recording media. For example, moving picture information may be recorded onto or reproduced from various recording media other than a video tape such as semiconductor memory devices such as a memory stick, optical disks such as a DVD (Digital Versatile Disc) and magnetic disks such as a hard disk. Also recording and reproduction of still picture information may be performed onto and from recording media other than a semiconductor memory card. It is to be noted that the problem of what kind of recording medium should be used as the recording medium similarly applies to image pickup apparatus 1A, 1B and 1C according to second to fourth embodiments hereinafter described.

In the image pickup apparatus 1 having such a configuration as described above, when the image pickup apparatus 1 is in the moving picture image pickup mode and the still picture image pickup mode, the components operate in the following manner.

If the moving picture image pickup mode is selected by a user, then the drive apparatus 19b is driven in accordance with an image pickup mode selection signal inputted from the operation block 30 to the drive circuit 19a through the camera control section 13. Consequently, the additional lens set G5 is moved to the position on the optical axis indicated by a solid line in FIG. 1 from a position outside a light path indicated by a broken line in FIG. 1. At this time, the internal contact of the position detection switch 18 is placed into an open state from a closed state.

When the contact of the position detection switch 18 is opened upon the movement of the additional lens set G5 to the position on the optical axis, the camera control section 13 sets the components of the camera block 10 to respective positions corresponding to the moving picture image pickup mode.

In the moving picture image pickup mode, a video signal formed from a number of scanning lines conforming to a television video signal system (the NTSC system or the PAL system) is outputted from the image pickup element 12 to the camera signal processing section 15 at prescribed field and frame timings.

Incidentally, the image pickup element 12 has an effective screen region having a very great number of pixels in order to output a still picture of a high definition image. Thus, the image pickup element 12 has a characteristic that, if it is driven with a timing signal of a very high frequency so that video signals of all of the pixels in the effective screen region may be read out within a period of time of one frame, then correct information cannot be obtained from the output signal of the image pickup element 12. Accordingly, when the moving picture image pickup mode is selected, the effective screen region of the image pickup element 12 is set to a narrower area than that in the still picture image pickup mode, and the camera control section 13 controls operation of the timing signal generator 14 so that video signals only in the effective screen region in the moving picture image pickup mode may be read out within a period of time of one frame.

A video signal outputted from the image pickup element 12 driven with the timing signal applied from the timing signal generator 14 undergoes such processes as sample hold, AGC and A/D conversion processes by the camera signal processing section 15 and is then sent to the recording and reproduction block 20.

Meanwhile, information of whether the contact of the position detection switch 18 is closed or open, that is, whether or not the additional lens set G5 is positioned on or moved from the optical axis, is detected also by the recording and reproduction control section 21 of the recording and reproduction block 20. Accordingly, if the additional lens set G5 is moved to the position on the optical axis, then the contact of the position detection switch 18 is opened, and the components of the recording and reproduction block 20 are set to respective conditions corresponding to the moving picture image pickup mode in accordance with an instruction of the recording and reproduction control section 21.

The video signal sent from the camera signal processing section 15 is inputted to the interface processing section 22 and is then sent to the moving picture recording and reproduction system 24 after it is processed so as to have a signal form suitable for recording of moving pictures under the control of the recording and reproduction control section 21. It is to be noted that, when the interface processing section 22 sends the video signal to the moving picture recording and reproduction system 24, it sends the video signal also to the display section 23 so that the display section 23 can display the video signal.

In the moving picture recording and reproduction system 24, the video signal inputted thereto from the interface processing section 22 is processed by the moving picture recording and reproduction signal processing section 24a so that the video signal may conform to a recording format determined in advance such as the DV (Digital Video) format. Then, the video signal is recorded onto the video tape 24c by the moving picture recording and reproduction section 24b which may include a mechanism deck and so forth not shown.

It is to be noted that reproduction of moving pictures is performed in response to an operation of an operation switch not shown of the operation block 30 by the user. The moving picture reproduction instruction by the user is inputted to the recording and reproduction control section 21 of the recording and reproduction block 20 through the operation block 30. Then, the recording and reproduction control section 21 sets the components of the recording and reproduction block 20 to conditions suitable for reproduction of moving pictures in accordance with the instruction. A video image of moving pictures reproduced by the moving picture recording and reproduction section 24b is displayed on the display section 23 and can also be outputted to the outside.

If the still picture image pickup mode is selected by the user, then the drive apparatus 19b is driven in accordance with the image pickup mode selection signal inputted from the operation block 30 to the drive circuit 19a through the camera control section 13. Consequently, the additional lens set G5 is driven to move from the position on the optical axis indicated by a solid line in FIG. 1 to the position outside the optical axis indicated by a broken line in FIG. 1. At this time, in the position detection switch 18, the pressed piece 18a is pushed to close the internal contact, and consequently, the movement of the additional lens set G5 from the position on the optical axis is detected by the camera control section 13 and the recording and reproduction control section 21 based on a signal outputted from the position detection switch 18 then.

After the internal contact of the position detection switch 18 is closed and the movement of the additional lens set G5 from the position on the optical axis is detected, then the camera control section 13 sets the components of the camera block 10 to conditions corresponding to the still picture image pickup mode.

Upon still picture image pickup, a video signal read out from the image pickup element 12 need not be converted so as to conform to a television video signal system, and there is no restriction with respect to time necessary to read out information for one screen. Accordingly, the image pickup element 12 has an effective screen region of a greater area than that in the moving picture image pickup mode, and the camera control section 13 controls operation of the timing signal generator 14 so as to assure sufficient time to read out all pixel information of the effective screen region of the greater area.

The video signal read out from the image pickup element 12 with the timing signal applied from the timing signal generator 14 undergoes such processes as sample hold, AGC and A/D conversion processes by the camera signal processing section 15 and is then sent to the recording and reproduction block 20.

Further, when the contact of the position detection switch 18 is closed, the components of the recording and reproduction block 20 are set to respective conditions corresponding to the still picture image pickup mode in accordance with an instruction of the recording and reproduction control section 21.

The video signal sent from the camera signal processing section 15 is inputted to the interface processing section 22 and worked into a signal of a signal form suitable for still picture recording under the control of the recording and reproduction control section 21. Then, a resulting signal is sent to the still picture recording and reproduction system 25. It is to be noted to that, when the interface processing section 22 sends the video signal to the still picture recording and reproduction system 25, it may simultaneously send the video signal also to the display section 23 so as to be displayed on the display section 23.

In the still picture recording and reproduction system 25, the video signal inputted from the interface processing section 22 is subject to suitable processes such as compression and is worked so as to conform to a recording format by the still picture recording and reproduction signal processing section 25a. Then, a resulting signal is recorded into the memory card 25c by the still picture recording and reproduction section 25b.

It is to be noted that reproduction of a still picture is performed in response to an operation of an operation switch not shown of the operation block 30 by the user. The instruction by the user to reproduce a still picture is inputted to the recording and reproduction control section 21 of the recording and reproduction block 20 through the operation block 30. Then, the recording and reproduction control section 21 sets the components to conditions suitable for still picture reproduction in accordance with the instruction. A video image of a still picture reproduced by the still picture recording and reproduction section 25b is displayed on the display section 23 and can also be outputted to the outside.

Now, a configuration of an example of the drive apparatus 19b for allowing the movement of the additional lens set G5 of the zoom lens 2 to and from the position on the optical axis is described with reference to FIGS. 2 to 7. It is to be noted that, as representations of directions used in the following description of the drive apparatus 19b, as indicated by arrow marks in FIG. 2, the direction of Y is defined as an upward direction, the direction of Y' as downward direction, the direction of X as a rightward direction, the direction of X' as a leftward direction, the direction of Z as forward direction, and the direction of Z' as rearward direction (also in FIGS. 3 to 7, the directions indicated in FIG. 2 are used).

The drive apparatus 19b for the additional lens set G5 includes, as shown in FIG. 2, a lens holding frame member 50 for holding the additional lens set G5, a driving lever 51, and a toggle spring 52. The drive apparatus 19b further includes a suitable driving mechanism not shown for driving the driving lever 51 to move the additional lens set G5 to and from the position on the optical axis of the zoom lens 2.

The lens holding frame member 50 holds the additional lens set G5 thereon. The lens holding frame member 50 is mounted for upward and downward (directions parallel to a plane perpendicular to the optical axis of the zoom lens 2) sliding movement under the guidance of a guide frame 54. As shown in FIG. 3, the guide frame 54 has a guide groove 54a and is provided at a predetermined position of a lens barrel 53 (only part is shown in FIG. 3) in which the entire zoom lens 2 is disposed. Accordingly, the additional lens set G5 can be moved to and from the position on the optical axis of the zoom lens 2 by slidably moving the lens holding frame member 50 downwardly and upward.

The lens holding frame member 50 includes a barrel portion 50a and the guide plate 50b as seen in FIGS. 2 and 3. The guide plate 50b is formed as a rectangular plate such that the dimension thereof in the upward and downward direction is a little greater than the dimension thereof in the leftward and rightward direction. The barrel portion 50a of a cylindrical shape is formed integrally on the guide plate 50b such that it extends through a central portion of the guide plate 50b. Thus, the lens holding frame member 50 is shaped such that the guide plate 50b projects outward like a flange from a substantially middle position of the barrel portion 50a in the forward and backward direction. Further, the additional lens set G5 is held on the barrel portion 50a.

The guide plate 50b has an elongated hole 55 formed at a right side portion of an upper portion thereof such that the elongated hole 55 extends in the leftward and rightward direction and is engageable with an engaging pin of the driving lever 51 hereinafter described.

Figure 5:
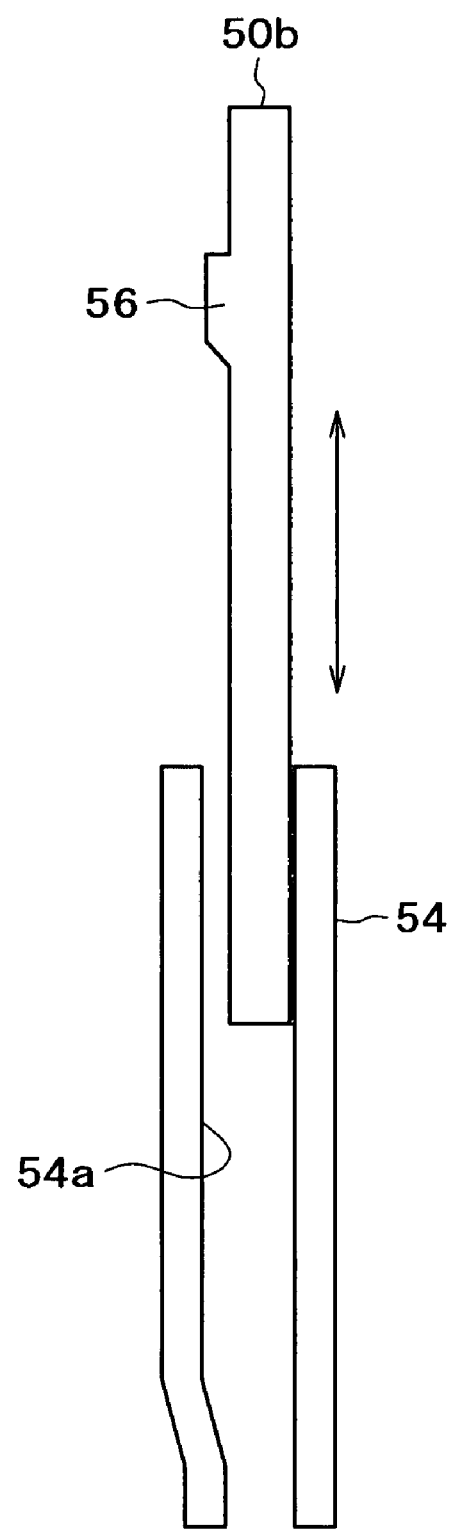
FIG. 5 is a vertical sectional view schematically showing the lens holding frame member and the guide frame when the additional lens set is not positioned on the optical axis.

It is to be noted that it is necessary for the lens holding frame member 50 to keep the accuracy in position of the additional lens set G5 such that, when the additional lens set G5 is moved to the position on the optical axis of the zoom lens 2 (when the image pickup apparatus 1 is in the moving picture image pickup mode), the optical axis of the additional lens set G5 and the optical axis of the zoom lens 2 may be registered fully with each other without being offset from each other and without inclination of the optical axis of the additional lens set G5. However, in order to assure smooth movement of the lens holding frame member 50, it is necessary to provide a slight gap between the guide grooves 54a, 54a of the guide frames 54, 54 and the guide plate 50b of the lens holding frame member 50 as seen in FIGS. 4 and 5.

To this end, positioning projections 56, 56 are provided integrally at upper ends of a front face of the guide plate 50b of the lens holding frame member 50 while positioning projections 57, 57 are provided integrally at upper ends of left and right side faces of the lens holding frame member 50. Further, a projection 58 is provided integrally at a left end portion of a lower face of the lens holding frame member 50 while an engaging projection 59 is provided integrally at a right end portion of the lower face of the lens holding frame member 50.

Thus, if the additional lens set G5 supported on the lens holding frame member 50 is moved to a position at which the optical axes of the lens holding frame member 50 and the zoom lens 2 are registered with each other, then the rear face of the guide plate 50b and forward, leftward, rightward and downwardly directed end faces of the positioning projections 56, 56 and the positioning projections, 57, 57, 58 are contacted with the guide grooves 54a of the guide frames 54 and the engaging projection 59 is engaged with an engaging hole 54b provided at a bottom portion of the guide frame 54. Consequently, when the additional lens set G5 is fully moved to the position on the optical axis of the zoom lens 2 under the guidance of the guide frames 54, the surplus gap between the guide plate 50b and the guide grooves 54a is removed to eliminate the play between them, and the optical axis of the additional lens set G5 and the optical axis of the zoom lens 2 are registered fully with each other.

A pivotal fulcrum portion 51a in the form of a forwardly projecting cylindrical projection is provided at a substantially middle position of the driving lever 51 in the longitudinal direction as seen in FIG. 2 such that the driving lever 51 can be pivoted around the pivotal fulcrum portion 51a. A pressed portion 51b and a driving portion 51c are provided at left and right end portions of the driving lever 51. The pressed portion 51b is engageable with a driving element not shown such that driving force is applied from the driving element to the pressed portion 51b. The driving portion 51c serves as a point of action.

A supported hole 60 is provided in the pivotal fulcrum portion 51a. A support shaft not shown provided on the lens barrel 53 is inserted in the supported hole 60 to support the driving lever 51 for pivotal motion with respect to the lens barrel 53. An engaging pin 61 is provided in a projecting manner at the driving portion 51c for slidably engaging with the elongated hole 55 of the lens holding frame member 50.

A contact pushing face 62 is provided at an intermediate position between the pivotal fulcrum portion 51a and the driving portion 51c of the driving lever 51 for pushing the pressed piece 18a of the position detection switch 18 described hereinabove to open or close the internal contact. The contact pushing face 62 is formed from a portion of an upper face of the driving lever 51 opposing to the position detection switch 18 which is swollen sideward.

Further, an anchoring hole 63 is provided at an intermediate position of the driving lever 51 between the pivotal fulcrum portion 51a and the pressed portion 51b, and the toggle spring 52 is interposed between the anchoring hole 63 and another anchoring hole 64 provided on the lens barrel 53.

Figure 6:
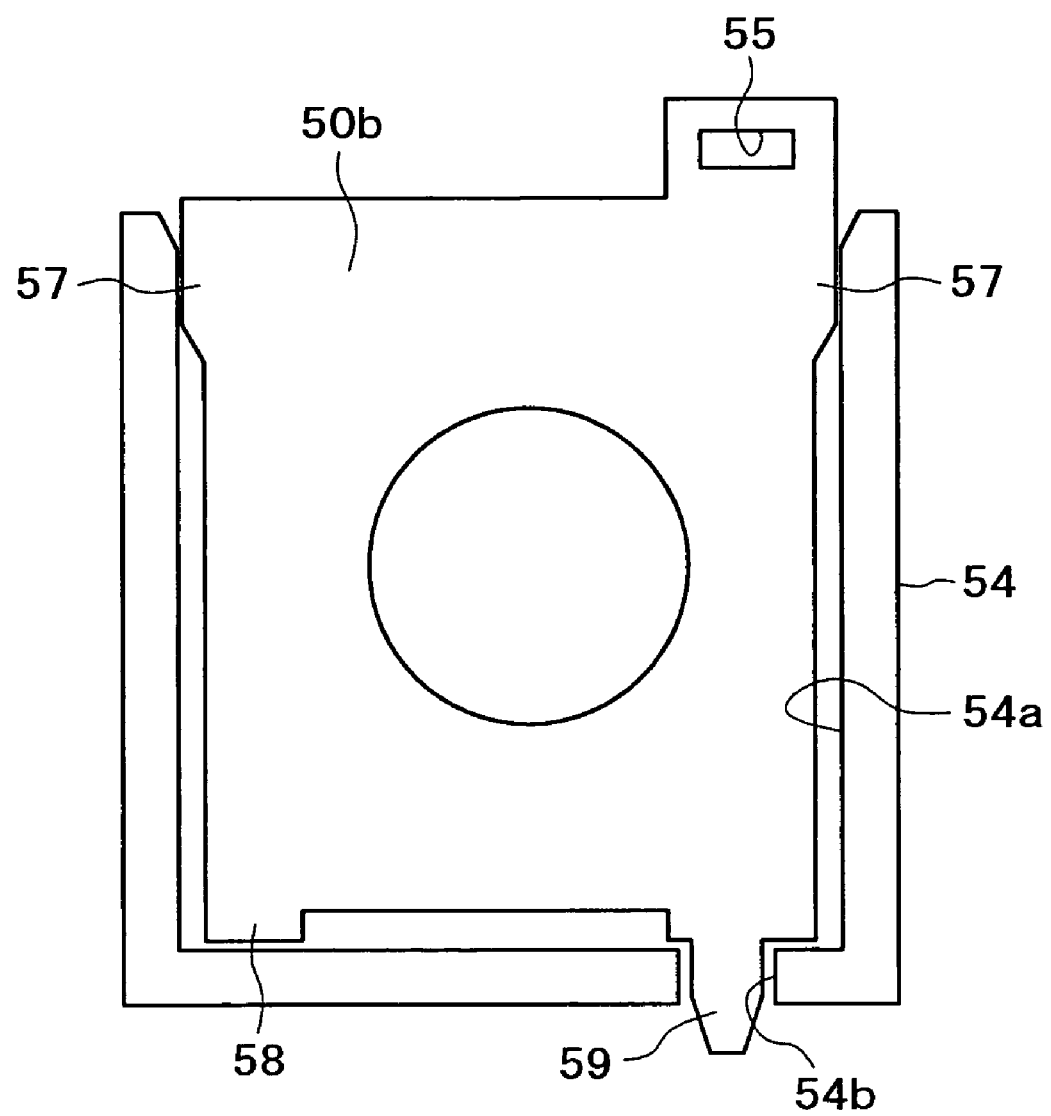
FIG. 6 is a view schematically showing the lens holding frame member and the guide frame when the additional lens set is positioned on the optical axis as viewed along the optical axis.
Figure 7:
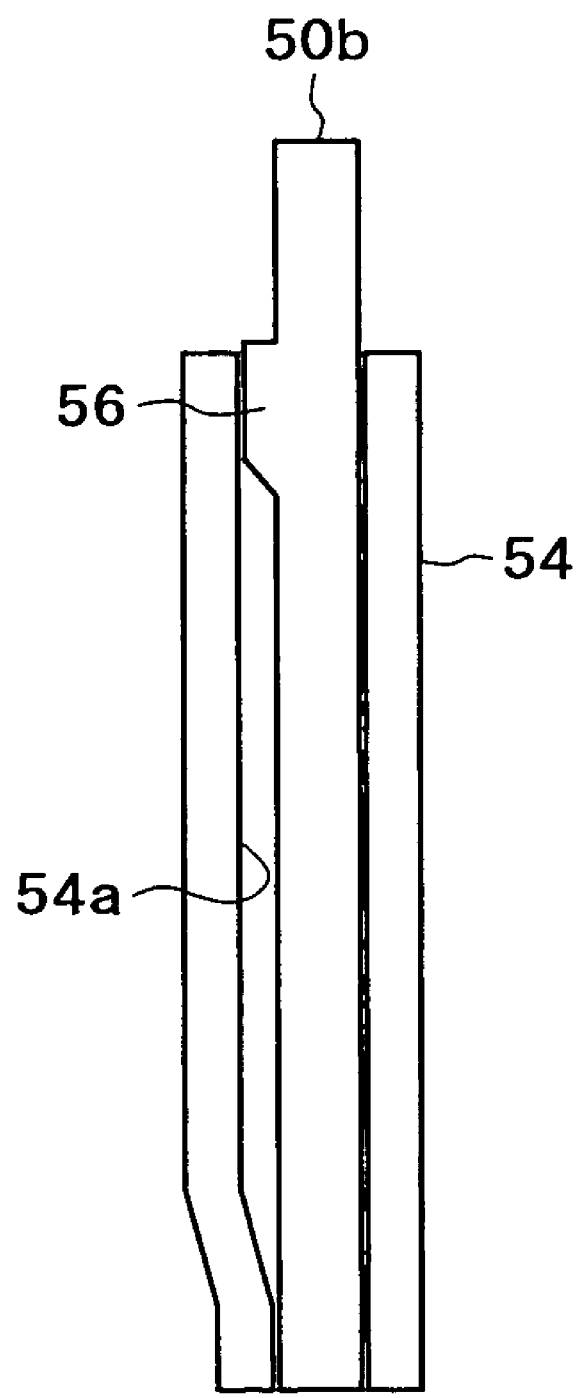
FIG. 7 is a vertical sectional view schematically showing the lens holding frame member and the guide frame when the additional lens set is positioned on the optical axis.

If the moving picture image pickup mode is selected on the image pickup apparatus 1, then the pressed portion 51b of the driving lever 51 is pushed upward by a driving element not shown whose operation is controlled by the drive circuit 19a to pivot the driving lever 51 around the pivotal fulcrum portion 51a. The pressed portion 51b is moved upon pivotal motion of the driving lever 51 to bring the engaging pin 61 into engagement with the elongated hole 55. Consequently, the lens holding frame member 50 connected to the driving portion 51c is slidably moved along the guide groove 54a of the guide frame 54 in a direction (downward direction) of an arrow mark 65 shown in FIG. 3. Thereupon, as shown in FIGS. 6 and 7, the additional lens set G5 is moved to the position on the optical axis of the zoom lens 2 at which the optical axes of the additional lens set G5 and the zoom lens 2 are registered with each other, and the zoom lens 2 is now positioned for the moving picture image pickup mode.

On the other hand, if the still picture image pickup mode is selected, then the pressed portion 51b of the driving lever 51 is pulled down by the driving element to move in a direction (downward direction) indicated by an arrow mark 66 of FIG. 2 to pivot the driving lever 51 around the pivotal fulcrum portion 51a. Upon the pivotal motion of the driving lever 51, the pressed portion 51b is moved to slidably move the lens holding frame member 50 connected to the drive portion 51c through the engagement between the engaging pin 61 and the elongated hole 55 upwardly along the guide groove 54a of the guide frame 54. As a result of the sliding movement of the lens holding frame member 50, the additional lens set G5 is moved out of the position on the optical axis of the zoom lens 2 to place the zoom lens 2 to the position in the still picture image pickup mode as seen in FIGS. 3 to 5.

When the additional lens set G5 is moved from the position on the optical axis of the zoom lens 2 to place the zoom lens 2 to the position in the still picture image pickup mode, the pressed piece 18a is pushed by the contact pushing face 62 of the driving lever 51 to close the contact of the position detection switch 18.

It is to be noted that the toggle spring 52 interposed between the anchoring hole 63 of the driving lever 51 and the anchoring hole 64 provided in the lens barrel 53 biases the driving lever 51 to pivot in the opposite directions across a predetermined position across which the biasing direction thereof for the driving lever 51 is reversed. In particular, on one side across a substantially middle position of the driving lever 51 in its range of pivotal motion, the driving lever 51 is biased by the toggle spring 52 to pivot the additional lens set G5 to the position on the optical axis of the zoom lens 2. On the other side across the substantially middle position of the driving lever 51, however, the driving lever 51 is biased by the toggle spring 52 to pivot the additional lens set G5 from the position on the optical axis of the zoom lens 2.

Accordingly, the additional lens set G5 is stably retained at the position registered with the optical axis of the zoom lens 2 and at the position displaced from the optical axis of the zoom lens 2 by the toggle spring 52.

Subsequently, an outline of the zoom lens 2 suitable for use with the image pickup apparatus 1 is described.

The zoom lens 2 of the present invention includes a first lens set G1, a second lens set G2, a third lens set G3, a fourth lens set G4 and an additional lens set G5 positioned in order from the object side as shown in FIGS. 9 to 13. The first lens set G1 has a positive refractive power and has a normally fixed position. The second lens set G2 has a negative refractive power and is movable along the optical axis to principally perform power variation. The third lens set G3 has a positive refractive power and has a normally fixed position. The fourth lens set G4 has a positive refractive power and is movable along the optical axis to perform correction for a variation of the image position and focusing. The additional lens set G5 has a positive refractive power and is formed as a cemented lens of an eleventh lens L11 in the form of a biconvex lens and a twelfth lens L12 in the form of a biconcave lens disposed in order from the object side. The face of the eleventh lens L11 on the object side is formed as an aspheric surface. The additional lens set G5 is moved to and from the position on the optical axis and acts to shift the focal length range of the entire lens system depending upon whether the additional lens set G5 is positioned on or moved from the optical axis. Where the total thickness of the additional lens set G5 is represented by S5, the focal length at the wide angle end of the lens system including the first to fourth lens sets and the additional lens set by fw2, the refractive index of the biconvex lens of the additional lens set G5 on a "d" line by n51, the refractive index of the biconcave lens of the additional lens set G5 on the "d" line by n52, the radius of curvature of the interface of the additional lens set G5 by r52, and the amount of deformation of the aspheric surface of the additional lens set G5 from a generating face at a position of an effective radius (the deformation amount is in the positive where it is provided on the image side) by $\Delta 5$, they are conditioned so as to satisfy $0.7<S5/fw2<2.5$ (conditional expression 2), $-0.11<fw2\cdot(n52-n51)/r52<-0.085$ (conditional expression 3) and $0.003<\Delta 5/fw2<0.01$ (conditional expression 4).

Figure 9:
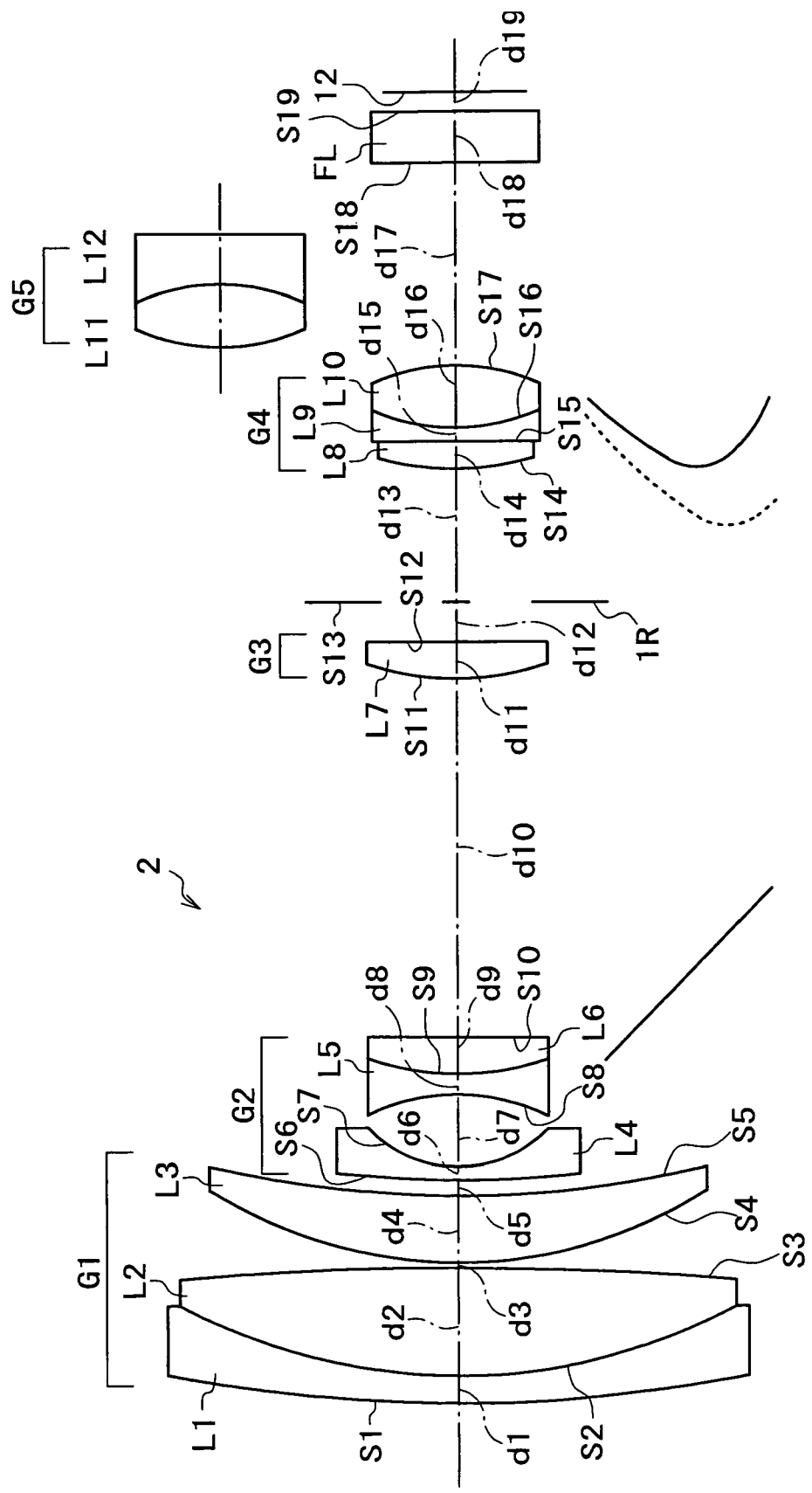
FIG. 9 is a view schematically showing a lens configuration of a numerical value example 1 (in a still picture image pickup mode) of the zoom lens of the present invention.
Figures 12A, 12B, 12C:
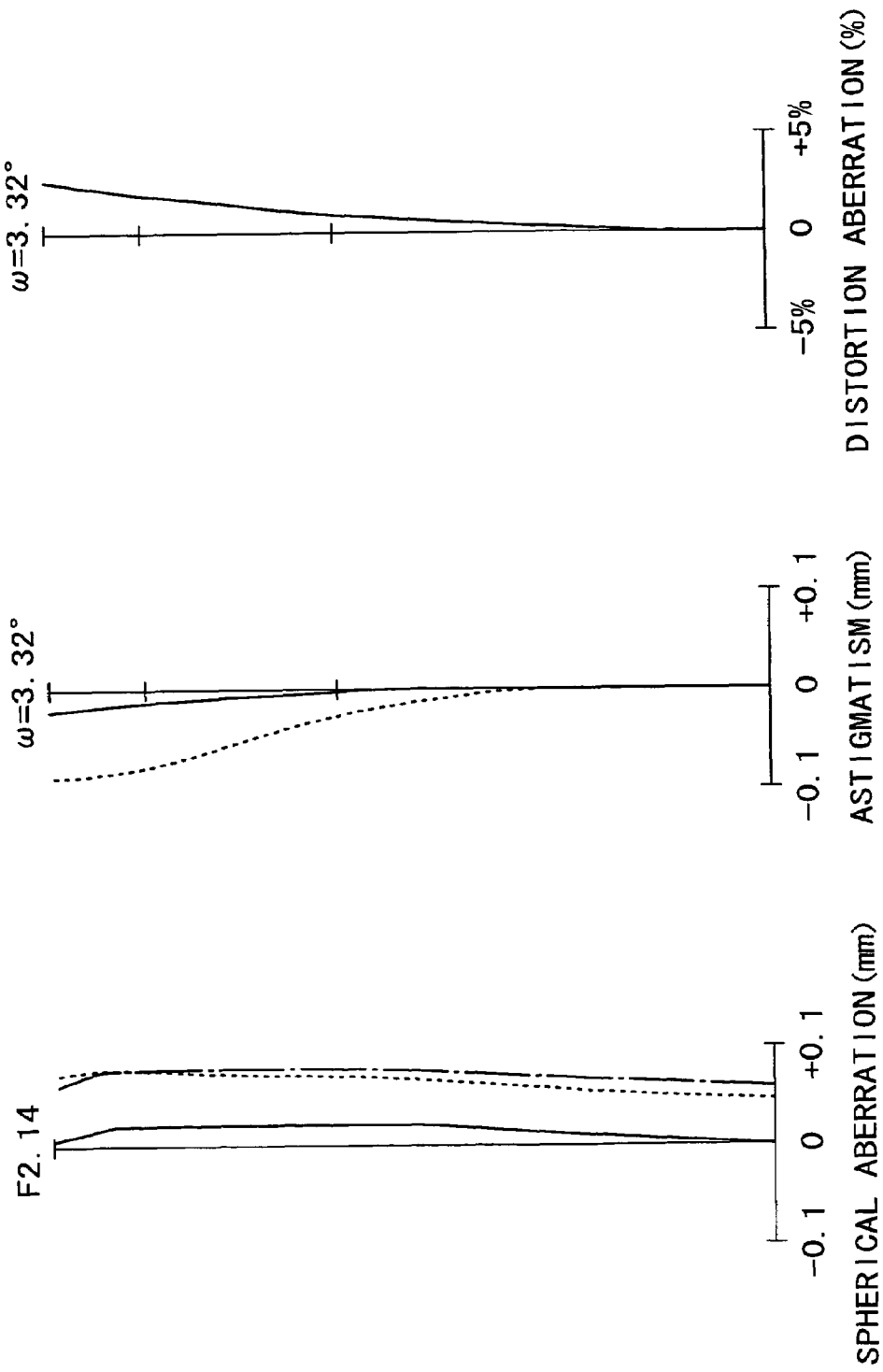
FIGS. 12A to 12C are views illustrating various aberrations at a tele-side end of the numerical value example 1 of the zoom lens of the present invention.
Figure 13:
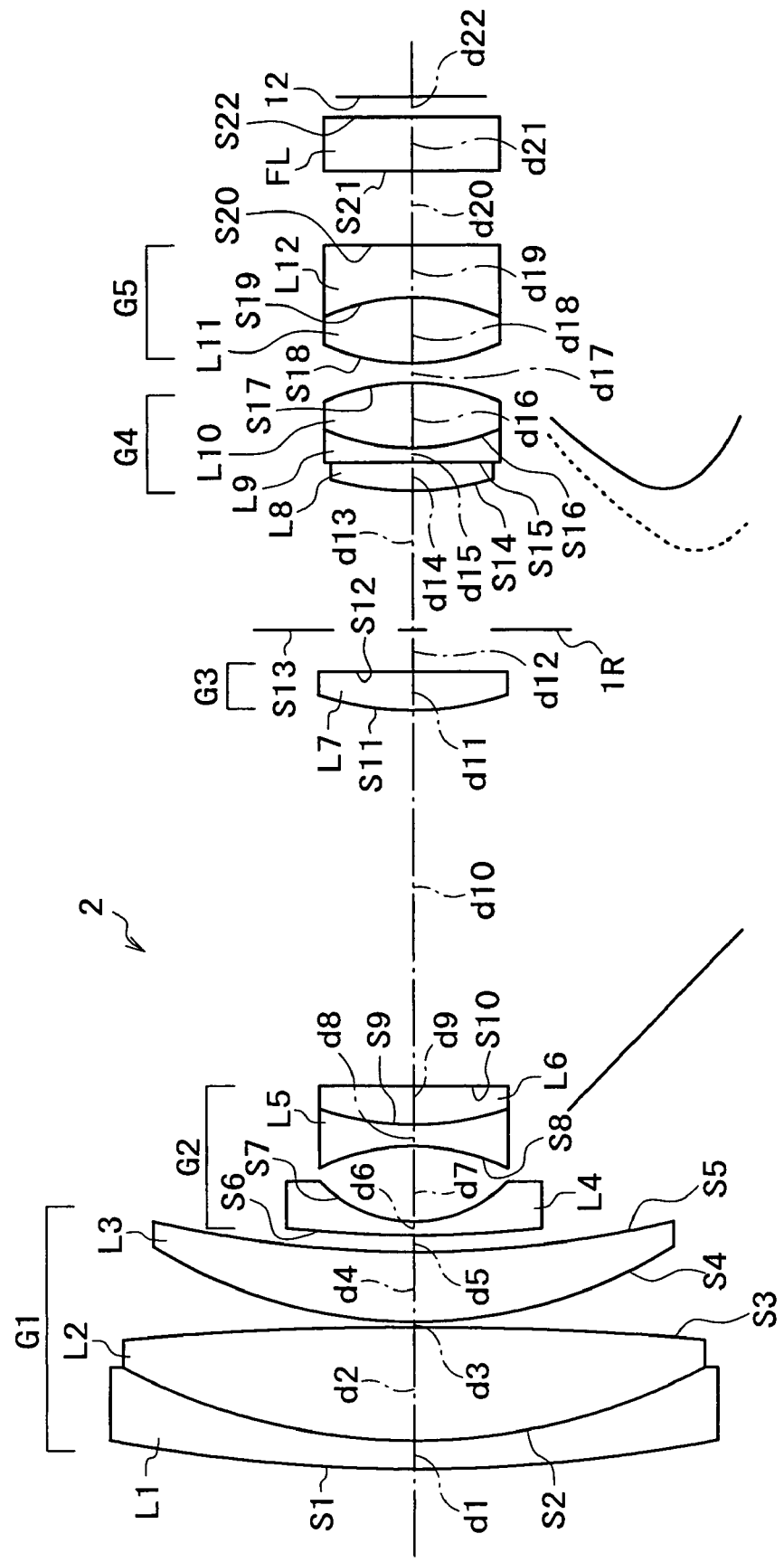
FIG. 13 is a view schematically showing a lens configuration of a numerical value example 2 (in a moving picture image pickup mode) of the zoom lens of the present invention.
Figure 14:
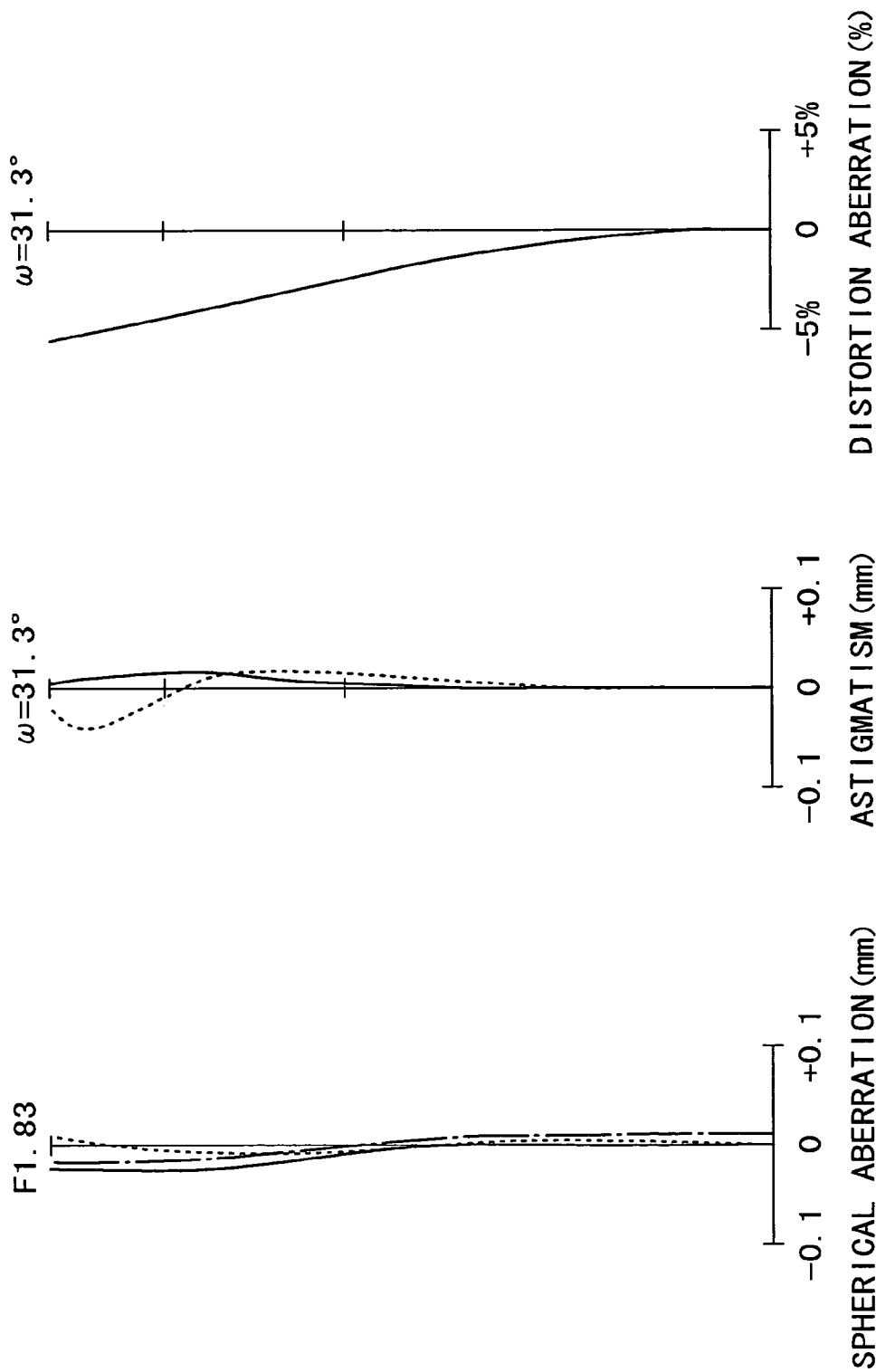
FIGS. 14A to 14C are views illustrating various aberrations at the wide angle end of the numerical value example 2 of the zoom lens of the present invention.
Figure 15:
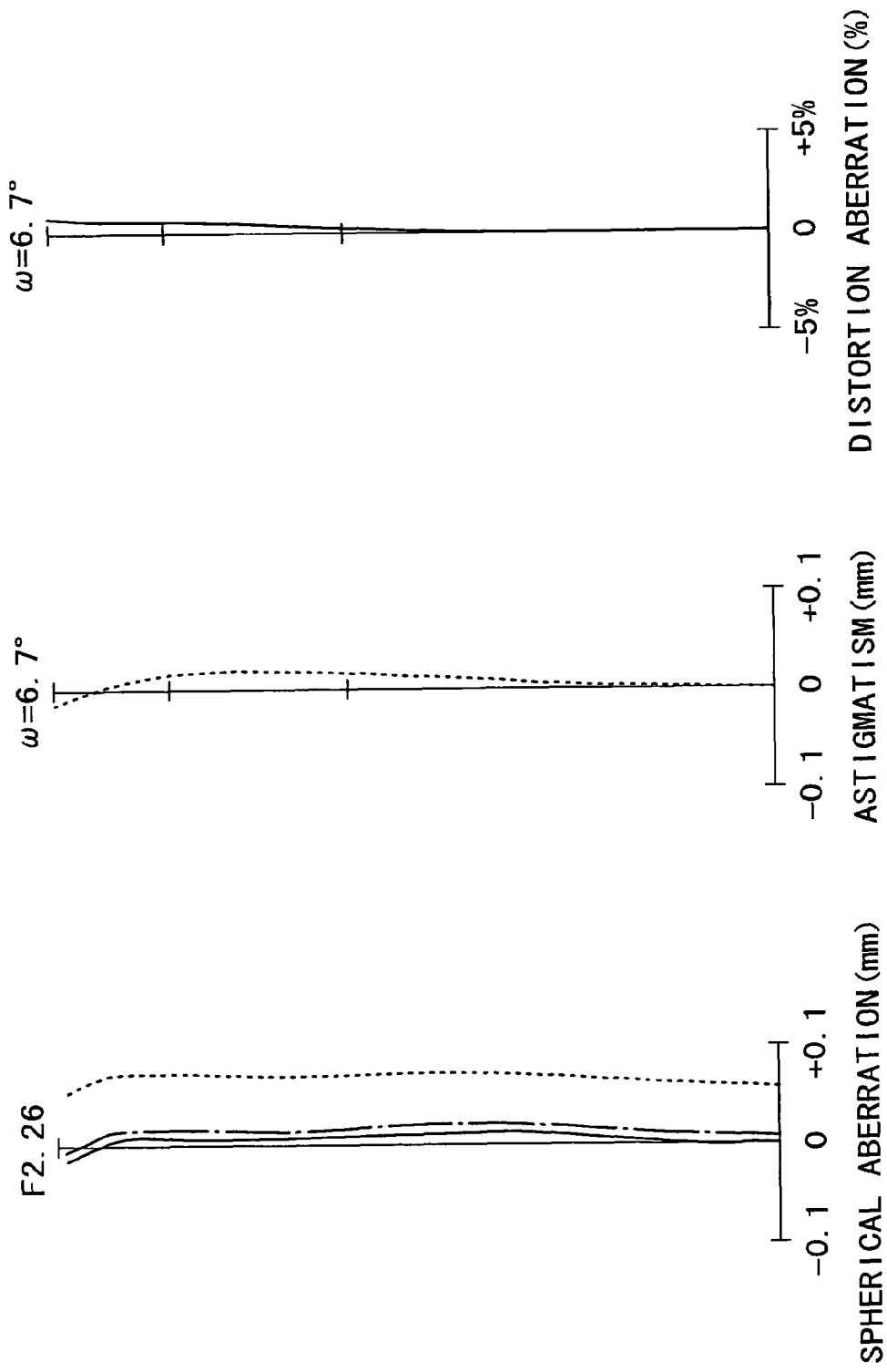
FIGS. 15A to 15C are views illustrating various aberrations at the intermediate focus position of the numerical value example 2 of the zoom lens of the present invention.
Figure 16:
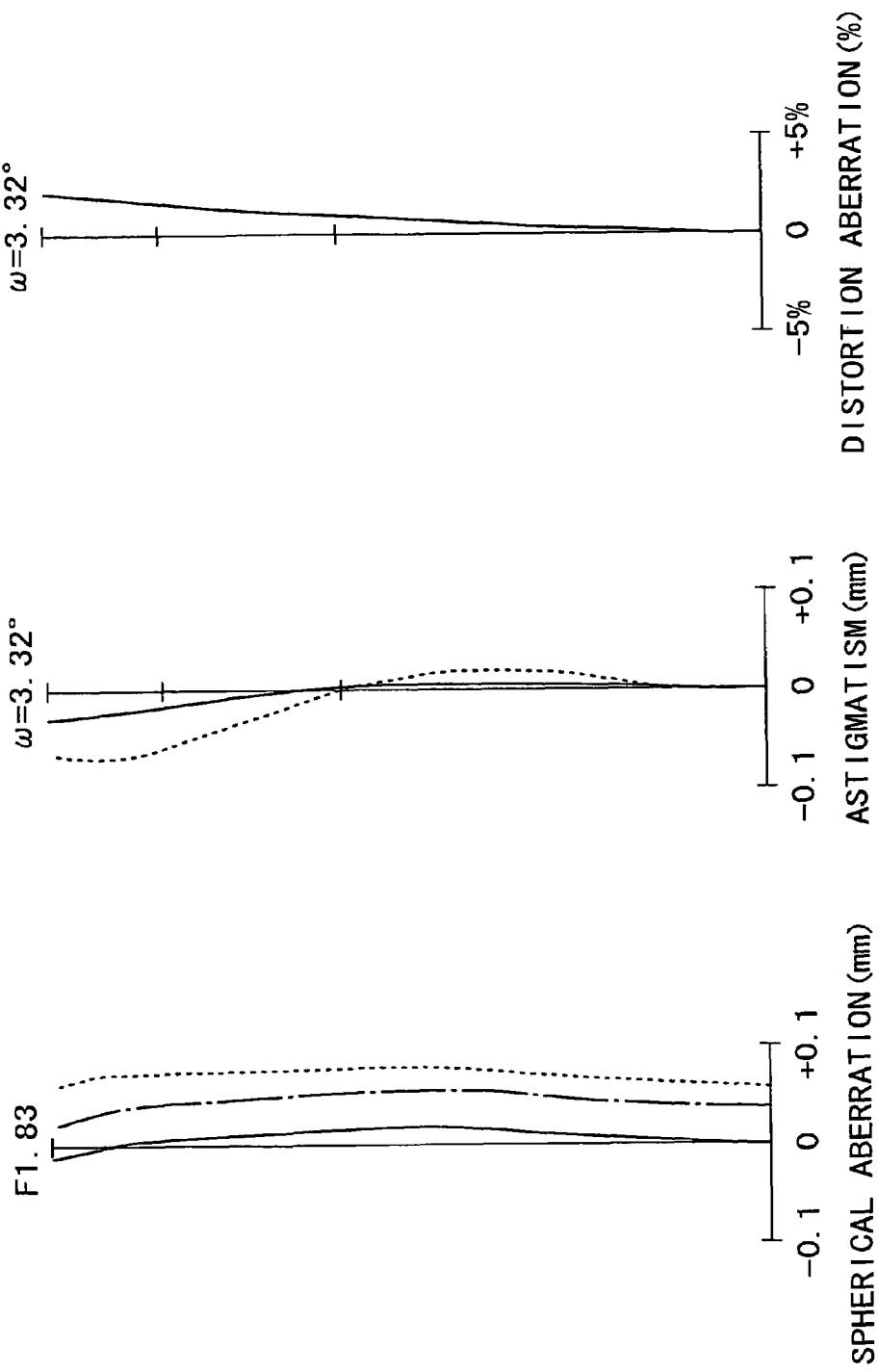
FIGS. 16A to 16C are views illustrating various aberrations at the tele-side end of the numerical value example 2 of the zoom lens of the present invention.

Meanwhile, as shown in FIGS. 9 and 13, the first lens set G1 includes a cemented lens of a first lens L1 in the form of a concave meniscus lens and a second lens L2, and a third lens L3 in the form of a convex meniscus lens disposed in order from the object side. The first lens L1 has a convex face directed to the object side. The third lens L3 has a convex face directed to the object side. The second lens set G2 is formed from a cemented lens of a fourth lens L4 in the form of a concave lens, a fifth lens L5 in the form of a biconcave lens and a sixth lens L6 in the form of a convex lens disposed in order from the object side. The third lens set G3 includes a seventh lens L7 in the form of a biconvex lens having faces at least one of which is an aspheric face. The fourth lens set G4 is formed from a three-element cemented lens of an eighth lens L8 in the form of a convex lens, a ninth lens L9 in the form of a concave lens and a tenth lens L10 in the form of a convex lens disposed in order from the object side. At least one of a face of the fourth lens set G4 most adjacent the object side and a face of the fourth lens set G4 most adjacent the image side is formed as an aspheric face. It is to be noted that an iris IR is interposed between the third lens set G3 and the fourth lens set G4.

Further, the zoom lens 2 is formed so as to satisfy, where the focal length of the fourth lens set G4 is represented by f4, $2.5<f4/fw2<5$ (conditional expression 5).

Incidentally, the zoom lens 2 is designed intending that, even if the focal length is shifted as a result of movement of the additional lens set G5 to and from the position on the optical axis between the fourth lens set G4 and the image pickup element 12, the total length from the first lens set G1 to the image pickup element 12 does not vary.

In the following, a process of determining an optical characteristic of the additional lens set G5 to be moved to the position on the optical axis between the fourth lens set G4 and the image pickup element 12 in order to shift the focal length of the zoom lens 2 without changing the total length is described.

Figure 8:
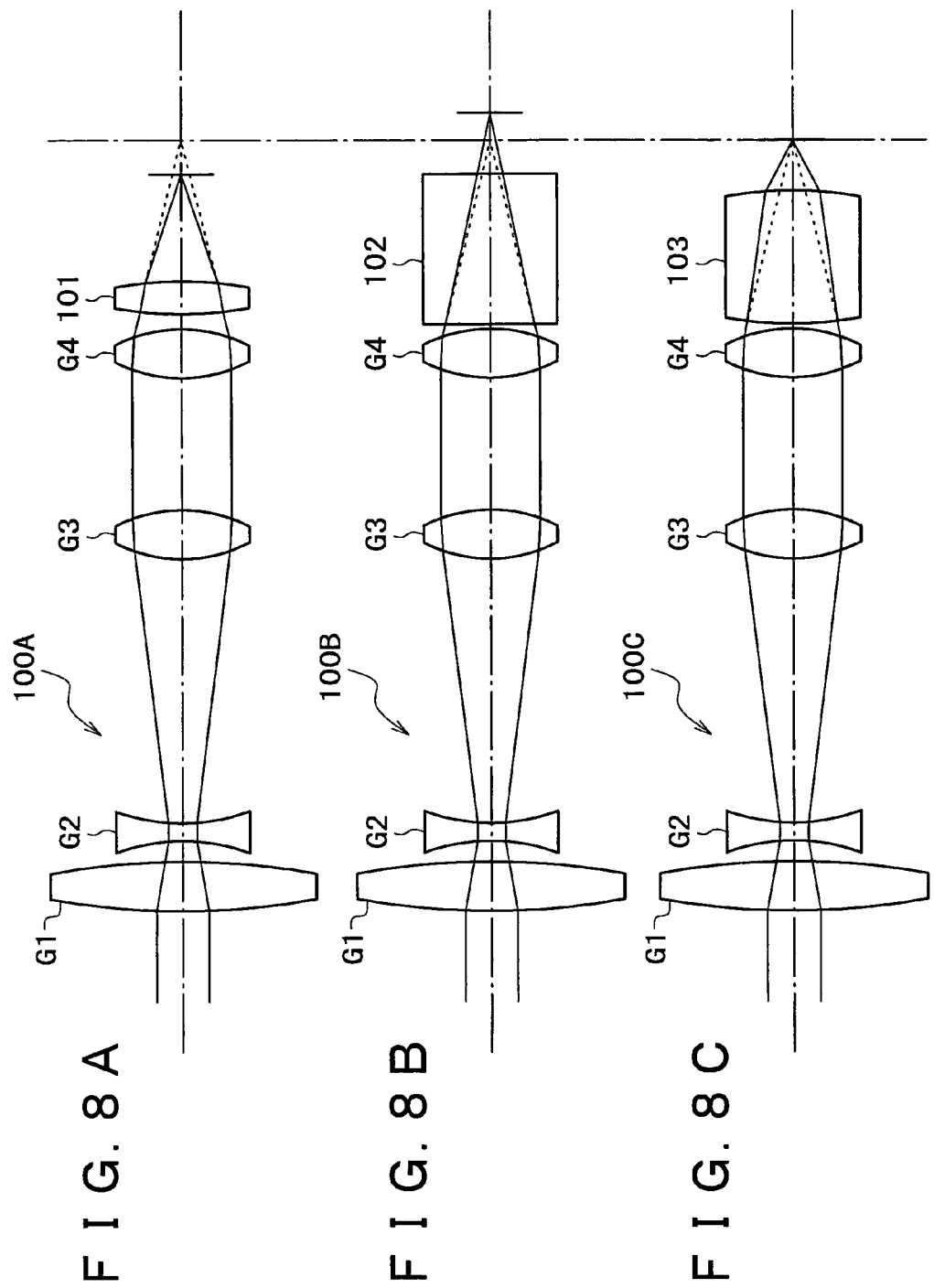
FIGS. 8A to 8C are schematic views illustrating a process in determination of a basic optical characteristic of the additional lens set in the zoom lens of the present invention.

For example, it is a possible idea to additionally provide, as in the case of a zoom lens 100A shown in FIG. 8A, a thin positive lens set 101 as an additional lens set in a space as a back focus such that the composite focal length of the first to fourth lens sets G1 to G4 and the positive lens set 101 is reduced when compared with the original composite focal length of the first to fourth lens sets G1 to G4. However, with the zoom lens 10A, the image plane is moved to the object side, resulting in reduction of the overall length.

Meanwhile, in a zoom lens 100B shown in FIG. 8B, a thick parallel plane glass plate as an additional lens set 102 is additionally provided in a space as a back focus. With the zoom lens 100B, the overall length can be increased without changing the focal length.

Therefore, a zoom lens 100C shown in FIG. 8C is formed taking the result of the zoom lens 100A and the result of the zoom lens 100B into consideration. In particular, the zoom lens 100C includes a thick positive lens set as an additional lens set 103 in a space as a back focus. It can be seen that the overall length of the zoom lens 100C does not exhibit a change although the composite focal length of the first to fourth lens sets G1 to G4 and the additional lens set 103 is reduced when compared with the original composite focal length of the first to fourth lens sets G1 to G4.

From the foregoing, the additional lens set G5 used for the zoom lens 2 is formed from a thick positive lens set having a positive refractive index like the additional lens set 103 in the zoom lens 100C.

Subsequently, the conditional expressions 1 to 5 which prescribe the configuration the image pickup apparatus 1 and the zoom lens 2 are described.

The conditional expression 1 prescribes a condition for establishing a balance between that an effect of correction of the angle of view between the still picture image pickup mode and the moving picture image pickup mode is achieved and that the configuration (configuration of FIG. 8C) wherein a thick positive lens set having a positive refractive index is additionally provided as the additional lens set G5 is materialized.

In particular, if the value of "fw1/fw2−1" in the conditional expression 1 is lower than the limit value therefor, then the effect of correction of the angle of view almost disappears, but only an effect that increase in cost and size is provided to the zoom lens 2 is exhibited. On the other hand, if the value of "fw1/fw2−1" is higher than the upper limit therefor, then this results in excessive correction wherein the angle of view is greater in the moving picture image pickup mode than in the still picture image pickup mode. Consequently, the refractive index of the additional lens set G5 becomes so high that a spherical aberration or a curved image plane cannot be corrected sufficiently.

The conditional equation 2 prescribes a condition necessary to make it possible to materialize the configuration (configuration of FIG. 8C) wherein the additional lens set G5 is additionally provided as.

In particular, if the value of "S5/fw2" is lower than the lower limit value therefor, then the sufficient effect of reducing the focal length and the object of making the overall length invariable cannot be achieved. On the other hand, if the value of "S5/fw2" is higher than the upper limit value therefor, then the additional lens set G5 is excessively thick and cannot be inserted into the space as a back focus.

The conditional expression 3 prescribes a condition for correcting a variation of the spherical aberration caused by the movement of the additional lens set G5 to and from the position on the optical axis. It is to be noted that, since the additional lens set G5 is a positive lens set, a spherical aberration on the under side is liable to appear. However, if a negative refractive index is provided to the interface whose concave face is directed to the object side disposed in a converging light flux, then an effect of correcting a spherical aberration on the under side is obtained.

Then, if the value of "fw2·(n52−n51)/r52" is higher than the upper limit value therefor, then it is difficult to correct a spherical aberration on the under side. On the other hand, if the value of "fw2·(n52−n51)/r52" is lower than the lower limit value therefor, then the spherical aberration is liable to come to the over side, and also the image plane is curved to the over side to such a degree that it is difficult to correct the image plane.

The conditional equation 4 prescribes a condition for correcting a curve of the image plane. If the condition prescribed by the conditional expression 3 given hereinabove is satisfied and the spherical aberration on the under side is corrected, then an image plane curve aberration on the over side is generated by the additional lens set G5 side. However, if the condition prescribed by the conditional expression 4 is satisfied such that the aspheric shape of the face of the additional lens set G5 on the object side is set so as to provide a deformation amount from the generating spherical face in a direction in which the curvature increases as the distance from the optical axis increases, then the influence by the condition prescribed by the conditional expression 3 can be canceled to correct the image plane curve aberration. In order to keep a good condition with regard to the spherical aberration and the image plane curve irrespective of the movement of the additional lens set G5 to and from the position on the optical axis, it is important to keep a good balance between the condition prescribed by the conditional expression 3 and the condition prescribed by the conditional expression 4.

If the value of "Δ5/fw2" in the conditional expression 4 is lower than the lower limit therefor, then the influence of the condition prescribed by the conditional expression 3 remains, and the image plane is curved to the over side. On the other hand, if the value of "Δ5/fw2" is higher than the upper limit therefor, then the spherical aberration is curved to the under side, and it is difficult to keep a good balance.

The conditional expression 5 prescribes a condition for assuring a back focus suitable for the movement of the additional lens set G5 to and from the position on the optical axis without increasing the size of the entire lens system.

In particular, if the value of "f4/fw2" is lower than the lower limit therefor, then the back focus becomes so short that it is difficult to satisfy the condition prescribed by the conditional expression 1. On the other hand, if the value of "f4/fw2" is higher than the upper limit therefor, then the back focus is so long that, as a lens to be inserted in the back focus, an element proximate to a prism for separating light into three colors of R, G and B is required. Therefore, increase in size and cost of the zoom lens 2 cannot be avoided.

Now, numerical value examples 1 to 4 illustrated in FIGS. 9 to 24C with which the zoom lens 2 is materialized are described. It is to be noted that, in the numerical value examples 1 to 4, the numerical value examples 2 (FIG. 13), 3 (FIG. 17) and 4 (FIG. 21) indicate numerical values in states in the moving picture image pickup mode wherein additional lens sets G5 having different configurations from each other are additionally provided in the zoom lens 2 in the still picture image pickup mode which includes the first to fourth lens sets G1 to G4 illustrated in the numerical value example 1 (FIG. 9).

In the following description, "Si" indicates the i-th face as counted from the object side, "ri" the radius of curvature of the i-th face "Si" as counted from the object side, "di" the face-to-face distance between the i-th face "Si" and the (i+1)th face "Si+1" as counted from the object side, "ni" the refractive index of the material of the i-th lens "Li" on the "d" line, "vi" the Abbe number of the material of the i-th lens "Li" on the "d" line, and "nFL" and "vFL" indicate the refractive index and the Abbe number of the material of a filter FL. Further, it is assumed that, where "xi" represents the depth of the aspheric face and "H" represents the height from the optical axis, the aspheric face is defined by the following expression 1:

$$xi = \frac{H^2}{ri\left(1 + \sqrt{1 - \frac{H^2}{ri^2}}\right)} + \sum A_j H^j \qquad \text{expression 1}$$

Numerical values of the numerical value example 1 of the zoom lens 2 are indicated in Table 1 (refer to FIG. 9).

TABLE 1

| ri | di | ni | vi |
|---|---|---|---|
| r1 = 56.6 | d1 = 1.1 | n1 = 1.84666 | v1 = 23.8 |
| r2 = 22.7 | d2 = 4.2 | n2 = 1.72916 | v2 = 54.7 |
| r3 = 170.0 | d3 = 0.2 | | |
| r4 = 17.85 | d4 = 2.81 | n3 = 1.72916 | v3 = 54.7 |
| r5 = 40.4 | d5 = variable | | |
| r6 = 30.75 | d6 = 0.6 | n4 = 1.88300 | v4 = 40.8 |
| r7 = 5.38 | d7 = 2.92 | | |
| r8 = −6.85 | d8 = 0.72 | n5 = 1.51680 | v5 = 64.2 |
| r9 = 9.4 | d9 = 1.51 | n6 = 1.84666 | v6 = 23.8 |
| r10 = 267 | d10 = variable | | |
| r11 = 12.469 | d11 = 1.45 | n7 = 1.58313 | v7 = 59.5 |
| r12 = −93.7 | d12 = 1.8 | | |
| r13 = 8 (iris) | d13 = variable | | |
| r14 = 13.158 | d14 = 1.11 | n8 = 1.58313 | v8 = 59.5 |
| r15 = 8 | d15 = 0.6 | n9 = 1.84666 | v9 = 23.8 |
| r16 = 12.5 | d16 = 2.25 | n10 = 1.48749 | v10 = 70.4 |
| r17 = −9.1 | d17 = variable | | |
| r18 = 8 (filter) | d18 = 2.09 | nFL = 1.51680 | vFL = 64.2 |
| r19 = 8 (filter) | d19 = 0.8 (Back Focus) | | |

Table 2 indicates fourth-, sixth-, eighth- and tenth-order aspheric coefficients A4, A6, A8 and A10 of an eleventh face S11 and a fourteenth face S14 each formed as an aspheric face.

TABLE 2

| Aspheric Co-efficient | A4 | A6 | A8 | A10 |
|---|---|---|---|---|
| S11 | −0.7918 × 10⁻⁴ | −0.9134 × 10⁻⁵ | +0.6142 × 10⁻⁶ | −0.2253 × 10⁻⁷ |
| S14 | −0.4633 × 10⁻³ | +0.1962 × 10⁻⁴ | −0.2499 × 10⁻⁵ | +0.1120 × 10⁻⁶ |

Table 3 indicates face-to-face distances d5, d10, d13 and d17 which vary in response to the focal length, F number, angle of view (2ω) and zooming at the wide angle end, intermediate focus position and tele-side end of the zoom lens 2 in the numerical value example 1.

TABLE 3

| | Wide angle end | Intermediate focus position | Tele-side end |
|---|---|---|---|
| Focal length | 4.61 | 22.27 | 44.44 |
| F number | 2.14 | 2.65 | 2.14 |
| Angle of view (degrees) | 62.6 | 13.4 | 6.64 |
| d5 | 0.8 | 11.95 | 15.45 |
| d10 | 15.45 | 4.30 | 0.8 |
| d13 | 5.58 | 2.17 | 5.41 |
| d17 | 8.81 | 12.22 | 8.98 |

FIGS. 10A to 12C indicate the spherical aberrations, distortion aberrations and astigmatisms of the zoom lens 2 in the numerical value example 1. It is to be noted that, in the spherical aberration views, a solid line indicates values on the "d" line, a broken line indicates values on a "g" line, and an alternate long and short dash line indicates values on a C line. In the astigmatism views, a solid line indicates values of the sagittal image plane distortion and a broken line indicates values of the meridional image plane distortion.

Table 4 indicates numerical values of the numerical value example 2 of the zoom lens 2. It is to be noted that, as shown in FIG. 13, the zoom lens 2 in the case of the numerical value example 2 is that in the state of the moving picture image pickup mode wherein the additional lens set G5 is additionally provided on the optical axis between the fourth lens set G4 of the zoom lens 2 in the case of the numerical value example 1 and the image pickup element 12. Accordingly, Table 4 indicates only the numerical values of the additional lens set G5 and those numerical values at portions on the image side with respect to the additional lens set G5.

TABLE 4

| ri | di | ni | vi |
|---|---|---|---|
| r18 = 14.529 | d18 = 2.13 | n11 = 1.58313 | v11 = 59.5 |
| r19 = −9.36 | d19 = 2.1 | n12 = 1.80420 | v12 = 46.5 |
| r20 = 153.5 | d20 = 3.38 | | |
| r21 = 8 (filter) | d21 = 2.09 | nFL = 1.51680 | vFL = 64.2 |
| r22 = 8 (filter) | d22 = 0.8 (Back Focus) | | |

Table 5 indicates the fourth-, sixth-, eighth- and tenth-order aspheric coefficients A4, A6, A8 and A10 of an eighteenth face S18 formed from an aspheric face.

TABLE 5

| Aspheric Co-efficient | A4 | A6 | A8 | A10 |
|---|---|---|---|---|
| S18 | $+0.5892 \times 10^{-4}$ | $+0.3239 \times 10^{-4}$ | $-0.3407 \times 10^{-5}$ | $+0.1457 \times 10^{-6}$ |

Table 6 indicates the face-to-face distances d5, d10, d13 and d17 which vary in response to the focal length, F number, angle of view (2ω) and zooming at the wide angle end, intermediate focus position and tele-side end of the zoom lens 2 in the numerical value example 2.

TABLE 6

|  | Wide angle end | Intermediate focus position | tele-side end |
|---|---|---|---|
| Focal length | 3.93 | 19.00 | 37.92 |
| F number | 1.83 | 2.26 | 1.83 |
| Angle of view (degrees) | 62.6 | 13.4 | 6.64 |
| d5 | 0.8 | 11.95 | 15.45 |
| d10 | 15.45 | 4.30 | 0.8 |
| d13 | 5.58 | 2.17 | 5.41 |
| d17 | 1.2 | 4.61 | 1.37 |

As can be seen apparently from Table 6 above, in the numerical value example 2, even if the focal length range is shifted to the longer side, the angle of view does not exhibit any change even where it is compared with that in the case of the numerical value example 1.

FIGS. 14A to 16C indicate the spherical aberrations, distortion aberrations and astigmatisms of the zoom lens 2 in the case of the numerical value example 2. It is to be noted that, in the spherical aberration views, a solid line indicates values on the "d" line, a broken line indicates values on the "g" line, and an alternate long and short dash line indicates values on the C line. In the astigmatism views, a solid line indicates values of the sagittal image plane distortion and a broken line indicates values of the meridional image plane distortion.

Figure 17:
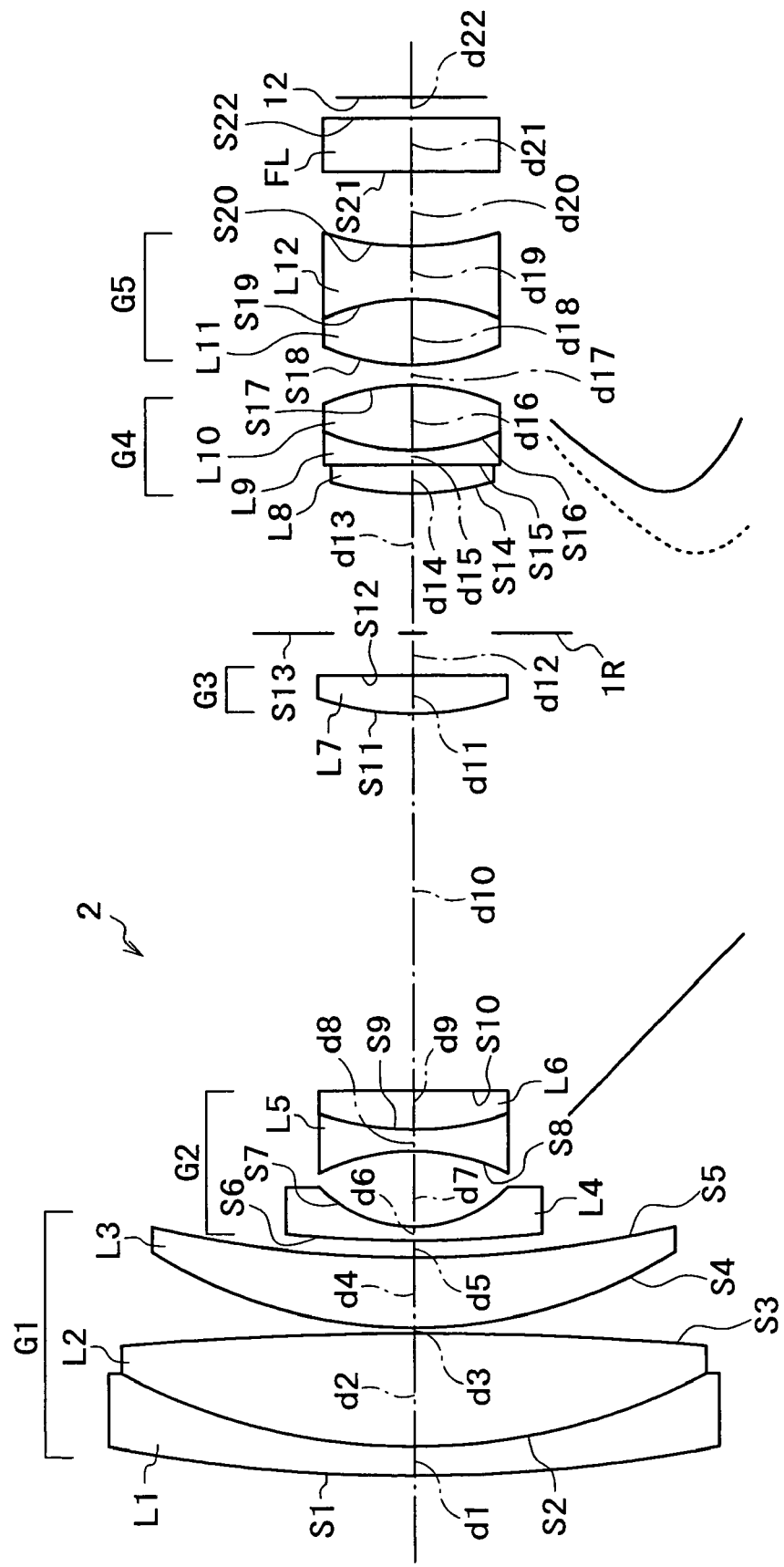
FIG. 17 is a view schematically showing a lens configuration of a numerical value example 3 (in a moving picture image pickup mode) of the zoom lens of the present invention.
Figure 18:
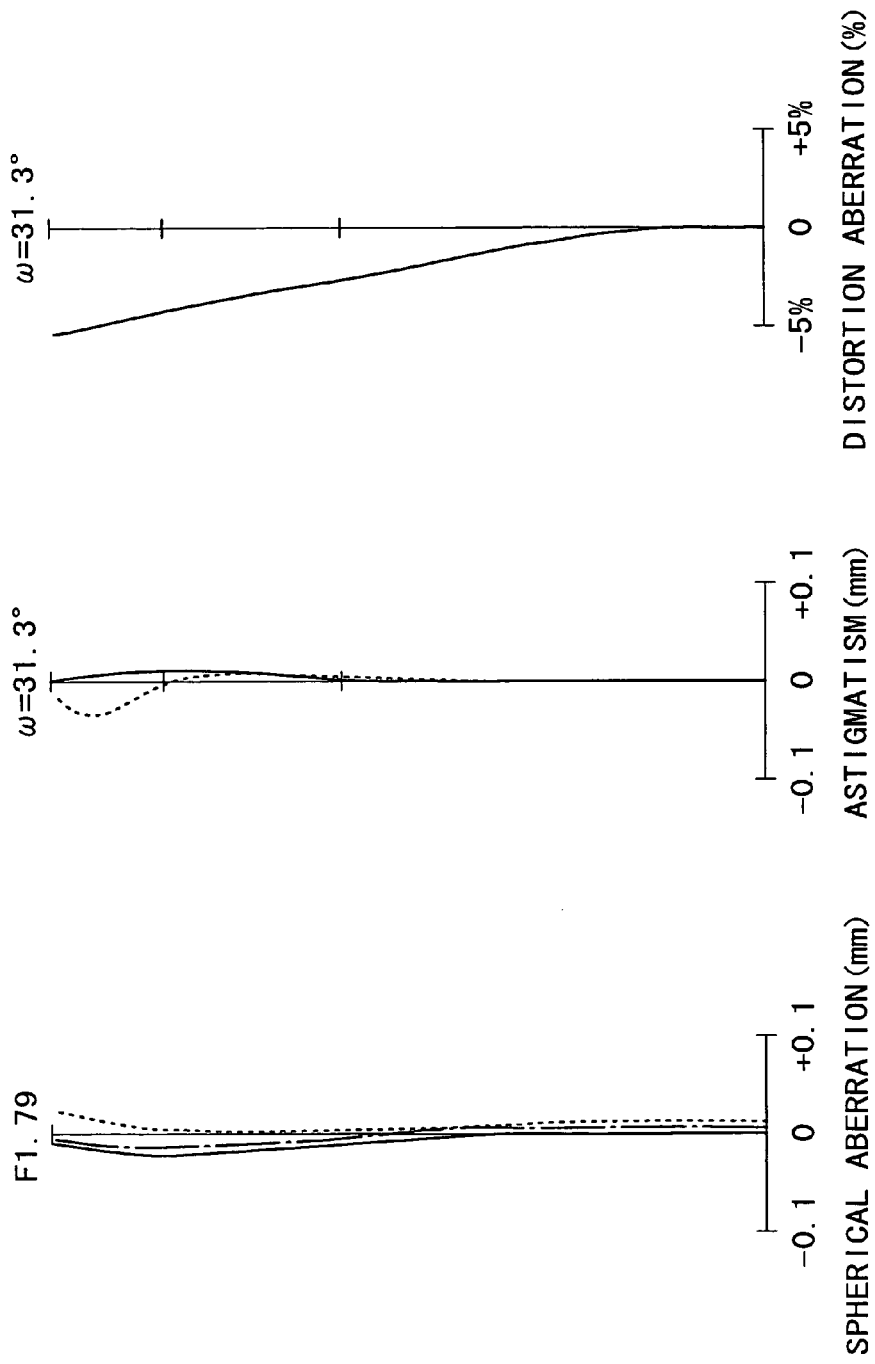
FIGS. 18A to 18C are views illustrating various aberrations at the wide angle end of the numerical value example 3 of the zoom lens of the present invention.
Figure 19:
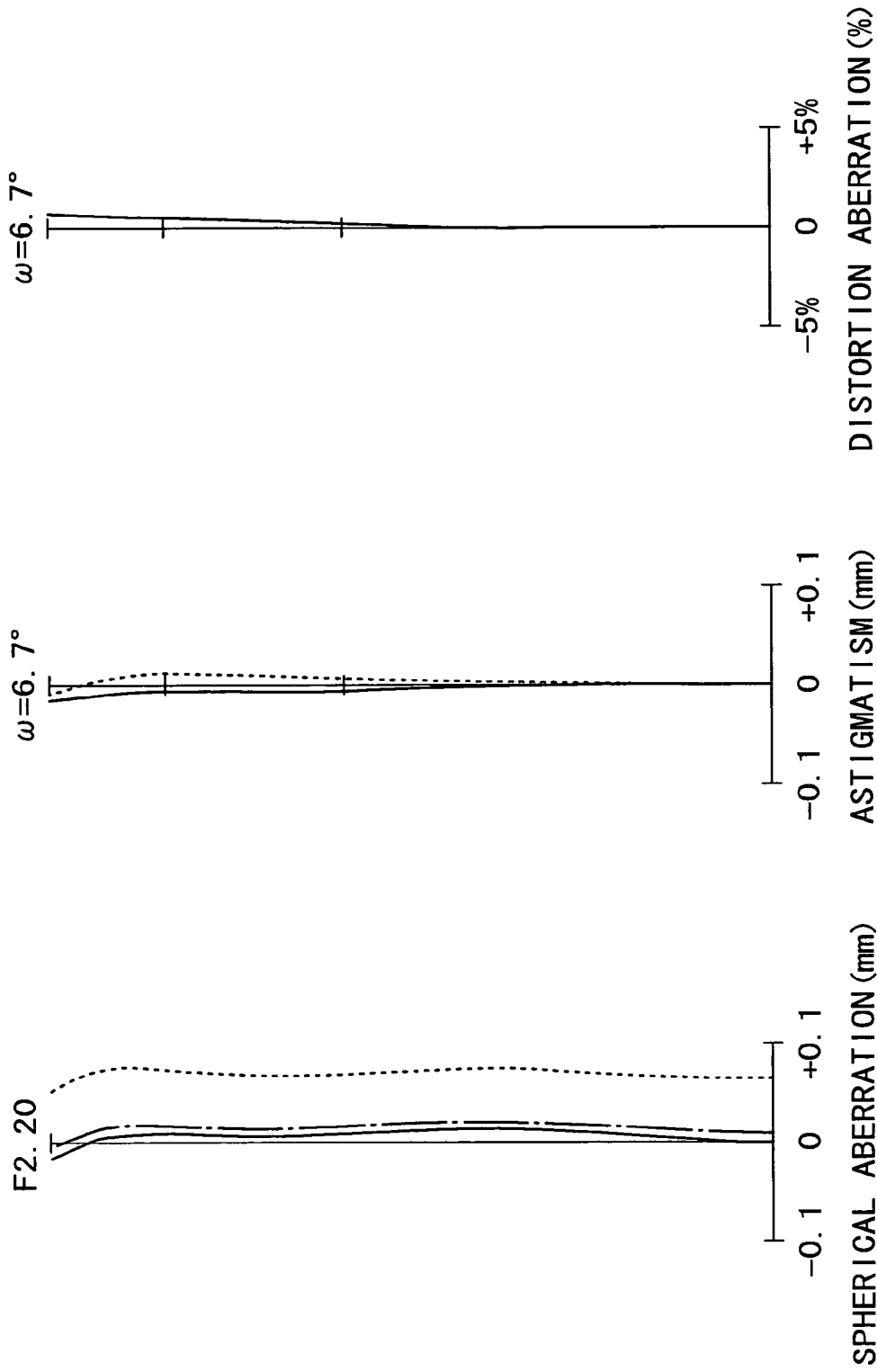
FIGS. 19A to 19C are views illustrating various aberrations at the intermediate focus position of the numerical value example 3 of the zoom lens of the present invention.
Figure 20:
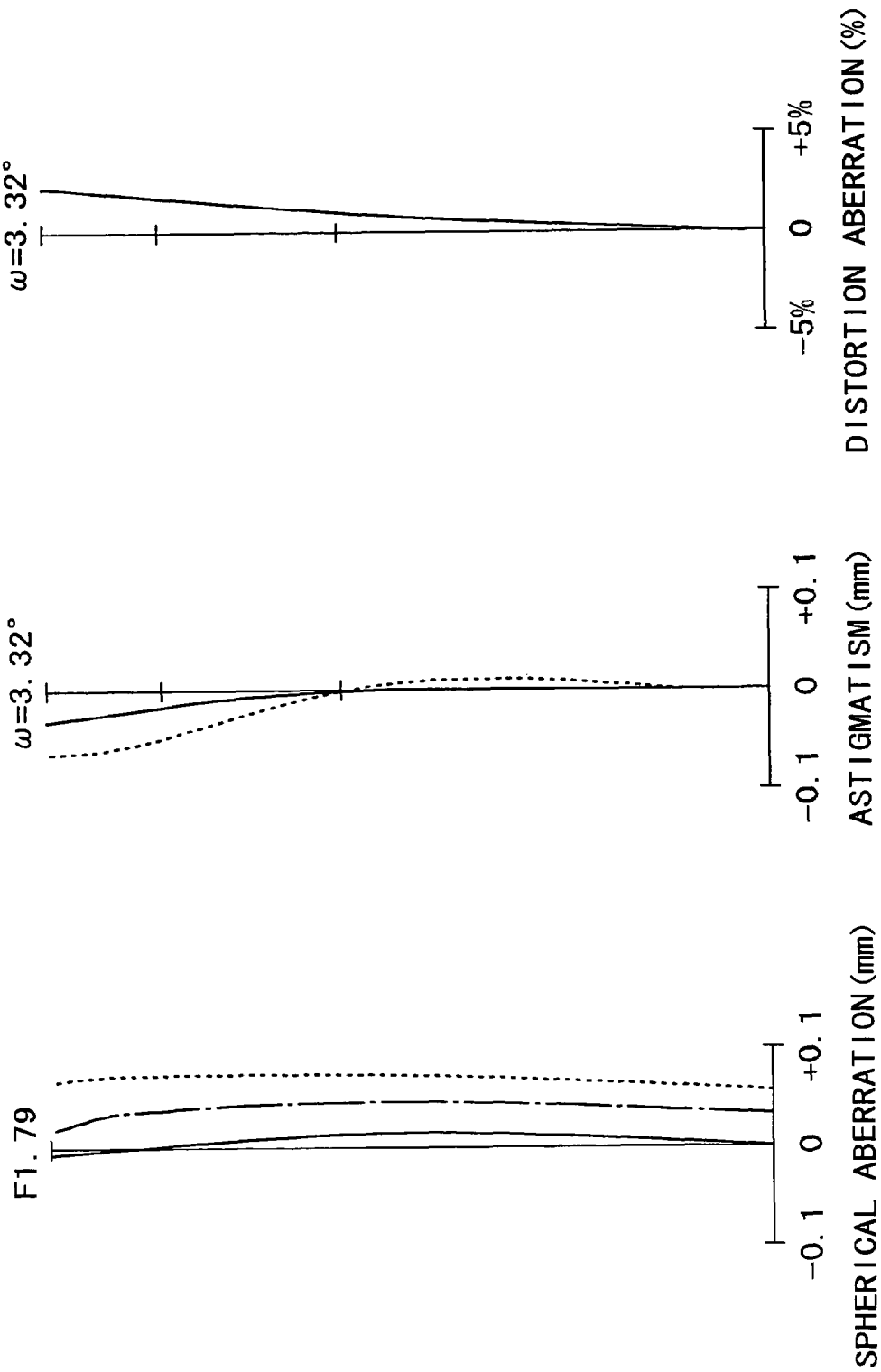
FIGS. 20A to 20C are views illustrating various aberrations at the tele-side end of the numerical value example 3 of the zoom lens of the present invention.

Table 7 indicates numerical values of the numerical value example 3 of the zoom lens 2. It is to be noted that, as shown in FIG. 17, the zoom lens 2 in the case of the numerical value example 3 is that in the state of the moving picture image pickup mode wherein the additional lens set G5 different from that of the numerical value example 2 described hereinabove is additionally provided on the optical axis between the fourth lens set G4 of the zoom lens 2 in the case of the numerical value example 1 and the image pickup element 12. Accordingly, Table 7 indicates only the numerical values of the additional lens set G5 and those numerical values at portions on the image side with respect to the additional lens set G5.

TABLE 7

| ri | di | ni | vi |
|---|---|---|---|
| r18 = 14.31 | d18 = 2.14 | n11 = 1.58313 | v11 = 59.5 |
| r19 = −9.17 | d19 = 2.77 | n12 = 1.80420 | v12 = 46.5 |
| r20 = 257.68 | d20 = 3.39 |  |  |
| r21 = 8 (filter) | d21 = 2.09 | nFL = 1.51680 | vFL = 64.2 |
| r22 = 8 (filter) | d22 = 0.8 (Back Focus) |  |  |

Table 8 indicates the fourth-, sixth-, eighth- and tenth-order aspheric coefficients A4, A6, A8 and A10 of the eighteenth face S18 formed from an aspheric face.

TABLE 8

| Aspheric Co-efficient | A4 | A6 | A8 | A10 |
|---|---|---|---|---|
| S18 | $+0.1112 \times 10^{-3}$ | $+0.1499 \times 10^{-4}$ | $-0.1215 \times 10^{-5}$ | $+0.5000 \times 10^{-7}$ |

Table 9 indicates the face-to-face distances d5, d10, d13 and d17 which vary in response to the focal length, F number, angle of view (2ω) and zooming at the wide angle end, intermediate focus position and tele-side end of the zoom lens 2 in the numerical value example 3.

TABLE 9

|  | Wide angle end | Intermediate focus position | Tele-side end |
|---|---|---|---|
| Focal length | 3.84 | 18.55 | 37.02 |
| F number | 1.79 | 2.20 | 1.79 |
| Angle of view (degrees) | 62.6 | 13.4 | 6.64 |
| d5 | 0.8 | 11.95 | 15.45 |
| d10 | 15.45 | 4.30 | 0.8 |
| d13 | 5.58 | 2.17 | 5.41 |
| d17 | 0.5 | 3.91 | 0.67 |

As can be seen apparently from Table 9 above, in the numerical value example 3, even if the focal length range is shifted to the longer side, the angle of view does not exhibit any change even where it is compared with that in the case of the numerical value example 1.

FIGS. 18A to 20C indicate the spherical aberrations, distortion aberrations and astigmatisms of the zoom lens 2 in the case of the numerical value example 3. It is to be noted that, in the spherical aberration views, a solid line indicates values on the "d" line, a broken line indicates values on the "g" line, and an alternate long and short dash line indicates values on the C line. In the astigmatism views, a solid line indicates values of the sagittal image plane distortion and a broken line indicates values of the meridional image plane distortion.

Figure 21:
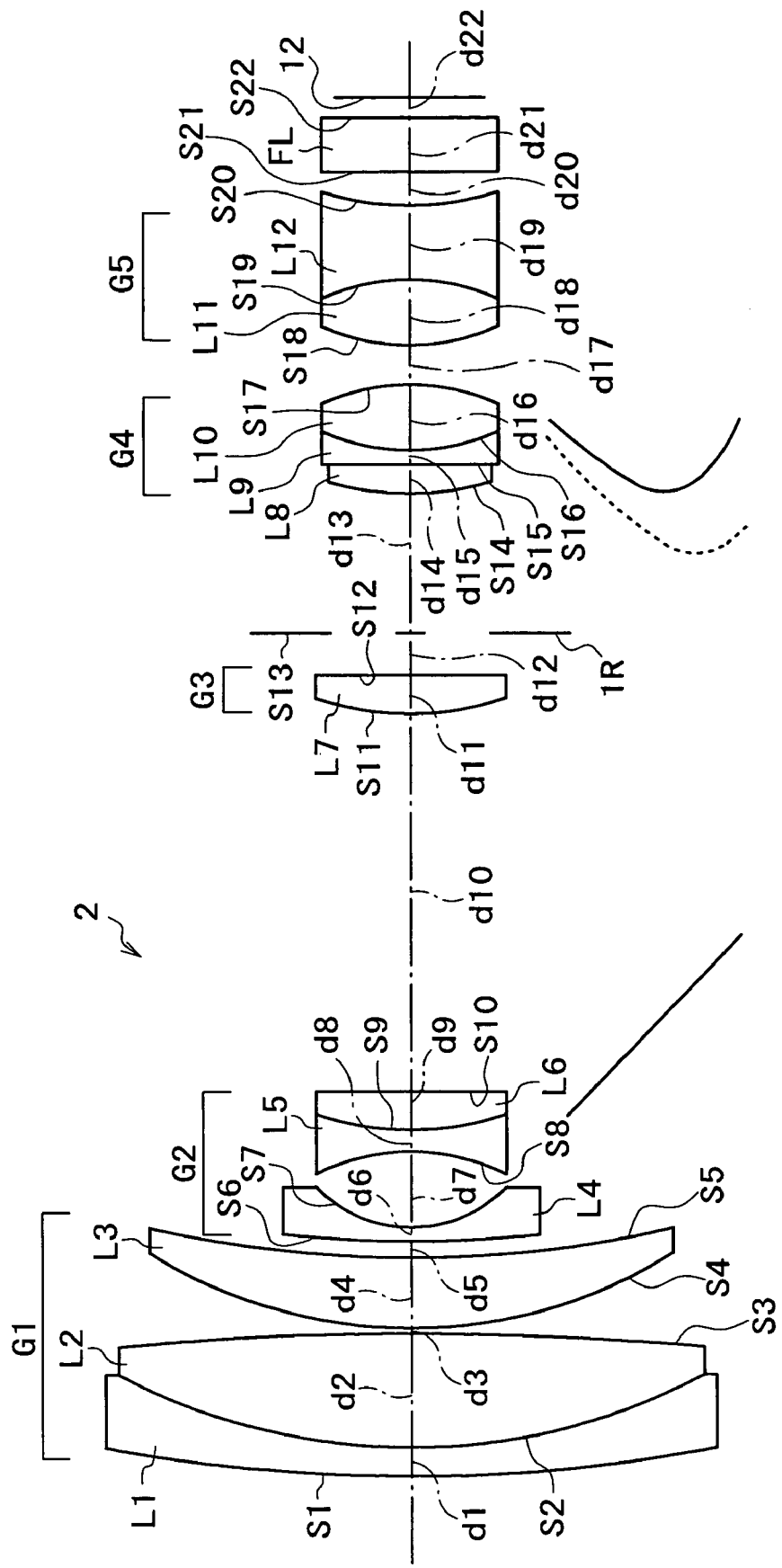
FIG. 21 is a view schematically showing a lens configuration of a numerical value example 4 (in a moving picture image pickup mode) of the zoom lens of the present invention.
Figure 22:
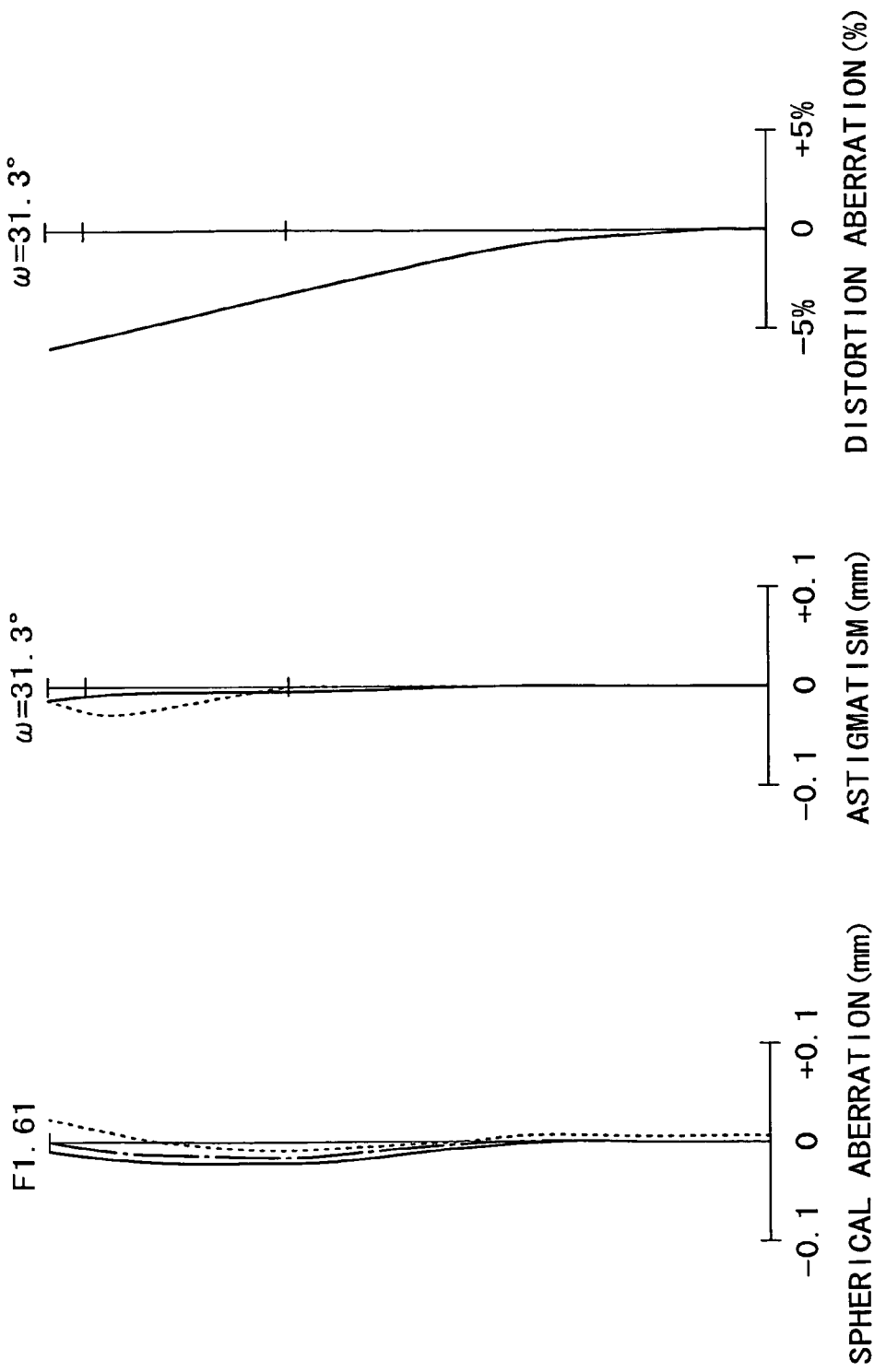
FIGS. 22A to 22C are views illustrating various aberrations at the wide angle end of the numerical value example 4 of the zoom lens of the present invention.
Figure 23:
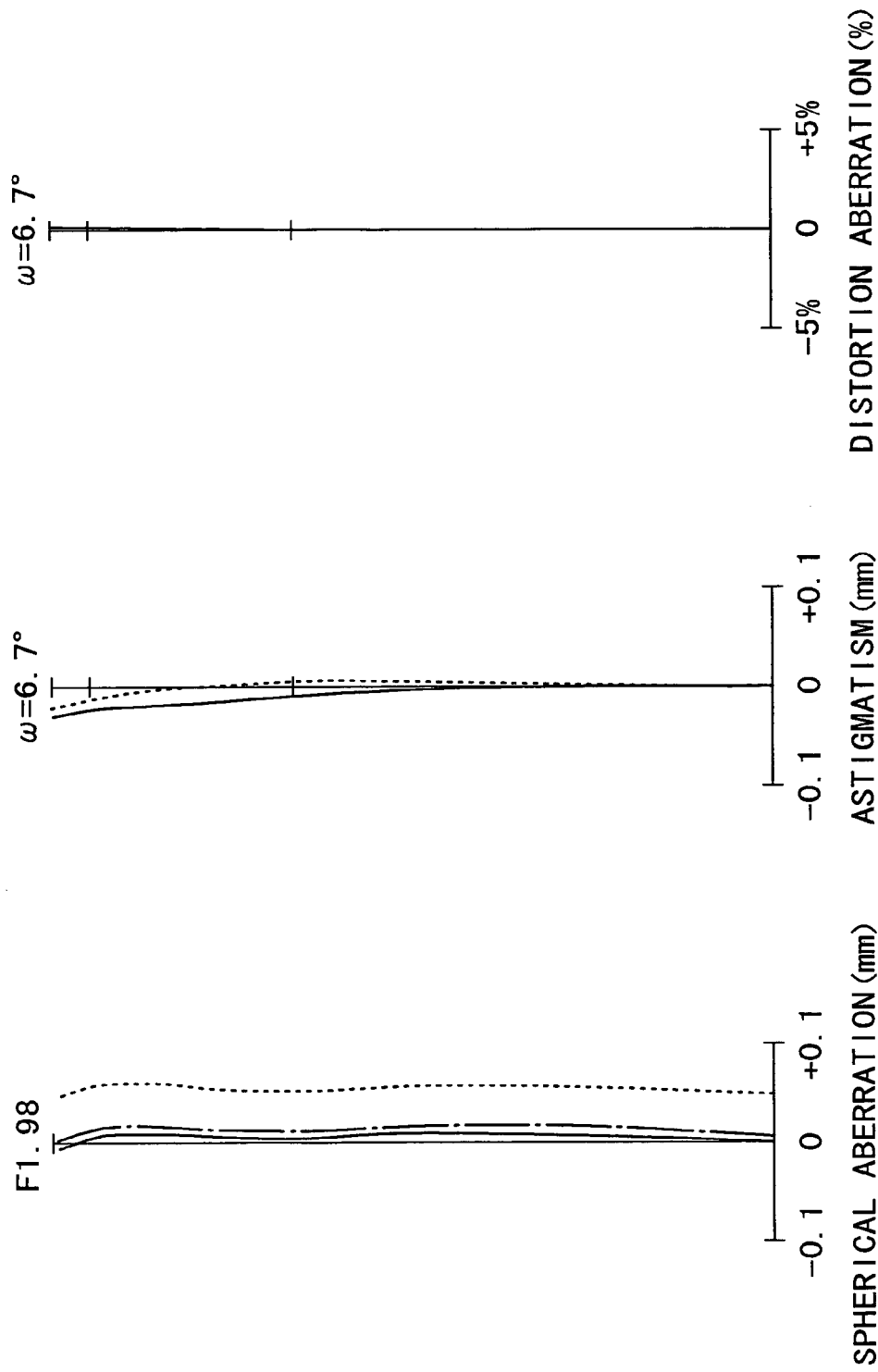
FIGS. 23A to 23C are views illustrating various aberrations at the intermediate focus position of the numerical value example 4 of the zoom lens of the present invention.
Figure 24:
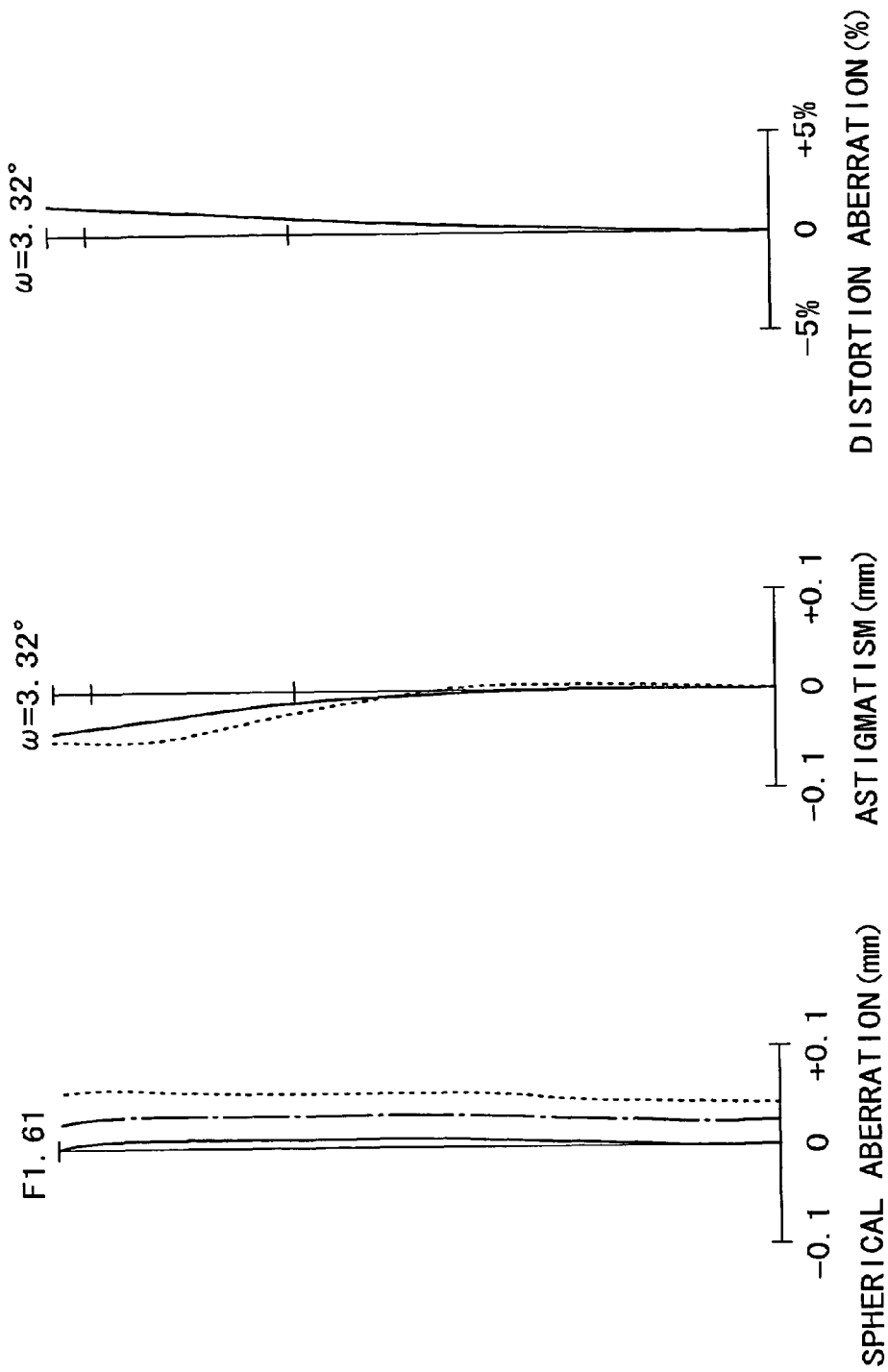
FIGS. 24A to 24C are views illustrating various aberrations at the tele-side end of the numerical value example 4 of the zoom lens of the present invention.

Table 10 indicates numerical values of the numerical value example 4 of the zoom lens 2. It is to be noted that, as shown in FIG. 21, the zoom lens 2 in the case of the numerical value example 4 is that in the state of the moving picture image pickup mode wherein the additional lens set G5 different from those of the numerical value examples 2 and 3 described hereinabove is additionally provided on the optical axis between the fourth lens set G4 of the zoom lens 2 in the case of the numerical value example 1 and the image pickup element 12. Accordingly, Table 10 indicates only the numerical values of the additional lens set G5 and those numerical values at portions on the image side with respect to the additional lens set G5.

TABLE 10

| ri | di | ni | vi |
|---|---|---|---|
| r18 = 9.16 | d18 = 2.48 | n11 = 1.51680 | v11 = 64.2 |
| r19 = −9.67 | d19 = 4.51 | n12 = 1.77250 | v12 = 49.6 |
| r20 = 93.67 | d20 = 0.75 |  |  |
| r21 = 8 (filter) | d21 = 2.09 | nFL = 1.51680 | vFL = 64.2 |
| r22 = 8 (filter) | d22 = 0.8 (Back Focus) |  |  |

Table 11 indicates the fourth-, sixth-, eighth- and tenth-order aspheric coefficients A4, A6, A8 and A10 of the eighteenth face S18 formed from an aspheric face.

TABLE 11

| Aspheric Co-efficient | A4 | A6 | A8 | A10 |
|---|---|---|---|---|
| S18 | $+0.2041 \times 10^{-3}$ | $+0.2068 \times 10^{-4}$ | $0.1940 \times 10^{-5}$ | $+0.1000 \times 10^{-6}$ |

Table 12 indicates the face-to-face distances d5, d10, d13 and d17 which vary in response to the focal length, F number, angle of view (2ω) and zooming at the wide angle end, intermediate focus position and tele-side end of the zoom lens 2 in the numerical value example 4.

TABLE 12

| | Wide angle end | Intermediate focus position | Tele-side end |
|---|---|---|---|
| Focal length | 3.46 | 16.71 | 33.34 |
| F number | 1.61 | 1.98 | 1.61 |
| Angle of view (degrees) | 62.6 | 13.4 | 6.64 |
| d5 | 0.8 | 11.95 | 15.45 |
| d10 | 15.45 | 4.30 | 0.8 |
| d13 | 5.58 | 2.17 | 5.41 |
| d17 | 1.06 | 4.47 | 1.23 |

As can be seen apparently from Table 12 above, in the numerical value example 4, even if the focal length range is shifted to the longer side, the angle of view does not exhibit any change even where it is compared with that in the case of the numerical value example 1.

FIGS. 21 to 24C indicate the spherical aberrations, distortion aberrations and astigmatisms of the zoom lens 2 in the case of the numerical value example 4. It is to be noted that, in the spherical aberration views, a solid line indicates values on the "d" line, a broken line indicates values on the "g" line, and an alternate long and short dash line indicates values on the C line. In the astigmatism views, a solid line indicates values of the sagittal image plane distortion and a broken line indicates values of the meridional image plane distortion.

Table 13 indicates numerical values relating to the conditional expressions 1 to 5 in the numerical value examples 2 to 4 wherein the additional lens set G5 is additionally provided in the zoom lens 2 of the numerical value example 1.

TABLE 13

| Numerical value example | | Numerical value example 2 | Numerical value example 3 | Numerical value example 4 |
|---|---|---|---|---|
| Overall length | | 54.8 | 54.8 | 54.8 |
| fw1 | | 4.61 | 4.61 | 4.61 |
| fw2 | | 3.93 | 3.84 | 3.46 |
| S5/fw2 | | 1.076 | 1.279 | 2.020 |
| fw2 · (n52−n51)/r52 | | −0.0928 | −0.0926 | −0.0915 |
| Effective radius | | 3.08 | 3.09 | 3.06 |
| Δ5/fw2 | | 0.00421 | 0.00444 | 0.00785 |
| f4/fw2 | | 3.817 | 3.907 | 4.336 |
| fw1/fw2−1 | a = 0.20 | 0.865a | 1.000a | 1.660a |
| | a = 0.25 | 0.692a | 0.800a | 1.320a |
| | a = 0.33 | 0.524a | 0.606a | 1.000a |
| | a = 0.40 | 0.433a | 0.501a | 0.831a |

In Table 13 above, where the value of "fw1/fw2−1" is 1.0a with respect to the value of a, this signifies that the angle of view does not vary between the still picture image pickup mode and the moving picture image pickup mode.

In the numerical value example 4 where a is a=0.20 and a=0.25, the value of "fw1/fw2−1" exceeds the upper limit (1.1a) of the conditional expression 1. Accordingly, in the numerical value example 4, where a is a=0.20 and a=0.25, the angle of view is narrower in the still picture image pickup mode than in the moving picture image pickup mode. In other words, the number of pixels in the effective screen region of the image pickup element 12 is smaller in the still picture image pickup mode than in the moving picture image pickup mode, and this does not conform to the object of the present invention.

It is to be noted that, where the value of "fw1/fw2−1" is smaller than 1.0a, the angle of view is narrower by an amount corresponding to the difference between the value and 1.0a. However, a margin of the effective image circle of the zoom lens 2 provided by the difference of the angle of view can be applied to camera-shake correction in a video signal process.

On the other hand, if the value of "fw1/fw2−1" is lower than the lower limit (0.4a) of the conditional expression 1, then the image correction effect by the additional lens set G5 is so low that the object of the present invention cannot be achieved.

Now, image pickup apparatus according to second, third and fourth embodiments of the present invention and a zoom lens for use with the image pickup apparatus according to the third embodiment are described. It is to be noted that the image pickup apparatus according to the second, third and fourth embodiments also have a still picture mode and a moving picture mode.

First, an outline of the image pickup apparatus is described with reference to FIGS. 25 to 29B.

The image pickup apparatus 1A, 1B and 1C have a basic configuration similar to that of the image pickup apparatus 1 according to the first embodiment shown in FIG. 1 and are roughly divided into a camera block 10, a recording and reproduction section 20 and an operation block 30. Thus, description is given principally of differences of the configurations and operations of the individual sections 10, 20 and 30 from those of the image pickup apparatus 1, but description of those portions similar to those of the image pickup apparatus 1 is omitted or is given but briefly.

The camera block 10 includes zoom lenses 2A, 2B and 2C serving as image pickup lenses and an image pickup element 12 and has a first image pickup mode and a second image pickup mode which can be arbitrarily selected upon image pickup. When the first image pickup mode is selected, individual information is obtained from each of pixels of an image pickup face of the image pickup element 12. However, when the second image pickup mode is selected, information obtained by mixing information from each plurality of adjacent pixels of the image pickup element is obtained from the image pickup element such that the image pickup element serves as an alternative image pickup element having a rougher pixel pitch.

Figures 26A, 26B:
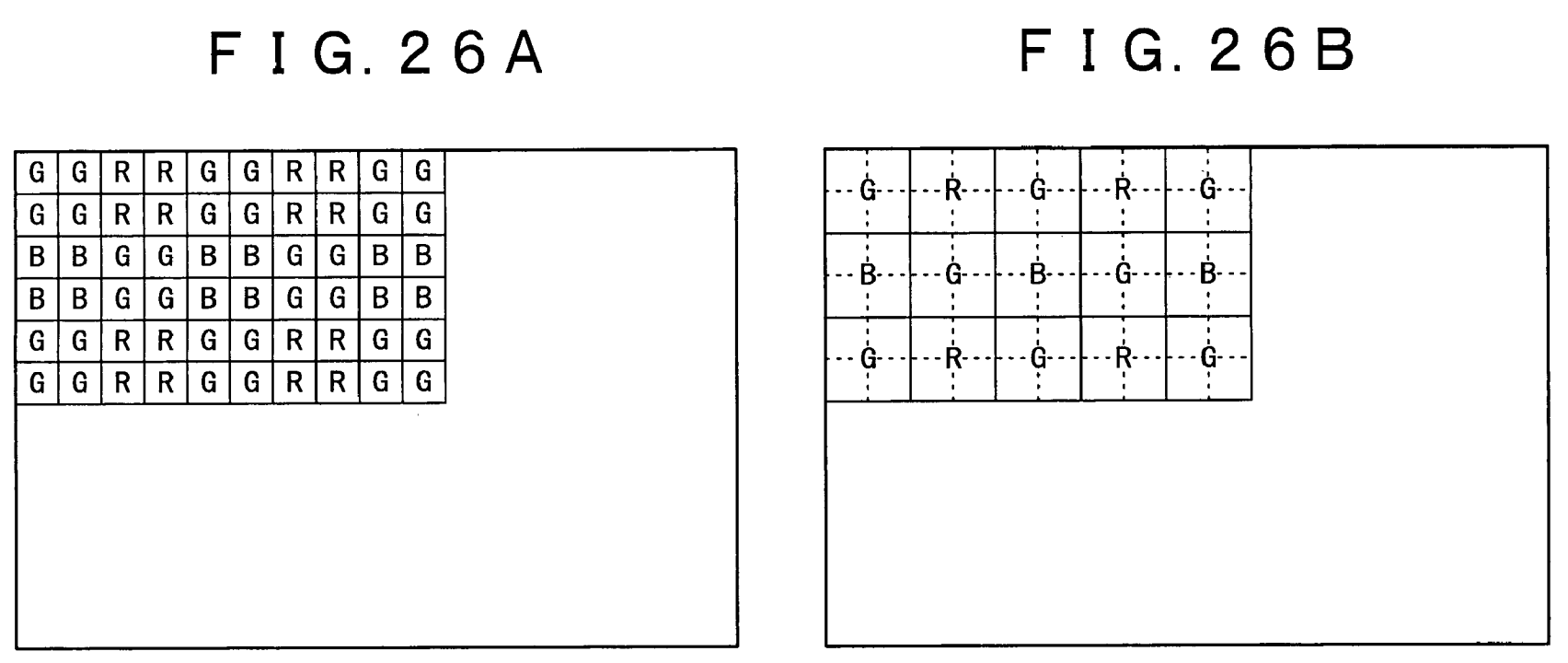

FIGS. 26A and 26B schematically illustrate a manner of changing over of the pixel pitch performed in response to changeover of the image pickup mode. Each pixel of the image pickup element 12 is covered with a color filter, and part of an arrangement of such color filters is schematically shown in FIG. 26A. In FIG. 26A, reference character R denotes a color filter which passes red light therethrough, G a color filter which passes green light therethrough, and B a color filter which passes blue light therethrough. As seen in FIG. 26A, a same color filter from among different color filters is repetitively arranged for each two pixels in the horizontal and vertical directions such that each totaling four pixels including two pixels in the horizontal direction and including two pixels in the vertical direction are covered with a filter of the same color.

In the first image pickup mode, individual video information is obtained from each of the pixels shown in FIG. 26A, and consequently, video information of a high resolution can be obtained. In the second image pickup mode, however, information of each four adjacent pixels for the same color is mixed and read out as a video signal as seen in FIG. 26B. Consequently, video information of a rougher pixel pitch wherein the pixel pitch is doubled in both of the horizontal and vertical directions is obtained.

It is to be noted that, as described hereinabove, the method wherein the colors (colors of the filters) of each totaling four pixels including two pixels in both of the horizontal and vertical directions are set same as each other is a mere example of a method of mixing information of a plurality of pixels. In particular, the number of pixels whose information is to be mixed is not limited to four but may be greater or smaller than four. Further, it is not necessary to select an equal number of pixels in both of the horizontal and vertical directions, but the shape of a pixel of an effectively rougher pitch as a result of mixing may be a horizontally elongated shape or a vertically elongated shape. In summary, any method may be selected in accordance with an object of use of an image to be obtained.

The image pickup element 12 photo-electrically converts image information by means of the pixels thereof arranged discretely. Therefore, the image pickup element 12 exhibits such defects as a color false signal or a moiré effect with regard to an image of a spatial frequency higher than the Nyquist frequency which depends upon the pixel pitch. In order to reduce the defects which rely upon the pixel pitch, it is necessary to dispose an optical low pass filter between the image pickup lens and the image pickup element 12 such that a point image to be originally formed at one point by the image pickup lens is formed discretely in a plurality of point images thereby to reduce the MTF of high frequency components of an image of the image pickup lens.

If the characteristic of the optical low pass filter is set suitably for the first image pickup mode, then a bad influence on the picture quality by a color false signal or a moiré effect appears remarkably in the second image pickup mode. However, if the characteristic of the optical low pass filter is set suitably for the second image pickup mode conversely, then a high resolution expected from a fine pixel pitch cannot be obtained in the first image pickup mode. Accordingly, it is desirable to change over the characteristic of the optical low pass filter in response to changeover between the first image pickup mode and the second image pickup mode.

Figure 25:
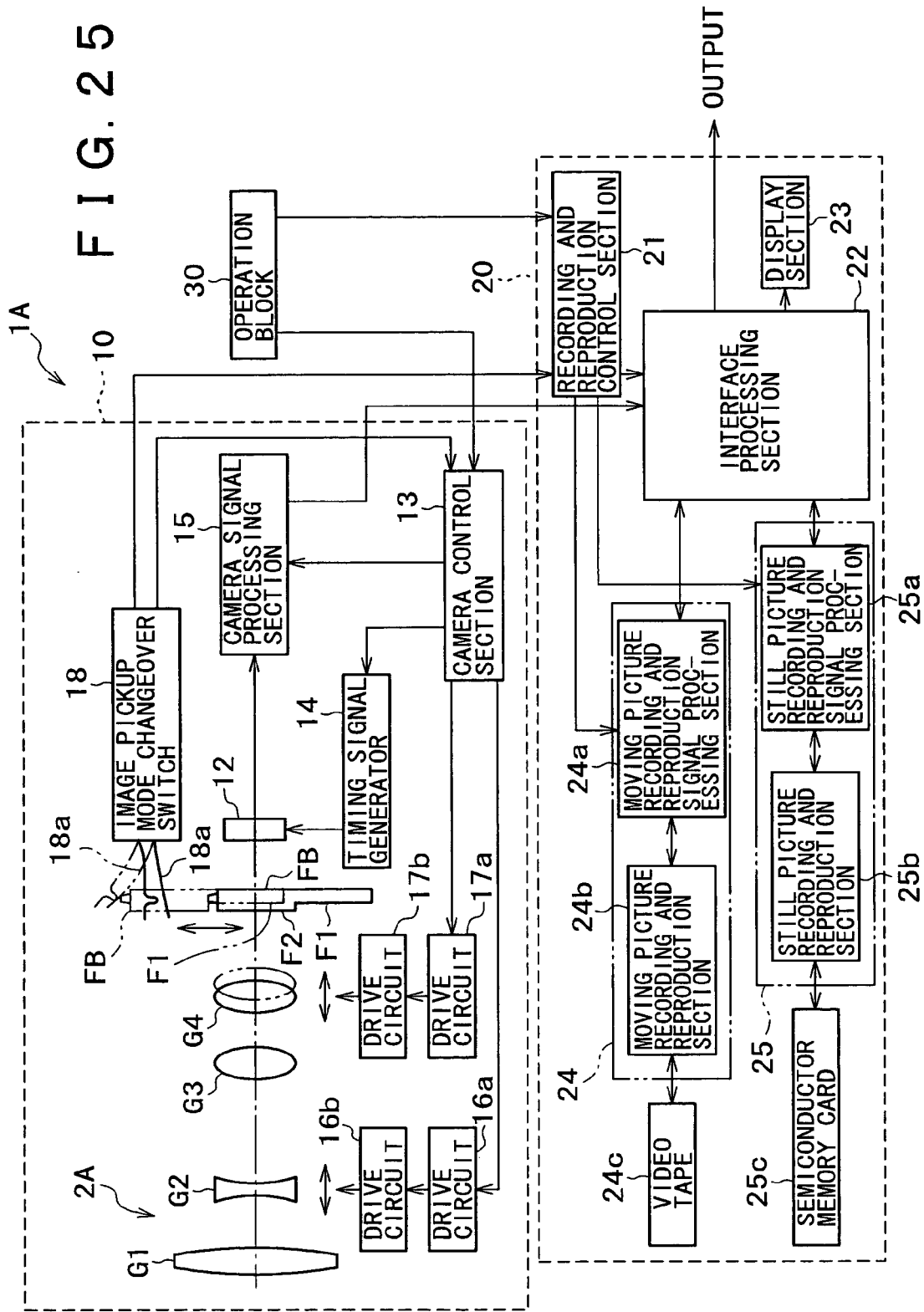
FIG. 25 is a block diagram showing a configuration of a second embodiment of the image pickup apparatus of the present invention.

In the second embodiment 1A shown in FIG. 25, a filter member FB on which optical low pass filters F1 and F2 having different characteristics from each other are held integrally is mounted for movement in a direction substantially perpendicular to the optical axis such that one of the optical low pass filters F1 and F2 is moved to the position on the optical axis. If the filter member FB is moved so that the optical low pass filter F1 is moved to the position on the optical axis as indicated by a broken line in FIG. 25, then a contact 18b of the image pickup mode changeover switch 18 is closed, and information of this is transmitted to the camera control section 13 of the camera block 10 and a recording and reproduction control section 21 of a recording and reproduction section 20. Consequently, all settings of the camera block 10 and the recording and reproduction section 20 are changed over so as to correspond to the first image pickup mode.

Then, if the optical low pass filter to be positioned on the optical axis is changed over from the optical low pass filter F1 to the optical low pass filter F2 as indicated by a solid line, then the contact 18b of the image pickup mode changeover switch 18 is opened, and information of this is transmitted to the camera control section 13 of the camera block 10 and the recording and reproduction control section 21 of the recording and reproduction section 20. Consequently, all settings of the camera block 10 and the recording and reproduction section 20 are changed over so as to correspond to the second image pickup mode. Further, although some displacement in the direction of the optical axis occurs with the image forming position due to an influence of a difference in thickness between the optical low pass filters F1 and F2, the camera control section 13 controls so that the position of the focus lens G4 in the direction of the optical axis is corrected to form an image on the image pickup element 12.

In the third embodiment 1B shown in FIG. 27, the normally fixed optical low pass filter F1 is disposed between the fourth lens set G4 of the zoom lens 2B and the image pickup element 12, and the optical low pass filter F1 has an optical characteristic suitable for the first image pickup mode. Further, the optical low pass filter F2 is mounted for movement substantially perpendicularly to the optical axis such that it can be moved to and from a position on the optical axis. If the optical low pass filter F2 is moved from the position on the optical axis as indicated by a broken line, then the contact 18b of the image pickup mode changeover switch 18 is closed, and all settings are set to the first image pickup mode similarly as in the image pickup apparatus 1A according to the second embodiment. On the other hand, if the optical low pass filter F2 is moved to the position on the optical axis, then the contact 18b of the image pickup mode changeover switch 18 is opened, and all settings are set to the second image pickup mode similarly as in the second embodiment 1A. Here, the optical low pass filter F2 has a characteristic that, when compared with the characteristic of the optical low pass filter F1, the MTF characteristic in high frequencies drops in one or both of the horizontal and vertical directions.

Figures 29A, 29B:
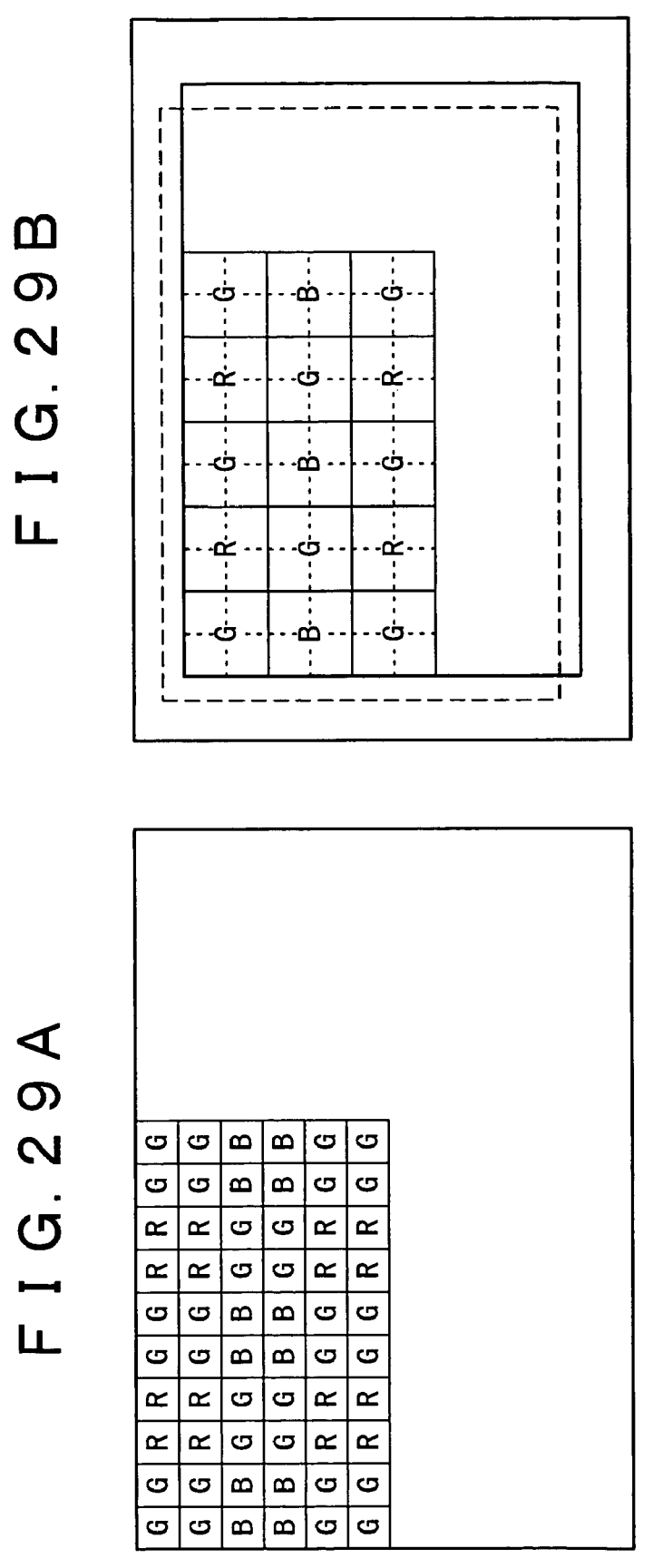

A manner of reading out pixel information of the image pickup element 12 in the image pickup apparatus 1C according to the fourth embodiment shown in FIG. 28 is schematically illustrated in FIGS. 29A and 29B.

When the first image pickup mode is selected, individual information is obtained from each pixel of the image pickup element, and a range as wide as possible is used as an effective screen region. When the second image pickup mode is selected, information obtained by mixing information from each plurality of adjacent pixels of the image pickup element is obtained from the image pickup element such that the image pickup element serves as an alternative image pickup element having a rougher pixel pitch. Further, when the second image pickup mode is selected, a range narrower than that when the first image pickup mode is selected is used as an effective screen region.

Further, in the image pickup apparatus 1C, a normally fixed first optical low pass filter F1 is disposed immediately before the image pickup element 12, and an additional lens set (fifth lens set) G5 having a positive refractive power and a movable second optical low pass filter F2 held integrally with the additional lens set G5 are disposed at a position on the object side with respect to the optical low pass filter F1. The additional lens set G5 is mounted for movement to and from a position on the optical axis. When the image pickup mode is changed over from the first image pickup mode to the second image pickup mode, the additional lens set G5 and the second optical low pass filter F2 are moved to respective positions on the optical axis to reduce the focal length range of the zoom lens and reduce the MTF of high frequencies by an effect of the second optical low pass filter F2. On the other hand, when the image pickup mode is changed over from the second image pickup mode to the first image pickup mode, the additional lens set G5 and the second optical low pass filter F2 are moved from the positions on the optical axis to increase the focal length range. Thereupon, because only the effect of the first optical low pass filter F1 remains, the MTF of high frequencies becomes higher. Thus, the variation of the angle of view caused by changeover of the MTF characteristic and a difference in dimension of the effective screen region in accordance with changeover of the pixel pitch of the image pickup element when the first image pickup mode is selected and when the second image pickup mode is selected is moderated.

Upon image pickup of moving pictures in the second image pickup mode, a fluctuation of the image pickup apparatus can be detected, and the position of an effective image read out in moving pictures from the full-size screen is displaced for every field in accordance with the detected fluctuation to correct the image against a fluctuation by a camera shake. In FIG. 29B, a rectangle indicated by broken lines schematically illustrates that the position at which an image is read out in a moving picture is displaced for every field to perform correction against a camera shake.

Further, in the image pickup apparatus 1C, the movement of the additional lens set and the second optical low pass filter F2 to and from the positions on the optical axis is detected to set the states of the components in accordance with the first image pickup mode or the second image pickup mode.

It is to be noted that, for example, such a drive apparatus as the drive apparatus 19b shown in FIGS. 2 to 7 can be utilized for the movement of the filter member FB of the image pickup apparatus 1A, the second optical low pass filter F2 of the image pickup apparatus 1B and the additional lens set 5G and the movable optical low pass filter F2 to and from the position or positions on the optical axis.

Now, an outline of the zoom lens 2C suitable for use with the image pickup apparatus 1C according to the fourth embodiment is described.

Figure 30:
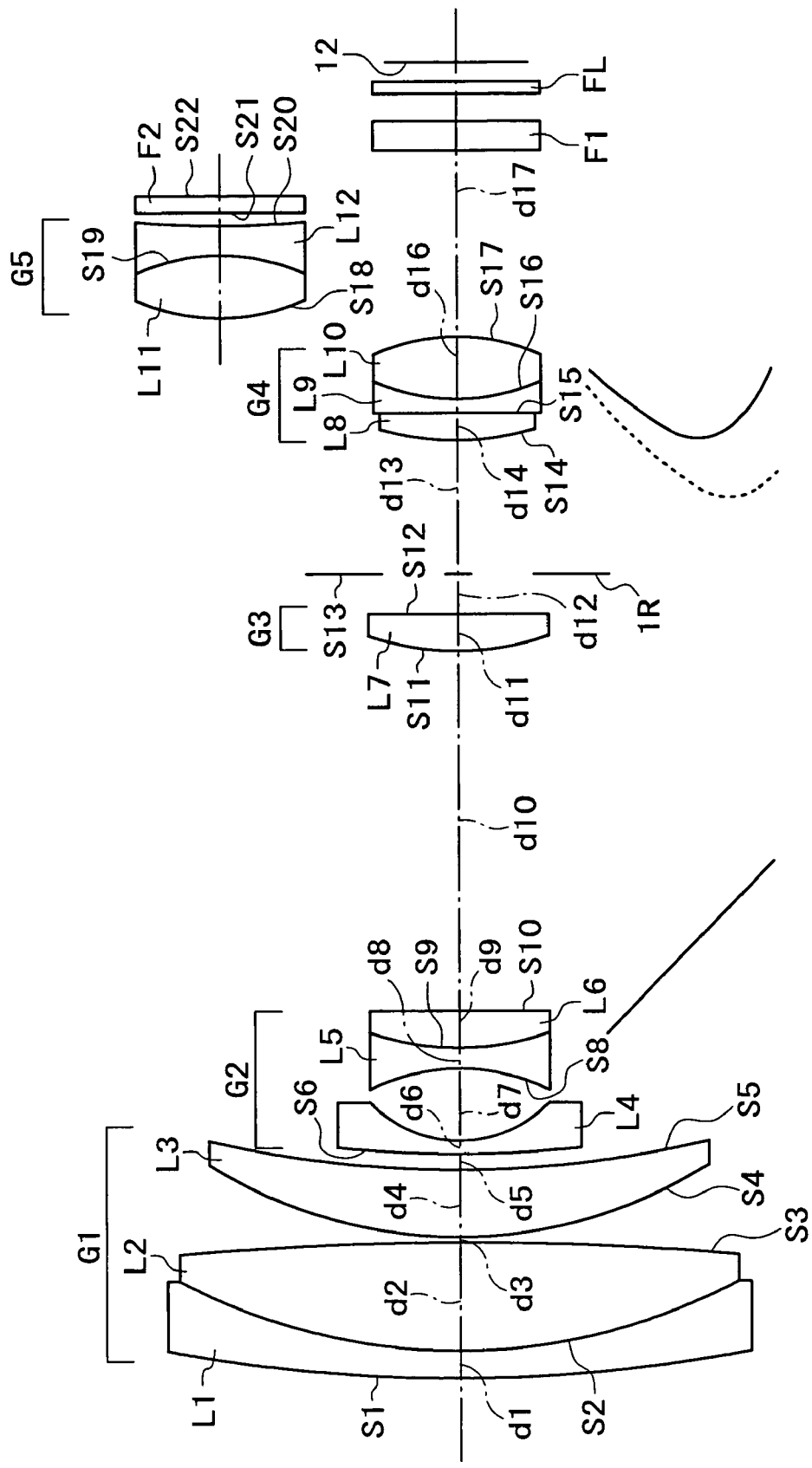
FIG. 30 is a view schematically showing a lens configuration of a numerical value example 5 (in a still picture image pickup mode) of the zoom lens of the present invention.
Figure 31:
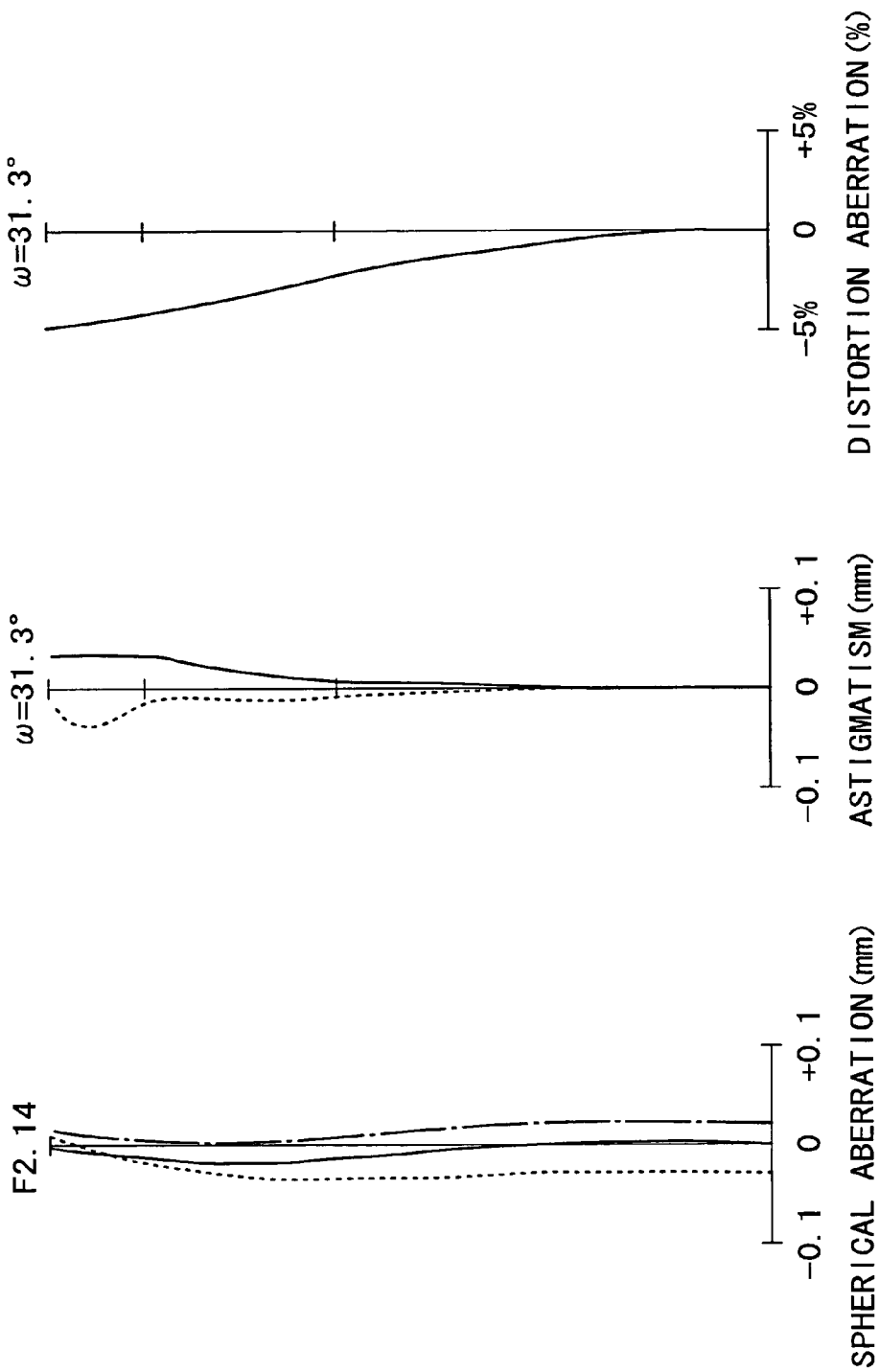
FIGS. 31A to 31C are views illustrating various aberrations at the wide angle end of the numerical value example 5 of the zoom lens of the present invention.
Figure 32:
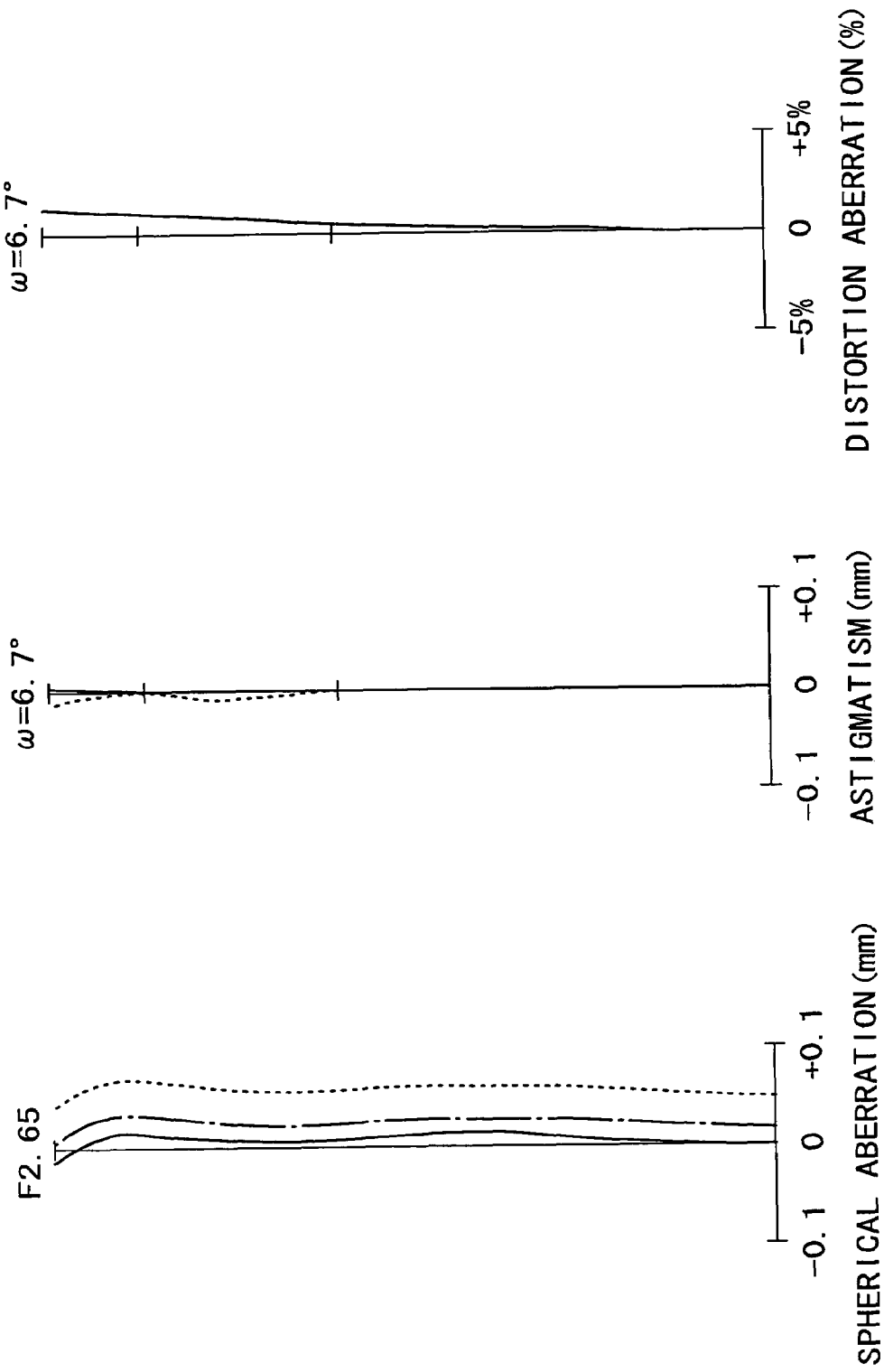
FIGS. 32A to 32C are views illustrating various aberrations at the intermediate focus position of the numerical value example 5 of the zoom lens of the present invention.
Figure 33:
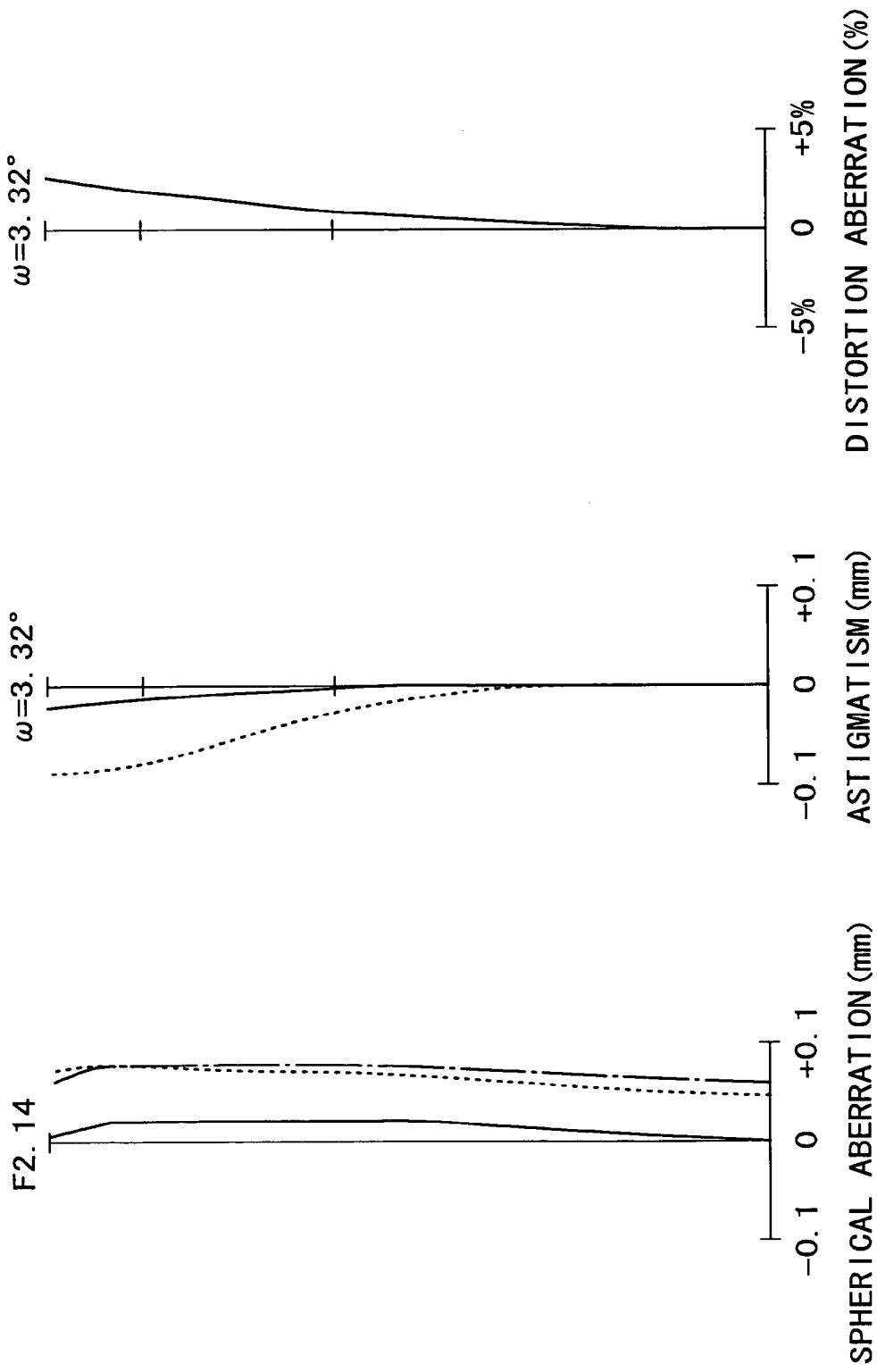
FIGS. 33A to 33C are views illustrating various aberrations at the tele-side end of the numerical value example 5 of the zoom lens of the present invention.

The zoom lens 2C of the present invention includes, as shown in FIG. 30, a first lens set G1, a second lens set G2, a third lens set G3, a fourth lens set G4, an additional lens set G5 and an second optical low pass filter F2 disposed in order from the object side. The first lens set G1 has a positive refractive power and has a normally fixed position. The second lens set G2 has a negative refractive power and is movable along the optical axis to principally perform power variation. The third lens set G3 has a positive refractive power and has a normally fixed position. The fourth lens set G4 has a positive refractive power and is movable along the optical axis to perform correction for a variation of the image position and focusing. The additional lens set G5 has a positive refractive power. The second optical low pass filter F2 is held for integral movement with the additional lens set G5. The additional lens set G5 is formed as a cemented lens of an eleventh lens L11 in the form of a biconvex lens and a twelfth lens L12 in the form of a biconcave lens disposed in order from the object side. The face of the eleventh lens L11 on the object side is formed as an aspheric surface. The additional lens set G5 and the second optical low pass filter F2 are moved to and from the respective positions on the optical axis and act to shift the focal length range of the entire lens system depending upon whether they are positioned on or moved from the optical axis. Where the total thickness of the additional lens set G5 and the optical low pass filter F2 is represented by S5, the focal length at the wide angle end of the lens system including the first to fourth lens sets and the additional lens set by fw2, the refractive index of the biconvex lens of the additional lens set G5 on the "d" line by n51, the refractive index of the biconcave lens of the additional lens set G5 on the "d" line by n52, the radius of curvature of the interface of the additional lens set G5 by r52, and the amount of deformation of the aspheric surface of the additional lens set G5 from a generating face at a position of an effective radius (the deformation amount is in the positive where it is provided on the image side) by Δ5, they are conditioned so as to satisfy the following conditional expressions 2 to 4:

$0.7 < S5/fw2 < 2.5$ (conditional expression 2),
$-0.11 < fw2 \cdot (n2-n1)/r52 < -0.085$ (conditional expression 3) and $0.003 < \Delta 5/fw2 < 0.01$ (conditional expression 4)

Meanwhile, as shown in FIG. 30, the first lens set G1 includes a cemented lens of a first lens L1 in the form of a concave meniscus lens and a second lens L2, and a third lens L3 in the form of a convex meniscus lens disposed in order from the object side. The first lens L1 has a convex face directed to the object side. The third lens L3 has a convex face directed to the object side. The second lens set G2 is formed from a cemented lens of a fourth lens L4 in the form of a concave lens, a fifth lens L5 in the form of a biconcave lens and a sixth lens L6 in the form of a convex lens disposed in order from the object side. The third lens set G3 includes a seventh lens L7 in the form of a biconvex lens having faces at least one of which is an aspheric face. The fourth lens set G4 is formed from a three-element cemented lens of an eighth lens L8 in the form of a convex lens, a ninth lens L9 in the form of a concave lens and a tenth lens L10 in the form of a convex lens disposed in order from the object side. At least one of a face of the fourth lens set G4 most adjacent the object side and a face of the fourth lens set G4 most adjacent the image side is formed as an aspheric face. It is to be noted that an iris IR is interposed between the third lens set G3 and the fourth lens set G4.

Further, the zoom lens 2C is formed so as to satisfy, where the focal length of the fourth lens set G4 is represented by f4, $2.5 < f4/fw2 < 5$ (conditional expression 5).

Incidentally, the zoom lens 2C is designed intending that, even if the focal length is shifted as a result of movement of the additional lens set G5 and the second optical low pass filter F2 to and from the respective positions on the optical axis between the fourth lens set G4 and the image pickup element 12, the total length from the first lens set G1 to the image pickup element 12 does not vary.

Subsequently, the conditional expressions 2 to 5 which prescribe the configuration the image pickup apparatus 1C and the zoom lens 2C are described.

The conditional equation 2 prescribes a condition necessary to make it possible to materialize the configuration wherein a thick positive lens set having a positive refractive index is additionally provided as a total thickness of the additional lens set G5 and the second optical low pass filter F2.

In particular, if the value of "S5/fw2" is lower than the lower limit value therefor, then the sufficient effect of reducing the focal length and the object of making the overall length invariable cannot be achieved. On the other hand, if the value of "S5/fw2" is higher than the upper limit value therefor, then the additional lens set G5 is excessively thick and cannot be inserted into the space as a back focus.

The conditional expression 3 prescribes a condition for correcting a variation of the spherical aberration caused by the movement of the additional lens set G5 and the second optical low pass filter F2 to and from the respective positions on the optical axis. It is to be noted that, since the additional lens set G5 is a positive lens set, a spherical aberration on the under side is liable to appear. However, if a negative refractive index is provided to the interface whose concave face is directed to the object side disposed in a converging light flux, then an effect of correcting a spherical aberration on the under side is obtained.

Then, if the value of "fw2·(n52−n51)/r52" is higher than the upper limit value therefor, then it is difficult to correct a spherical aberration on the under side. On the other hand, if the value of "fw2·(n52−n51)/r52" is lower than the lower limit value therefor, then the spherical aberration is liable to come to the over side, and also the image plane is curved to the over side to such a degree that it is difficult to correct the image plane.

The conditional equation 4 prescribes a condition for correcting a curve of the image plane. If the condition prescribed by the conditional expression 3 given hereinabove is satisfied and the spherical aberration on the under side is corrected, then an image plane curve aberration on the over side is generated by the additional lens set G5 and the second optical low pass filter F2. However, if the condition prescribed by the conditional expression 4 is satisfied such that the aspheric shape of the face of the additional lens set G5 on the object side is set so as to provide a deformation amount from the generating spherical face in a direction in which the curvature increases as the distance from the optical axis increases, then the influence by the condition prescribed by the conditional expression 3 can be canceled to correct the image plane curve aberration. In order to keep a good condition with regard to the spherical aberration and the image plane curve irrespective of the movement of the additional lens set G5 and the second optical low pass filter F2 to and from the positions on the optical axis, it is important to keep a good balance between the condition prescribed by the conditional expression 3 and the condition prescribed by the conditional expression 4.

If the value of "Δ5/fw2" in the conditional expression 4 is lower than the lower limit therefor, then the influence of the condition prescribed by the conditional expression 3 remains, and the image plane is curved to the over side. On the other hand, if the value of "Δ5/fw2" is higher than the upper limit therefor, then the spherical aberration is curved to the under side, and it is difficult to keep a good balance.

The conditional expression 5 prescribes a condition for assuring a back focus suitable for the movement of the additional lens set G5 and the second optical low pass filter F2 to and from the positions on the optical axis without increasing the size of the entire lens system.

In particular, if the value of "f4/fw2" is lower than the lower limit therefor, then the back focus becomes short. On the other hand, if the value of "f4/fw2" is higher than the upper limit therefor, then the back focus becomes so long that, as a lens to be inserted in the back focus, an element proximate to a prism for separating light into three colors of R, G and B is required. Therefore, increase in size and cost of the zoom lens 2C cannot be avoided.

Now, numerical value examples 5 and 6 with which the zoom lens 2C is materialized based on the configuration shown in FIG. 30 are described. It is to be noted that the numerical value example 5 relates to the zoom lens 2C in a state in the still picture mode in which the first to fourth lens sets G1 to G4 shown in FIG. 30 are used while the numerical value example 6 relates to the zoom lens 2C in another state in the moving picture mode (FIG. 34) in which the additional lens set G5 and the second optical low pass filter F2 are additionally used in the configuration shown in FIG. 30.

In the following description, "Si" indicates the ith face as counted from the object side, "ri" the radius of curvature of the i-th face "Si" as counted from the object side, "di" the face-to-face distance between the i-th face "Si" and the (i+1)th face "Si+1" as counted from the object side, "ni" the refractive index of the material of the i-th lens "Li" on the "d" line, "vi" the Abbe number of the material of the i-th lens "Li" on the "d" line, "nQ" and "vQ" indicate the refractive index and the Abbe number of the material of the optical low pass filter, and "nFL" and "vFL" the refractive index and the Abbe number of the material of another filter FL. Further, it is assumed that, where "xi" represents the depth of the aspheric face and "H" represents the height from the optical axis, the aspheric face is defined by the expression 1 given hereinabove.

Numerical values of the numerical value example 5 of the zoom lens 2C are indicated in Table 14 (refer to FIG. 30). It is to be noted that the numerical values with regard to the first to fourth lens sets G1 to G4 are same (refer to Table 1) as those in the numerical value example 1 of the zoom lens 2 according to the first embodiment described hereinabove. Accordingly, Table 14 indicates only the numerical values of the additional lens set G5 and those numerical values at portions on the image side with respect to the additional lens set G5.

TABLE 14

| ri | di | ni | vi |
|---|---|---|---|
| F1 8 | d = 1.14 | nQ = 1.544 | vQ = 59 |
| 8 | d = 1.2 | | |
| Filter 8 | d = 0.5 | nFL = 1.51680 | vFL = 64.2 |
| 8 | back focus = 0.8 | | |

It is to be noted that the values of the fourth-, sixth-, eighth- and tenth-order aspheric coefficients A4, A6, A8 and A10 of the eleventh face S11 and the fourteenth face S14 each formed as an aspheric face are same as those in the first embodiment described hereinabove. Therefore, Table 2 is quoted for them.

Table 15 indicates the face-to-face distances d5, d10, d13 and d17 which vary in response to the focal length, F number, angle of view (2ω) and zooming at the wide angle end, intermediate focus position and tele-side end of the zoom lens 2C in the numerical value example 5.

TABLE 15

| | Wide angle end | Intermediate focus position | Tele-side end |
|---|---|---|---|
| Focal length | 4.61 | 22.27 | 44.44 |
| F number | 2.14 | 2.65 | 2.14 |
| Angle of view (degrees) | 62.6 | 13.4 | 6.64 |
| d5 | 0.8 | 11.95 | 15.45 |
| d10 | 15.45 | 4.30 | 0.8 |
| d13 | 5.58 | 2.17 | 5.41 |
| d17 | 7.92 | 11.33 | 8.09 |

FIGS. 31A to 33C indicate the spherical aberrations, astigmatisms and distortion aberrations at the focal lengths in the numerical value example 5. It is to be noted that, in the spherical aberration views, a solid line indicates values on the "d" line, a broken line indicates values on a "g" line, and an alternate long and short dash line indicates values on a C line. In the astigmatism views, a solid line indicates values of the sagittal image plane distortion and a broken line indicates values of the meridional image plane distortion.

Figure 34:
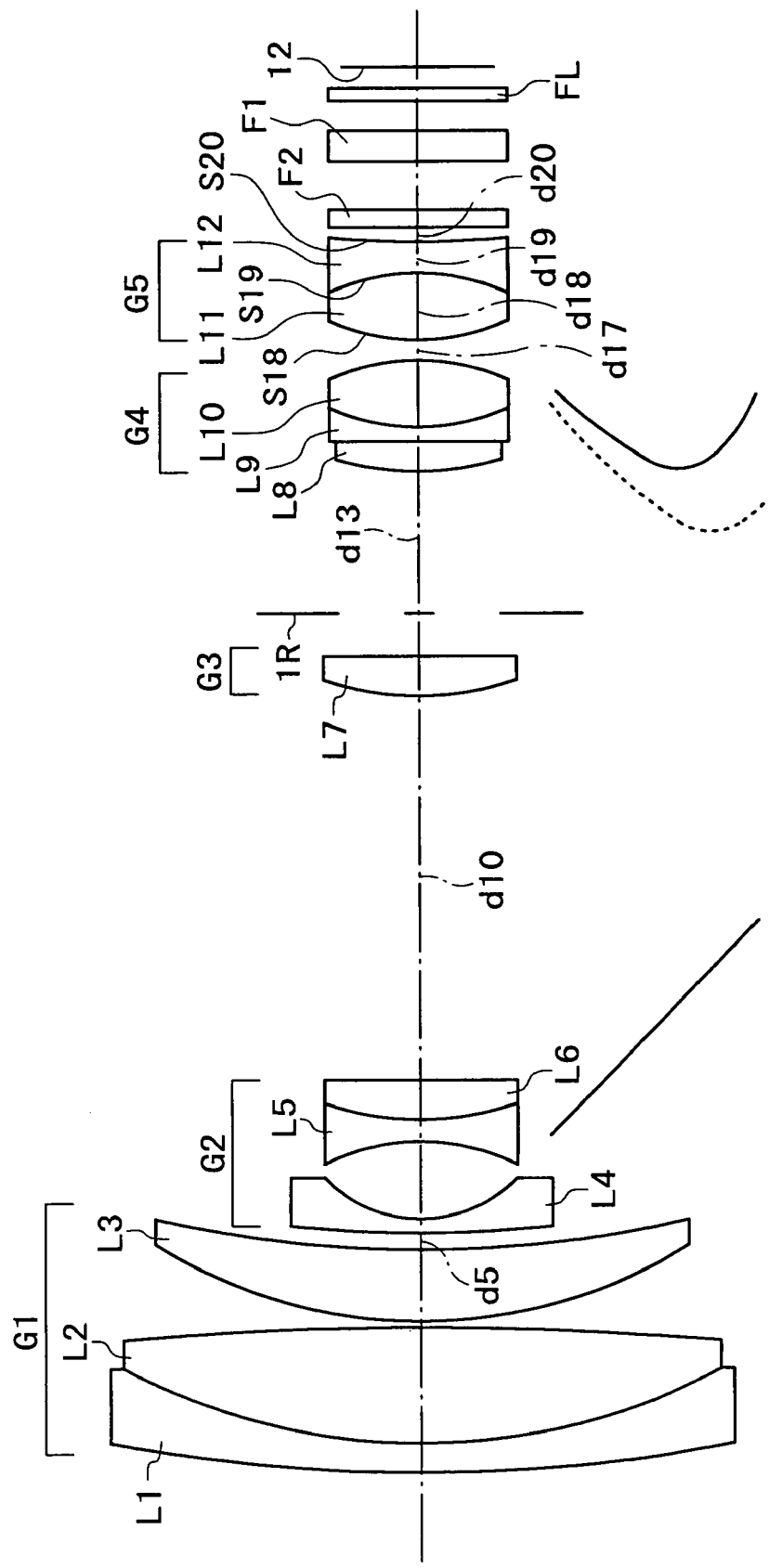
FIG. 34 is a view schematically showing a lens configuration of a numerical value example 6 (in a moving picture image pickup mode) of the zoom lens of the present invention.
Figures 37A, 37B, 37C:
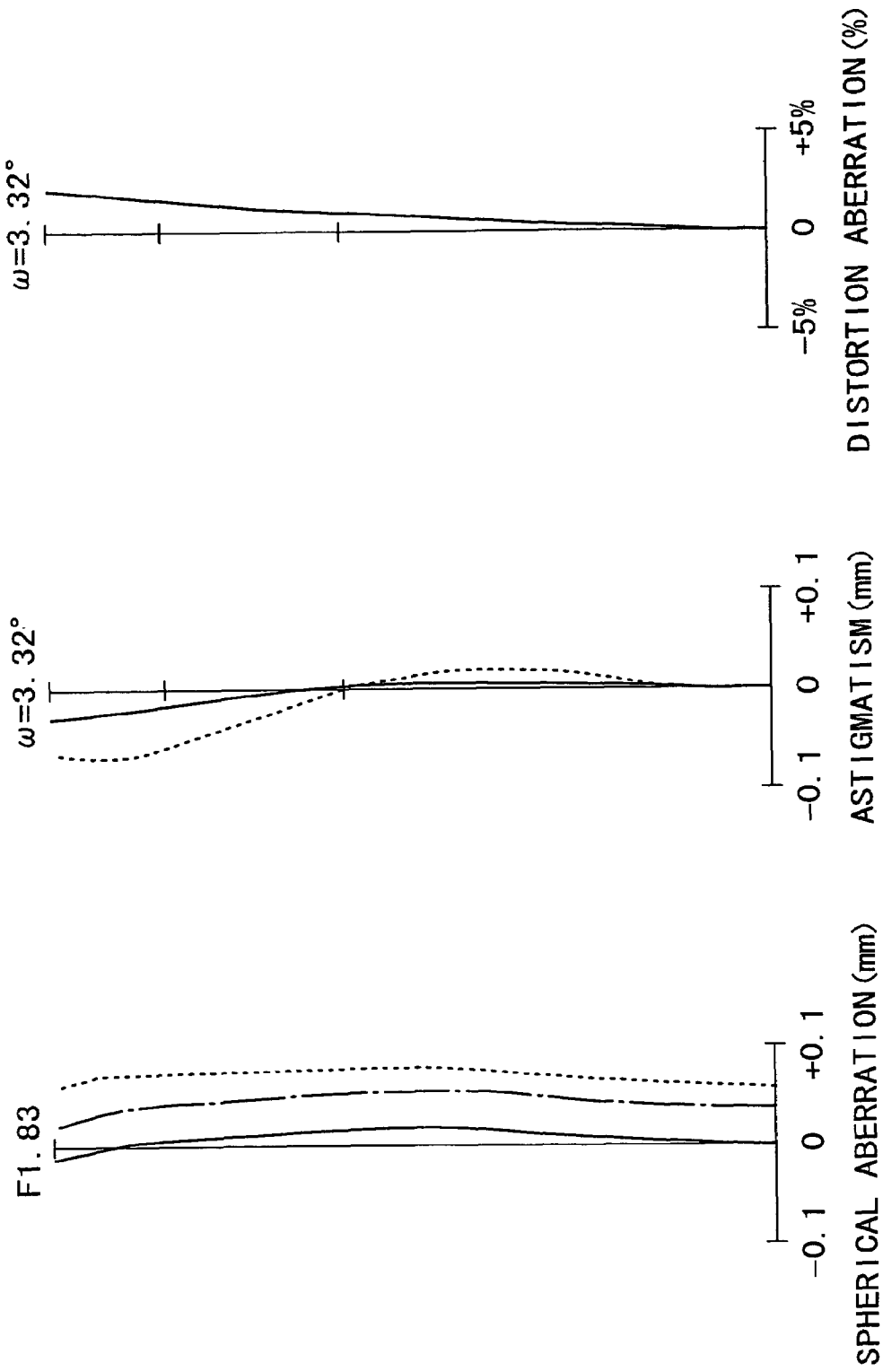
FIGS. 37A to 37C are views illustrating various aberrations at the tele-side end of the numerical value example 6 of the zoom lens of the present invention.
Figure 38A:
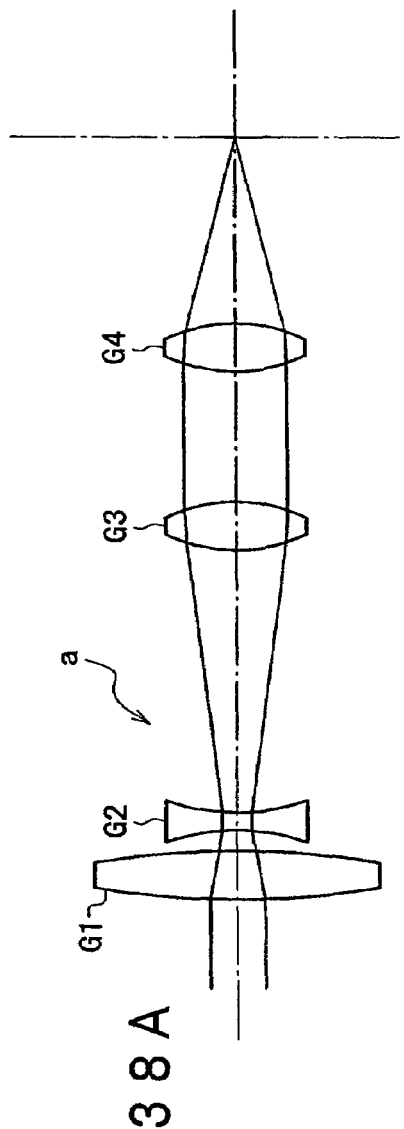
FIGS. 38A and 38B are schematic views showing an example of a conventional zoom lens and a state wherein an additional lens set is positioned on an optical axis of the conventional zoom lens between a fourth lens set and an image pickup element for shifting the focal length range of the conventional zoom lens to the longer side.
Figure 38B:
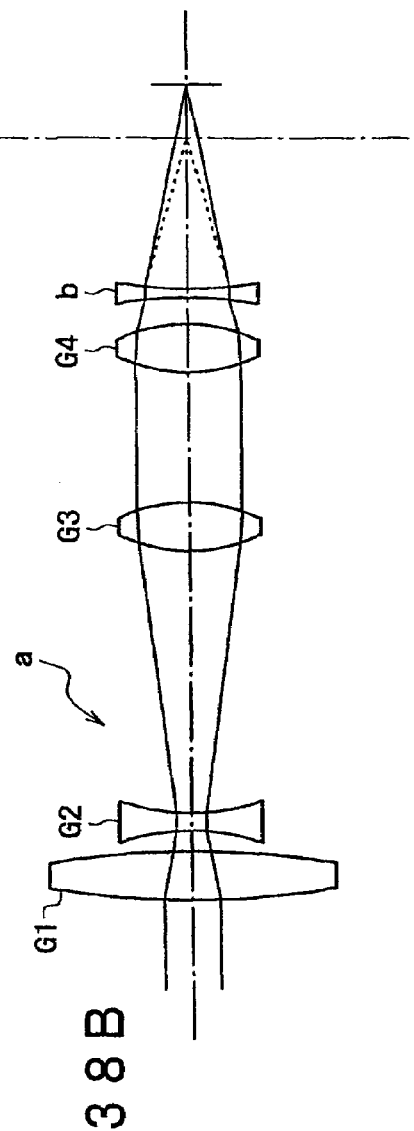

Numerical values of the numerical value example 6 where the additional lens set G5 and the second optical low pass filter F2 are positioned on the optical axis as seen in FIG. 34 in the numerical value example 1 described hereinabove are indicated in Table 16. It is to be noted that, also Table 16 indicates only the numerical values of the additional lens set G5 and those numerical values at portions on the image side with respect to the additional lens set G5.

TABLE 16

| ri | di | ni | vi |
|---|---|---|---|
| r18 = 14.529 | d18 = 2.13 | n11 = 1.58313 | v11 = 59.5 |
| r19 = −9.36 | d19 = 1.6 | n12 = 1.80420 | v12 = 46.5 |
| r20 = 153.5 | d20 = 0.5 | | |
| F2 8 | d = 0.6 | nQ = 1.544 | vQ = 59 |
| 8 | d = 1.89 | | |
| F1 8 | d = 1.14 | nQ = 1.544 | vQ = 59 |
| 8 | d = 1.2 | | |
| Filter 8 | d = 0.5 | nFL = 1.51680 | vFL = 64.2 |
| 8 | back focus = 0.8 | | |

Table 17 indicates the fourth-, sixth-, eighth- and tenth-order aspheric coefficients A4, A6, A8 and A10 of the eighteenth face S18 formed from an aspheric face.

TABLE 17

| Aspheric Co-efficient | A4 | A6 | A8 | A10 |
|---|---|---|---|---|
| S18 | $+0.5892 \times 10^{-4}$ | $+0.3239 \times 10^{-4}$ | $-0.3407 \times 10^{-5}$ | $+0.1457 \times 10^{-6}$ |

Table 18 indicates the face-to-face distances d5, d10, d13 and d17 which vary in response to the focal length, F number, angle of view (2ω) and zooming at the wide angle end, intermediate focus position and tele-side end of the zoom lens 2C in the numerical value example 6.

TABLE 18

| | Wide angle end | Intermediate focus position | Tele-side end |
|---|---|---|---|
| Focal length | 3.93 | 19.00 | 37.92 |
| F number | 1.83 | 2.26 | 1.83 |
| Angle of view (degrees) | 62.6 | 13.4 | 6.64 |
| d5 | 0.8 | 11.95 | 15.45 |
| d10 | 15.45 | 4.30 | 0.8 |
| d13 | 5.58 | 2.17 | 5.41 |
| d17 | 1.2 | 4.61 | 1.37 |

FIGS. 35A to 37C indicate the spherical aberrations, astigmatisms and distortion aberrations at the focal lengths in the case of the numerical value example 6. It is to be noted that, in the spherical aberration views, a solid line indicates values on the "d" line, a broken line indicates values on the "g" line, and an alternate long and short dash line indicates values on the C line. In the astigmatism views, a solid line indicates values of the sagittal image plane distortion and a broken line indicates values of the meridional image plane distortion.

It is to be noted that the particular shapes and structures of the components disclosed in connection with the embodiments described above indicate mere examples of materialization in carrying out the present invention, and the technical scope of the present invention shall not be interpreted restrictively by them.

INDUSTRIAL APPLICABILITY

In the image pickup apparatus of the present invention, when the first image pickup mode is selected, the additional lens set is moved from the position on the optical axis to elongate the focal length range. However, when the second image pickup mode is selected, the additional lens set is moved to the position on the optical axis to reduce the focal length range. Consequently, the variation of the image pickup angle of view caused by a difference between the effective screen regions in the first image pickup mode and the second image pickup mode can be moderated to prevent a user from having a sense of incongruity upon changeover between the first image pickup mode and the second image pickup mode.

Further, with the zoom lens of the present invention, the variation of the image pickup angle of view caused by a difference of the size of the effective screen region of the image pickup element in response to selection of an image pickup mode can be moderated, and a video image of a high quality whose various aberrations are corrected well can be obtained. Accordingly, where the zoom lens is applied to an image pickup lens for an image pickup apparatus which has image pickup modes in which, for example, the size of the effective screen region is different, when the additional lens set is moved from the position on the optical axis, the focal length range is elongated, but when the additional lens set is moved to the position on the optical axis, the focal length range is reduced. Consequently, the variation of the image pickup angle of view caused by a difference in size of the effective screen region can be moderated to prevent a user from having a sense of incongruity upon changeover between the first image pickup mode and the second image pickup mode.

The invention claimed is:

1. An image pickup apparatus which includes a zoom lens and an image pickup element and has a first image pickup mode and a second image pickup mode which can be arbitrarily selected upon image pickup by said image pickup apparatus, said image pickup element having an image pickup plane which is used, when the first image pickup mode is selected, over a range as great as possible as an effective screen region but is used, when the second image pickup mode is selected, over a smaller range than that when the first image pickup mode is selected as an effective screen region, comprising:
    said zoom lens includes an additional lens set having a positive refractive index and provided at a position nearest to the image side for movement (a) to a position on an optical axis of said zoom lens and (b) to a position outside a light path,
    wherein said additional lens set is moved, in response to changeover from the first image pickup mode to the second image pickup mode, to the position on the optical axis to reduce a focal length range of said zoom lens but is moved, in response to changeover from the second image pickup mode to the first image pickup mode, to the position outside the light path to increase the focal length range thereby to moderate a variation of an angle of view which is caused by a difference in range of the effective screen region of said image pickup element when the first image pickup mode is selected and when the second image pickup mode is selected, position detecting device detecting the movement of said additional lens; and control device receiving the detected movement of said additional lens set from said position detecting device and setting components of said image pickup apparatus to respective conditions suitable for the first image pickup mode or the second image pickup mode based upon the detected movement, wherein the first image pickup mode is a still picture image pickup mode for picking up an image of a still picture, that the second image pickup mode is a moving picture image pickup mode for picking up an image of a moving picture, and that, where the diagonal dimension of the effective screen region of said image pickup element is 1 in the moving picture image pickup mode but 1+α in the still picture image pickup mode, the relationship between the focal lengths of said zoom lens in the moving and still picture image pickup modes and the diagonal dimension of the effective screen region of said image pickup element satisfies a condition of $$0.4\alpha < fw1/fw2 - 1 < 1.1\alpha$$

where fw1 is the focal length at the wide angle end of said zoom lens in the still picture image pickup mode, and fw2 is the focal length at the wide angle of said zoom lens in the moving picture image pickup mode.

2. An image pickup apparatus according to claim 1, wherein said zoom lens further includes a plurality of fixed lens sets each having a normally fixed position and a movable lens set having a movable position, and that said fixed lens sets and said image pickup element are retained integrally on a fixed lens barrel such that the positional relationship between said fixed lens sets and said image pickup element is fixed so as to keep an image forming position fixed irrespective of whether said additional lens set is positioned on the optical axis or moved outside the light path.

3. An image pickup apparatus which includes a zoom lens and an image pickup element and has a first image pickup mode and a second image pickup mode which can be arbitrarily selected upon image pickup by said image pickup apparatus, said image pickup element having an image pickup plane which is used, when the first image pickup mode is selected, over a range as great as possible as an effective screen region but is used, when the second image pickup mode is selected, over a smaller range than that when the first image pickup mode is selected as an effective screen region, comprising:

said zoom lens includes an additional lens set having a positive refractive index and provided at a position nearest to the image side for movement (a) to a position on an optical axis of said zoom lens and (b) to a position outside a light path, wherein said additional lens set is moved, in response to changeover from the first image pickup mode to the second image pickup mode, to the position on the optical axis to reduce a focal length range of said zoom lens but is moved, in response to changeover from the second image pickup mode to the first image pickup mode, to the position outside the light path to increase the focal length range thereby to moderate a variation of an angle of view which is caused by a difference in range of the effective screen region of said image pickup element when the first image pickup mode is selected and when the second image pickup mode is selected, position detecting device detecting the movement of said additional lens; and control device receiving the detected movement of said additional lens set from said position detecting device and setting components of said image pickup apparatus to respective conditions suitable for the first image pickup mode or the second image pickup mode based upon the detected movement, wherein said zoom lens includes, in order from the object side, a first lens set having a positive refractive index and having a normally fixed position, a second lens set having a negative refractive index and movable along the optical axis to principally perform power variation, a third lens set having a positive refractive index and having a normally fixed position, a fourth lens set having a positive refractive index and movable along the optical axis to perform correction of a variation of the image position and focusing, and said additional lens set having a positive refractive index, that said first lens set includes, in order from the object side, a cemented lens of a first lens in the form of a concave meniscus lens having a convex face directed to the object side and a second lens in the form of a convex lens, and a third lens in the form of a convex meniscus lens having a convex face directed to the object side, that said second lens set includes, in order from the object side, a cemented lens of a fourth lens in the form of a concave lens, a fifth lens in the form of a biconcave lens and a sixth lens in the form of a convex lens, that said third lens set includes a seventh lens in the form of a biconvex lens having faces at least one of which is an aspheric face, that said fourth lens set includes, in order from the object side, a three-element cemented lens of an eighth lens in the form of a convex lens, a ninth lens in the form of a concave lens and a tenth lens in the form of a convex lens, and at least one of a face of said fourth lens set most adjacent the object side and a face of said fourth lens set most adjacent the image side is formed as an aspheric face, that said additional lens set includes, in order from the object side, a cemented lens of a biconvex lens whose face on the object side is formed as an aspheric face and a biconcave lens and is movable to the position on the optical axis and outside the light path, said additional lens set shifting the focal length range of said zoom lens between when said additional lens set is positioned on the optical axis and when said additional lens set is positioned outside the light path, and that said image pickup apparatus satisfies conditions of $$0.7 < \Sigma 5/fw2 < 2.5$$

$$-0.11 < fw2 \cdot (n52 - n51)/r52 < -0.085$$

$$0.003 < \Delta 5/fw2 < 0.01$$

$$2.5 < f4/fw2 < 5$$

where Σ5 is the total thickness of said additional lens set, fw2 the focal length at the wide angle end of the lens system including said first to fourth lens sets and said additional lens set, n51 the refractive index of the biconvex lens of said additional lens set on a "d" line, n52 the refractive index of said biconcave lens of said additional lens set on the "d" line, r52 the radius of curvature of the interface of said additional lens set, and Δ5 the amount of deformation of the aspheric face of said additional lens set from a generating face at a position of an effective radius (the deformation amount is in the positive where the deformation amount is provided on the image side), and f4 the focal length of said fourth lens set.

4. A zoom lens which includes, in order from the object side, a first lens set having a positive refractive index and having a normally fixed position, a second lens set having a negative refractive index and movable along an optical axis to principally perform power variation, a third lens set having a positive refractive index and having a normally fixed position, a fourth lens set having a positive refractive index and movable along the optical axis to perform correction of a variation of the image position and focusing, and an additional lens set having a positive refractive index, comprising:

said additional lens set includes, in order from the object side, a cemented lens of a biconvex lens whose face on the object side is formed as an aspheric face and a biconcave lens and is movable to and from a position on the optical axis, and shifts the focal length range of the entire lens system between when said additional lens set is positioned on the optical axis and when said additional lens set is positioned outside the optical axis, and that said zoom lens satisfies conditions of $$0.7 < \Sigma 5/fw2 < 2.5$$

$$-0.11 < fw2 \cdot (n52-n51)/r52 < -0.085$$

$$0.003 < \Delta 5/fw2 < 0.01$$

where $\Sigma 5$ is the total thickness of said additional lens set, fw2 the focal length at the wide angle end of the lens system including said first to fourth lens sets and said additional lens set, n51 the refractive index of the biconvex lens of said additional lens set on a "d" line, n52 the refractive index of said biconcave lens of said additional lens set on the "d" line, r52 the radius of curvature of the interface of said additional lens set, and $\Delta 5$ the amount of deformation of the aspheric face of said additional lens set from a generating face at a position of an effective radius (the deformation amount is in the positive where the deformation amount is provided on the image side).

5. A zoom lens according to claim 4, wherein
said first lens set includes, in order from the object side, a cemented lens of a first lens in the form of a concave meniscus lens having a convex face directed to the object side and a second lens in the form of a convex lens, and a third lens in the form of a convex meniscus lens having a convex face directed to the object side, that
said second lens set includes, in order from the object side, a cemented lens of a fourth lens in the form of a concave lens, a fifth lens in the form of a biconcave lens and a sixth lens in the form of a convex lens, that
said third lens set includes a seventh lens in the form of a biconvex lens having faces at least one of which is an aspheric face, that
said fourth lens set includes, in order from the object side, a three-element cemented lens of an eighth lens in the form of a convex lens, a ninth lens in the form of a concave lens and a tenth lens in the form of a convex lens, and at least one of a face of said fourth lens set most adjacent the object side and a face of said fourth lens set most adjacent the image side is formed as an aspheric face, that
said zoom lens further satisfies a condition of $$2.5 < f4/fw2 < 5$$

where f4 is the focal length of said fourth lens set.

6. An image pickup apparatus which includes a zoom lens and an image pickup element and has a first image pickup mode and a second image pickup mode which can be arbitrarily selected upon image pickup by said image pickup apparatus, said image pickup element having an image pickup plane which is used, when the first image pickup mode is selected, over a range as great as possible as an effective screen region but is used, when the second image pickup mode is selected, over a smaller range than that when the first image pickup mode is selected as an effective screen region, comprising:

said zoom lens includes an additional lens set having a positive refractive index and provided at a position nearest to the image side for movement (a) to a position on an optical axis of said zoom lens and (b) to a position outside a light path.
wherein said additional lens set is moved, in response to changeover from the first image pickup mode to the second image pickup mode, to the position on the optical axis to reduce a focal length range of said zoom lens but is moved, in response to changeover from the second image pickup mode to the first image pickup mode, to the position outside the light path to increase the focal length range thereby to moderate a variation of an angle of view which is caused by a difference in range of the effective screen region of said image pickup element when the first image pickup mode is selected and when the second image pickup mode is selected,
position detecting device detecting the movement of said additional lens; and
control device receiving the detected movement of said additional lens set from said position detecting device and setting components of said image pickup apparatus to respective conditions suitable for the first image pickup mode or the second image pickup mode based upon the detected movement,
said image pickup apparatus being configured such that, when the first image pickup mode is selected, individual information obtained from each of pixels of said image pickup element is extracted as information of one pixel to form an image, but when the second image pickup mode is selected, information obtained by mixing information obtained from each plurality of adjacent ones of the pixels of said image pickup element is extracted as information of one pixel to form an image having a pixel pitch rougher than that of the image obtained in the first image pickup mode, and wherein
said image pickup apparatus comprises two different optical low pass filters having different characteristics from each other for being selectively moved to respective positions on said optical axis between said zoom lens and said image pickup element,
said second optical low pass filter being positioned on the optical axis when second image pickup mode is selected and has a characteristic that an MTF in a high frequency is lower than that of said first optical low pass filter being positioned on the optical axis when said first image pickup mode is selected, and wherein
states of selected components of said image pickup apparatus are set in conformity with the first image pickup mode or the second image pickup mode in response to detection of changeover of positioning of said first optical low pass filter or said second optical low pass filter on the optical axis.

7. An image pickup apparatus which includes a zoom lens and an image pickup element and has a first image pickup mode and a second image pickup mode which can be arbitrarily selected upon image pickup by said image pickup apparatus, said image pickup element having an image pickup plane which is used, when the first image pickup mode is selected, over a range as great as possible as an effective screen region but is used, when the second image pickup mode is selected, over a smaller range than that when the first image pickup mode is selected as an effective screen region, comprising:

said zoom lens includes an additional lens set having a positive refractive index and provided at a position nearest to the image side for movement (a) to a position on an optical axis of said zoom lens and (b) to a position outside a light path, wherein said additional lens set is moved, in response to changeover from the first image pickup mode to the second image pickup mode, to the position on the optical axis to reduce a focal length range of said zoom lens but is moved, in response to changeover from the second image pickup mode to the first image pickup mode, to the position outside the light path to increase the focal length range thereby to moderate a variation of an angle of view which is caused by a difference in range of the effective screen region of said image pickup element when the first image pickup mode is selected and when the second image pickup mode is selected, position detecting device detecting the movement of said additional lens; and control device receiving the detected movement of said additional lens set from said position detecting device and setting components of said image pickup apparatus to respective conditions suitable for the first image pickup mode or the second image pickup mode based upon the detected movement, said image pickup apparatus being configured such that, when the first image pickup mode is selected, individual information obtained from each of pixels of said image pickup element is extracted as information of one pixel to form an image, but when the second image pickup mode is selected, information obtained by mixing information obtained from each plurality of adjacent ones of the pixels of said image pickup element is extracted as information of one pixel to form an image having a pixel pitch rougher than that of the image obtained in the first image pickup mode, and wherein said image pickup apparatus comprises a fixed optical low pass filter normally positioned on said optical axis, and a movable optical low pass filter mounted for movement to and from a position on the optical axis, said movable optical low pass filter being positioned outside the optical axis when the first image pickup mode is selected, and said movable optical low pass filter is positioned on the optical axis when said second image pickup mode is selected so as to effectively act on the image of the rougher pixel pitch which includes said information obtained by mixing information of each plurality of adjacent ones of the pixels as information of one pixel, and wherein states of selected components of said image pickup apparatus are set in conformity with the first image pickup mode or the second image pickup mode in response to detection of the movement of said movable optical low pass filter to or from the position on the optical axis.

* * * * *